(12) United States Patent
Davis et al.

(10) Patent No.: US 11,959,550 B2
(45) Date of Patent: Apr. 16, 2024

(54) ACTUATION MECHANISM

(71) Applicant: Dana Automotive Systems Group, LLC, Maumee, OH (US)

(72) Inventors: Justin Davis, Maumee, OH (US); Aaron Gries, Perrysburg, OH (US); Robert Keller, Haskins, OH (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/172,220

(22) Filed: Feb. 21, 2023

(65) Prior Publication Data

US 2023/0193994 A1 Jun. 22, 2023

Related U.S. Application Data

(60) Continuation of application No. 17/376,073, filed on Jul. 14, 2021, now Pat. No. 11,608,891, which is a
(Continued)

(51) Int. Cl.
*F16H 63/34* (2006.01)
*F16H 1/28* (2006.01)
(Continued)

(52) U.S. Cl.
CPC ........... *F16H 63/3425* (2013.01); *F16H 1/28* (2013.01); *F16D 63/006* (2013.01);
(Continued)

(58) Field of Classification Search
CPC .. F16H 63/3425; F16H 63/48; F16H 63/3466; F16H 63/304; F16H 2001/2872;
(Continued)

(56) References Cited

U.S. PATENT DOCUMENTS 4,882,943 A   11/1989  Pipon et al.
5,807,205 A    9/1998  Odaka et al.
(Continued)

FOREIGN PATENT DOCUMENTS

CN    103228952 A   7/2013
CN    203404328 U   1/2014
(Continued)

OTHER PUBLICATIONS

Machine translation WO 2014/044277 (Year: 2014).*
(Continued)

*Primary Examiner* — Jacob S. Scott
*Assistant Examiner* — Farhana Pervin
(74) *Attorney, Agent, or Firm* — McCoy Russell LLP

(57) ABSTRACT

An actuation mechanism for use in a vehicle. The actuation mechanism includes one or more motors having an output shaft with a sun gear. At least a portion of the sun gear is drivingly connected to at least a portion of one or more planetary gears. The one or more planetary gears are drivingly connected to at least a portion of a carrier, a fixed non-rotating ring gear and an output gear. The disclosure further relates to a method of operating an actuation mechanism that is drivingly connected to at least a portion of a vehicle parking mechanism. The method includes providing an actuation mechanism, providing a parking mechanism and one or more sensors that are operably configured to collect an amount of data to be analyzed. Based on the data analyzed, one or more failures within the parking mechanism may be determined and an alert may be sent.

20 Claims, 17 Drawing Sheets

Related U.S. Application Data division of application No. 16/640,605, filed as application No. PCT/US2018/037542 on Jun. 14, 2018, now Pat. No. 11,619,302.

(60) Provisional application No. 62/586,779, filed on Nov. 15, 2017, provisional application No. 62/519,760, filed on Jun. 14, 2017.

(51) Int. Cl.
  *F16D 63/00* (2006.01)
  *F16H 63/48* (2006.01)

(52) U.S. Cl.
  CPC .................. *F16D 2500/304* (2013.01); *F16H 2001/2872* (2013.01); *F16H 63/3466* (2013.01); *F16H 63/48* (2013.01)

(58) Field of Classification Search
  CPC ............... F16H 2200/2005; F16H 1/28; F16H 63/34–63/3491; F16H 2001/2881; F16D 2121/24; F16D 2023/123
  See application file for complete search history.

(56) References Cited

U.S. PATENT DOCUMENTS

| | | | |
|---|---|---|---|
| 9,869,389 B2 | 1/2018 | Rhoades et al. | |
| 2001/0051556 A1 | 12/2001 | Takenaka | |
| 2003/0114267 A1* | 6/2003 | Poulin | F16H 1/46 475/331 |
| 2008/0033617 A1 | 2/2008 | Watanabe et al. | |
| 2010/0304918 A1* | 12/2010 | Burgman | F16H 57/082 475/331 |
| 2014/0353069 A1* | 12/2014 | Chae | B62D 3/12 180/444 |
| 2015/0252897 A1 | 9/2015 | Kristofcsak | |
| 2015/0314770 A1 | 11/2015 | Kitabatake et al. | |
| 2016/0348760 A1* | 12/2016 | Wigsten | F01L 1/352 |
| 2017/0307081 A1 | 10/2017 | Rodrigues et al. | |
| 2017/0326712 A1* | 11/2017 | Li | H02K 1/146 |
| 2018/0003277 A1* | 1/2018 | Brown | F16H 1/28 |
| 2018/0283503 A1* | 10/2018 | Georgiev | H02K 1/278 |
| 2018/0320564 A1* | 11/2018 | Pluta | F16H 57/082 |
| 2020/0189549 A1 | 6/2020 | Mazzarini et al. | |
| 2020/0378492 A1 | 12/2020 | Van Druten et al. | |

FOREIGN PATENT DOCUMENTS

| | | |
|---|---|---|
| CN | 105587837 A | 5/2016 |
| CN | 106471281 A | 3/2017 |
| DE | 9318360 U1 | 2/1994 |
| WO | 2014044277 A1 | 3/2014 |
| WO | 2017019585 A1 | 2/2017 |

OTHER PUBLICATIONS

ISA European Patent Office, International Search Report Issued in Application No. PCT/US2018/037542, dated Oct. 24, 2018, WIPO, 5 pages.

China National Intellectual Property Administration, Office Action and Search Report Issued in Application No. 201880039584.X, dated Jan. 26, 2021, 17 pages.

* cited by examiner

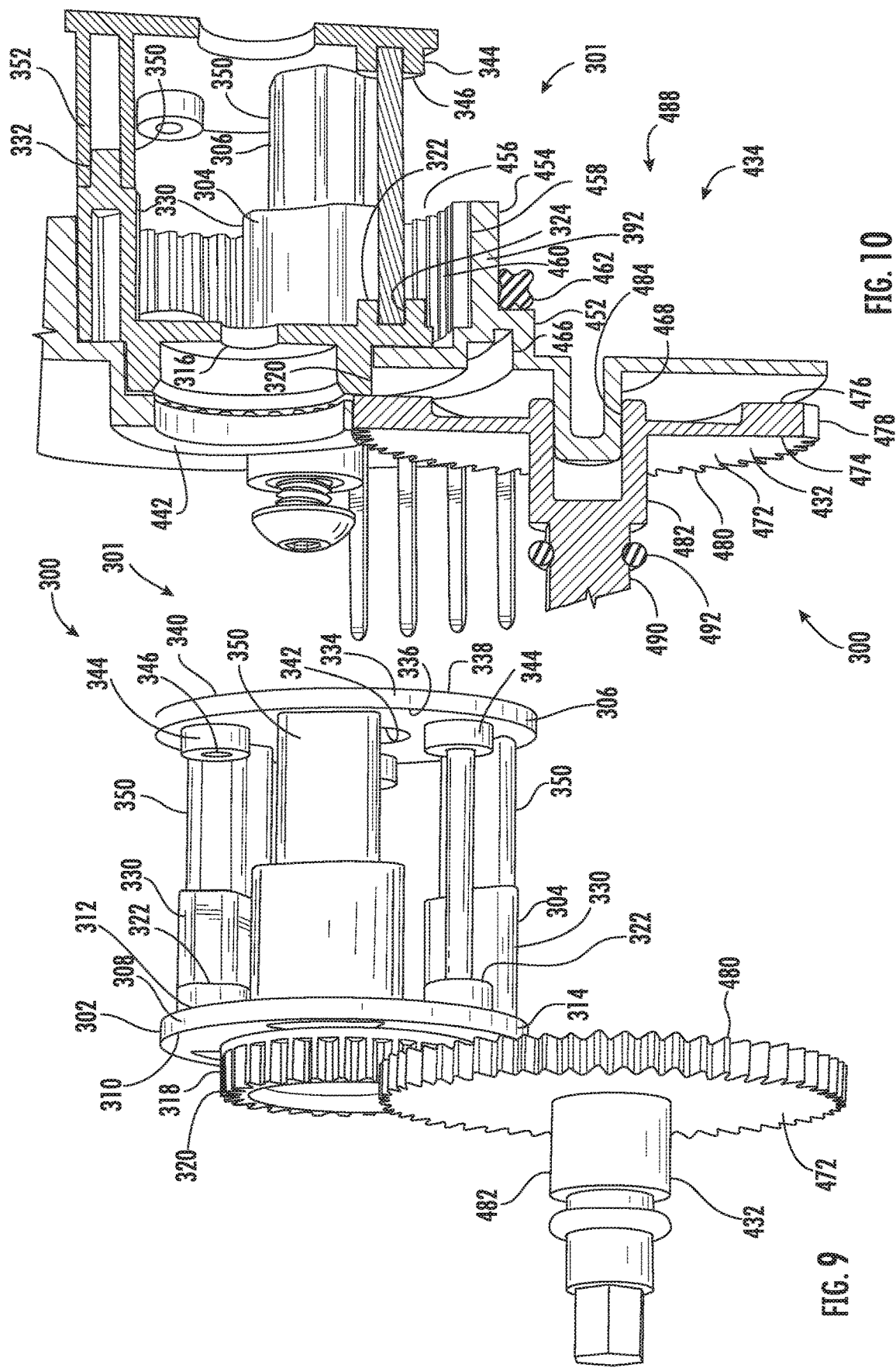

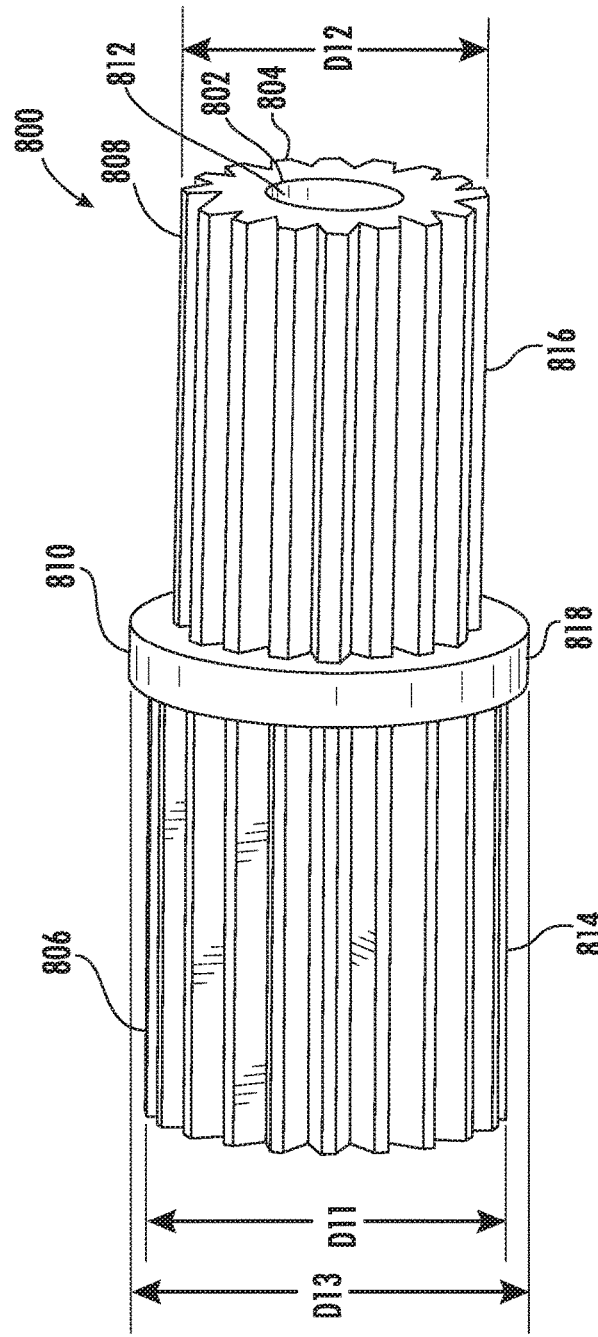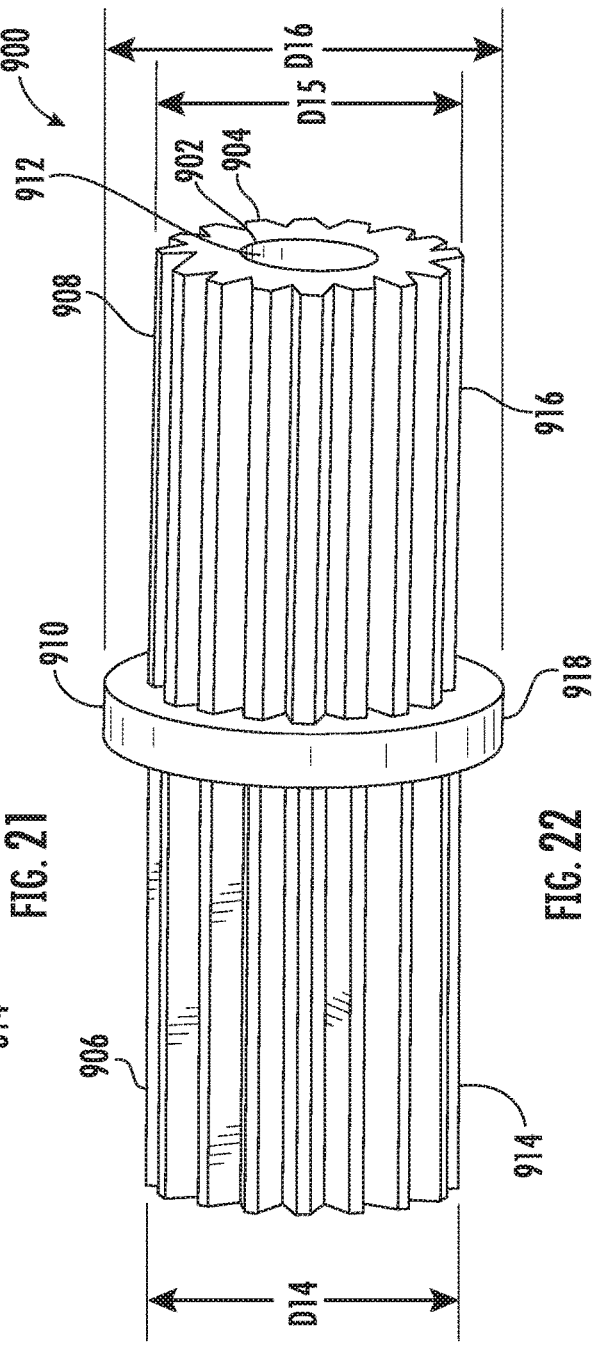

ACTUATION MECHANISM

CROSS-REFERENCE TO RELATED APPLICATIONS

The present application is a continuation of U.S. Non-Provisional patent application Ser. No. 17/376,073, entitled "ACTUATION MECHANISM", and filed on Jul. 14, 2021. U.S. Non-Provisional patent application Ser. No. 17/376,073 is a divisional of U.S. patent application Ser. No. 16/640,605, entitled "ACTUATION MECHANISM," and filed on Feb. 20, 2020. U.S. patent application Ser. No. 16/640,605 is a U.S. National Phase of International Patent Application Serial No. PCT/US2018/037542, entitled "ACTUATION MECHANISM," and filed on Jun. 14, 2018. International Patent Application Serial No. PCT/US2018/037542 claims priority to U.S. Provisional Patent Application Ser. No. 62/519,760, filed on Jun. 14, 2017, and U.S. Patent Application Ser. No. 62/586,779, filed on Nov. 15, 2017. The entire contents of each of the above-listed applications are hereby incorporated by reference for all purposes.

FIELD OF THE DISCLOSURE

The present disclosure relates to an actuation mechanism and method of operation thereof. The actuation mechanism may be used as a parking mechanism within a vehicle.

BACKGROUND OF THE DISCLOSURE

Parking mechanisms are utilized within vehicles in order to prevent one or more shafts within the vehicle from rotating under certain conditions. The problem with conventional parking mechanisms is that they are easily back driven, unreliable, unable to operate in a wide array of potential operational characteristics, do not provide accurate and true parking pawl engagement determinations, do not provide diagnostic capabilities and do not provide manual operation functionalities.

It would therefore be advantageous to develop an actuation mechanism and a parking mechanism that is unable to be back driven, reliable, is able to operate in a wide array of potential operational characteristics, provides an accurate and true parking pawl engagement determinations, provides diagnostic capabilities and is able to be selectively operated manually.

SUMMARY OF THE DISCLOSURE

An actuation mechanism for use in a vehicle. The actuation mechanism includes one or more motors having an output shaft with a sun gear. At least a portion of the sun gear is drivingly connected to at least a portion of one or more planetary gears. The one or more planetary gears are drivingly connected to at least a portion of a carrier, a fixed non-rotating ring gear and an output gear.

According to an aspect of the disclosure, at least a portion of the fixed non-rotating ring gear of the actuating mechanism may be integrally connected to at least a portion of the one or more motors and/or a housing.

According to any of the previous aspects of the disclosure, the one or more planetary gears may have an outer surface, a first end portion, a second end portion and an intermediate portion interposed between the first and second end portions. A first plurality of planetary gear teeth circumferentially may extend from at least a portion of the outer surface of the first end portion of the one or more planetary gears. At least a portion of the first plurality of planetary gear teeth may be complementary to and meshingly engaged at least a portion of a plurality of ring gear teeth on the fixed non-rotating ring gear. A second plurality of planetary gear teeth circumferentially extend from at least a portion of the outer surface of the second end portion of the one or more planetary gears. At least a portion of the second plurality of planetary gear teeth may be complementary to and meshingly engaged with at least a portion of a plurality of output gear teeth circumferentially extending from at least a portion of an inner surface of the output gear.

According to any of the previous aspects of the disclosure, the intermediate portion of the one or more planetary gears may have an increased diameter portion that separates the first plurality of planetary gear teeth from the second plurality of planetary gear teeth of the one or more planetary gears.

According to any of the previous aspects of the disclosure, the first plurality of planetary gear teeth have an outermost diameter D1 and the second plurality of planetary gear teeth have an outermost diameter D2. The outermost diameter D2 of the second plurality of planetary gear teeth may be larger than the outermost diameter D1 of the first plurality of planetary gear teeth of the one or more planetary gears.

According to any of the previous aspects of the disclosure, the first plurality of planetary gear teeth have an outermost diameter D1, the second plurality of planetary gear teeth have an outermost diameter D2 and the increased diameter portion of the one or more planetary gears has an outermost diameter D3. The outermost diameter D2 of the second plurality of planetary gear teeth may be larger than the outermost diameter D1 of the first plurality of planetary gear teeth of the one or more planetary gears. Additionally, the outermost diameter D3 of the increased diameter portion of the one or more planetary gears may be larger than the outermost diameter D1 of the first plurality of planetary gear teeth and the outermost diameter D2 of the second plurality of planetary gear teeth of the one or more planetary gears.

According to any of the previous aspects of the disclosure, the carrier comprises an engagement portion that is selectively engagable with at least a portion of a connect and disconnect member that is configured to selectively rotate the carrier.

According to any of the previous aspects of the disclosure, at least a portion of the output gear may be drivingly connected to at least a portion of a parking mechanism comprising a cam that selectively drives a parking pawl into and out of engagement with a parking gear.

According to any of the previous aspects of the disclosure, at least a portion of a dog extending from the parking pawl may be received within at least a portion of a parking pawl groove in a protruding portion of the cam of the parking mechanism.

According to any of the previous aspects of the disclosure, the cam may have an outer surface, a first end portion, an intermediate portion, a second end portion, a first end and a second end. A first hollow interior portion may extend from at least a portion of the first end of the cam and into at least a portion of the cam of the parking mechanism. At least a portion of the one or more planetary gears, the carrier and the output gear may be disposed within at least a portion of the first hollow interior portion of the cam.

According to any of the previous aspects of the disclosure, the parking mechanism may further include one or more first biasing members and/or one or more second biasing members. At least a portion of the one or more first biasing members and the one or more second biasing members may be disposed within at least a portion of the first hollow interior portion of the cam. Additionally, at least a portion of the first end portion of the one or more first biasing members and/or at least a portion of the first end portion of the one or more second biasing members may be connected to at least a portion of the output gear. Furthermore, at least a portion of the second end portion of the one or more first biasing members and/or at least a portion of the second end portion of the one or more second biasing members may be connected to at least a portion of the cam of the parking mechanism.

According to any of the previous aspects of the disclosure, the parking mechanism may further include one or more bearing assemblies that may be disposed radially outboard from and in direct contact with at least a portion of the outer surface of the cam.

According to any of the previous aspects of the disclosure, the parking mechanism may further include a cam actuating member. At least a portion of the cam actuating member may be connected to at least a portion of the cam and at least a portion of the cam actuating member may be operably configured to selectively rotate the cam.

According to any of the previous aspects of the disclosure, where the mechanism further includes a connect and disconnect gear having a gear portion with a plurality of connect and disconnect gear teeth circumferentially extending from at least a portion of an outer surface of the gear portion of the connect and disconnect gear. The carrier may have a plurality of carrier gear teeth circumferentially extending from at least a portion of an outer surface of a carrier gear portion of a first end portion of the carrier. At least a portion of the connect and disconnect gear teeth of the connect and disconnect gear may be complementary to and selectively engagable with the plurality of carrier gear teeth on the carrier gear portion of the carrier to selectively rotate the carrier.

According to any of the previous aspects of the disclosure, where at least a portion of the connect and disconnect gear may be connected to at least a portion of the non-rotating fixed ring gear.

According to any of the previous aspects of the disclosure, where the mechanism further includes a circuit board, one or more first sensing members, one or more second sensing members and one or more third sensing members. At least a portion of the one or more first sensing members may be integrally connected to at least a portion of the head of the parking pawl at a location proximate to one or more teeth extending from the parking pawl. Additionally, at least a portion of the one or more second sensing members and the one or more third sensing members may be integrally connected to and in electrical communication with at least a portion of the circuit board at pre-determined locations. The one or more second sensing members and the one or more third sensing members may be operably configured to sense and/or detect the presence of the one or more first sensing members.

According to any of the previous aspects of the disclosure, where when the one or more second sensing members sense and/or detect the presence of the one or more first sensing members, the parking pawl may be engaged with the parking gear. Additionally, when the one or more third sensing members sense and/or detect the presence of the one or more first sensing members, the parking pawl may be disengaged from the parking gear.

According to any of the previous aspects of the disclosure, where the parking mechanism further includes a sensor mounting member having a first side and a second side. At least a portion of the sensor mounting member may be integrally connected to at least a portion of the head of the parking pawl at a location proximate to the one or more teeth of the parking pawl and at least a portion of the one or more first sensing members may be integrally connected to at least a portion of the second side of the senor mounting member. Additionally, a dog extends outward from at least a portion of the first side of the sensor mounting member and into at least a portion of a parking pawl receiving portion extending inward into at least a portion of a first side of a protruding portion of the cam.

According to any of the previous aspects of the disclosure, the mechanism may further include a circuit board, one or more fourth sensing members, one or more fifth sensing members and one or more sixth sensing member. At least a portion of the one or more fourth sensing members may be connected to at least a portion of an outer surface of the output gear and at least a portion of the one or more fifth sensing members and the one or more sixth sensing members may be integrally connected to and in electrical communication with at least a portion of the circuit board. The one or more fifth sensing members and the one or more sixth sensing members may be operably configured to sense and/or detect the presence of the one or more fourth sensing members.

According to any of the previous aspects of the disclosure, where when the one or more sixth sensing members sense and/or detect the presence of the one or more fourth sensing members and the one or more one or more second sensing members do not sense and/or detect the presence of the one or more first sensing members, the parking mechanism may be in a blocked state. When the one or more fifth sensing members sense and/or detect the presence of the one or more fourth sensing members and the one or more one or more third sensing members do not sense and/or detect the presence of the one or more first sensing members, the parking mechanism may be in a disengaged pinched state.

A method of operating a parking mechanism including, providing an actuation mechanism comprising one or more motors, a motor output shaft, a sun gear, one or more planetary gears, a carrier, a fixed non-rotatable ring gear and an output gear. Providing a parking mechanism comprising a cam that is selectively rotated in order to selectively engage and disengage a parking pawl with a parking gear and providing one or more sensor members. An amount of data may then be collected by the one or more sensing members relating to an engagement of the parking pawl with the parking gear, the a disengagement of the parking pawl from the parking gear, a location of the parking pawl, a location of a head of the parking pawl, a rotational speed of the one or more motors, a rotational speed of the parking gear, a rotational speed of the cam, a position of the output gear, a position of the cam, a grade of a road a vehicle is on and/or one or more operational characteristics of the parking mechanism. The data collected may then be analyzed in order to identify the occurrence of one or more failures within the parking mechanism. Once a failure has been identified a signal may be sent to a vehicle operator alerting the vehicle operator to the failure within the parking mechanism.

According to an aspect of the disclosure, the data collected relating to the one or more operating characteristics of the parking mechanism includes an amount of time to engage the parking mechanism, an amount of time to disengage the parking mechanism, an operating temperature of the parking mechanism, a total number of lock and unlock cycles the parking mechanism has performed, an amount of current supplied to the parking mechanism and/or an amount of current draw by the parking mechanism.

According to any one of the previous aspects of the disclosure, where the method further includes predicting when a failure will occur within the parking mechanism and where the prediction is based on the data collected and analyzed. Sending a signal to a vehicle operator informing the vehicle operator when the parking mechanism will require maintenance.

BRIEF DESCRIPTION OF THE DRAWINGS

The above, as well as other advantages of the present disclosure, will become readily apparent to those skilled in the art from the following detailed description when considered in light of the accompanying drawings in which:

FIG. 9 is a schematic perspective view of a portion of the actuation mechanism of the parking mechanism illustrated in FIGS. 7 and 8 of the disclosure;

FIG. 10 is a schematic partial cut-away perspective view of a portion of the actuation mechanism of the parking mechanism illustrated in FIGS. 7-9 of the disclosure where a connect and disconnect mechanism of the parking mechanism is in a disengaged position;

FIG. 21 is a schematic side view of the one or more planetary gears illustrated in FIGS. 1-3, 5, 7, 8, 15, 17 and 19 according to an alternative embodiment of the disclosure; and FIG. 22 is a schematic side-view of the one or more planetary gears illustrated in FIGS. 1-3, 5, 7, 8, 15, 17, 19 and 21 according to another embodiment of the invention.

DETAILED DESCRIPTION OF THE DISCLOSURE

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

It is within the scope of this disclosure, and as a non-limiting example, that the actuation and parking mechanism disclosed herein may be used in automotive, off-road vehicle, all-terrain vehicle, construction, structural, marine, aerospace, locomotive, military, machinery, robotic and/or consumer product applications. Additionally, as a non-limiting example, the actuation and parking mechanism disclosed herein may also be used in passenger vehicle, electric vehicle, hybrid vehicle, commercial vehicle, autonomous vehicles, semi-autonomous vehicles and/or heavy vehicle applications.

FIGS. 1-5 provide a schematic illustration of an actuation mechanism 1 according to an embodiment of the disclosure. In accordance with the embodiment of the disclosure illustrated in FIGS. 1-5 and as a non-limiting example, the actuation mechanism 1 may be utilized as part of a parking mechanism 2. While the actuation mechanism 1 illustrated in FIGS. 1-5 of the disclosure is being utilized within the parking mechanism 2, it is within the scope of this disclosure that the actuation mechanism 1 may be utilized in other applications such as but not limited to window motors, axle connect and disconnect devices, wet clutch assemblies, dry clutch assemblies, face clutch assemblies, dog clutch assemblies, door lock and unlock assemblies and the like.

Figure 1:
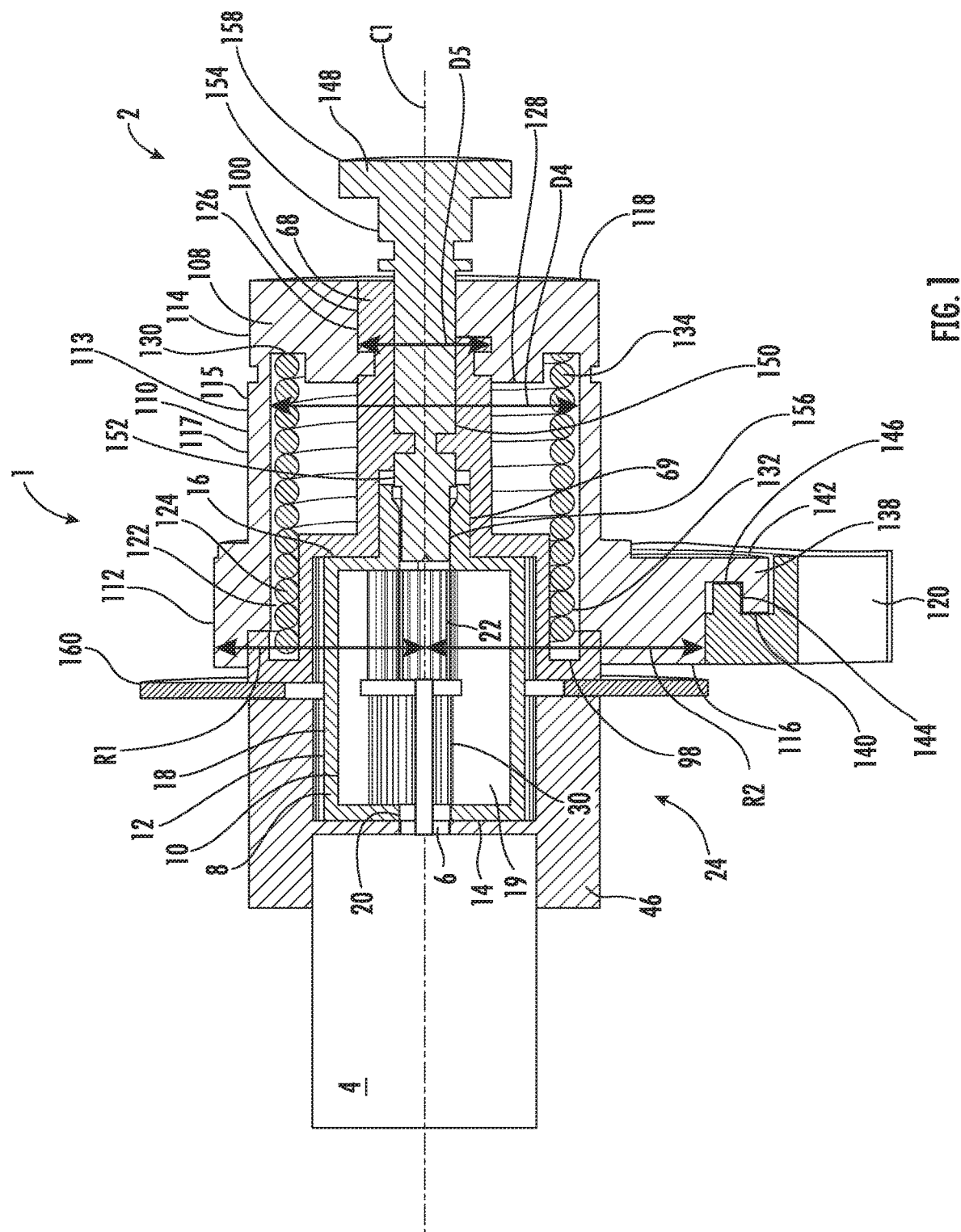
FIG. 1 is a partial cut-away schematic side-view of a portion of an actuation mechanism within a parking mechanism according to an embodiment of the disclosure.
Figure 2:
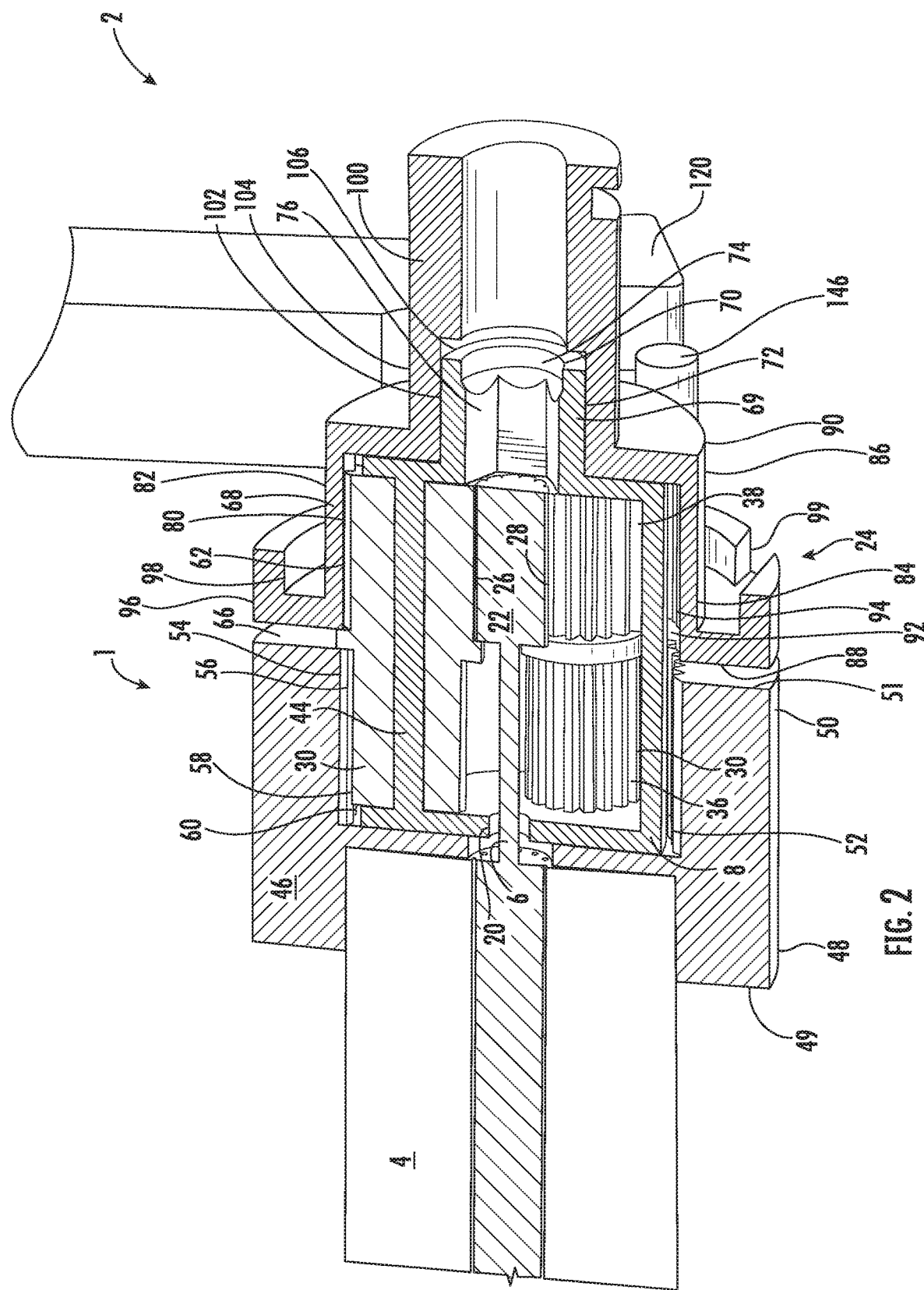
FIG. 2 is a partial cut-away schematic side-view of a portion of the actuation mechanism and parking mechanism according to the embodiment of the disclosure illustrated in FIG. 1.
Figure 3:
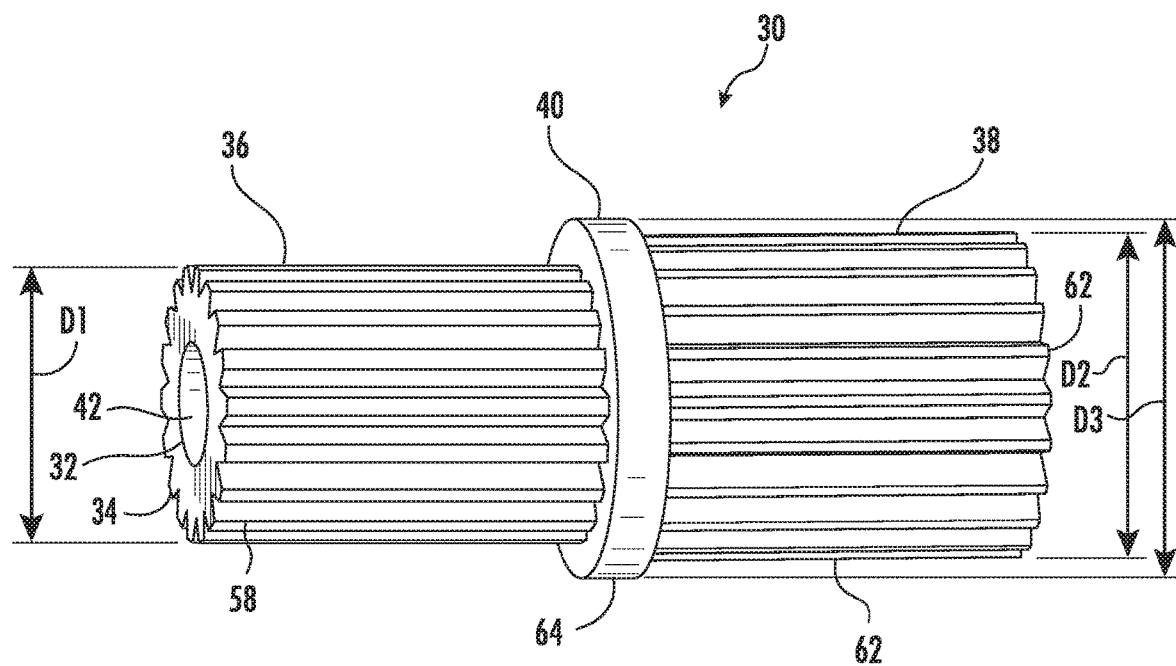
FIG. 3 is a schematic side-view of a planetary gear of the actuation mechanism according to the embodiment of the disclosure illustrated in FIGS. 1 and 2.

As best seen in FIGS. 1-3 of the disclosure and as a non-limiting example, the actuation mechanism 1 includes one or more motors 4 that is drivingly connected to at least a portion of a planetary gear assembly 24 via a motor output shaft 6. At least a portion of the one or more motors 4 is drivingly connected to at least a portion of an end of the motor output shaft 6 of the actuation mechanism 1 of the parking mechanism 2. It is within the scope of this disclosure and as a non-limiting example that the one or more motors 4 may be an electric motor or any other motor that is capable of converting an amount of electrical energy into mechanical or rotational energy.

Extending co-axially with the motor output shaft 6 and axially off-set from the one or more motors 4 is a carrier 8 having an inner surface 10, an outer surface 12, a first end 14, a second end 16 and an intermediate portion 18 interposed between the first and second ends 14 and 16 of the carrier 8. As bets seen in FIGS. 1, 2, and 5 of the disclosure and as a non-limiting example, at least a portion of the carrier 8 of the actuation mechanism 1 of the parking mechanism 2 is disposed adjacent to an end of the one or more motors 4. The inner surface 10 and the outer surface 12 of the carrier 8 defines a hollow interior portion 19 therein. In accordance with an embodiment of the disclosure and as a non-limiting example, the carrier may substantially cylindrical in shape. It is within the scope of this disclosure and as a non-limiting example that the carrier 8 may be a single integrally formed member or composed of a plurality of portions that are integrally connected to each other by using one or more welds, one or more mechanical fasteners, one or more adhesives, a press-fit connection and/or a threaded connection.

A motor output shaft aperture 20 may extend from the inner surface 10 to the outer surface 12 of the first end 14 of the carrier 8. As best seen in FIGS. 1 and 2 of the disclosure and as a non-limiting example, the motor output shaft aperture 20 of the carrier 8 may be of a size and shape to receive and/or retain at least a portion of the motor output shaft 6. It is within the scope of this disclosure and as a non-limiting example that the motor output shaft aperture 20 may provide rotational support for at least a portion of the motor output shaft 6 of the actuation mechanism 1.

Drivingly connected to an end of the motor output shaft 6, opposite the one or more motors 4, is a sun gear 22. In accordance with the embodiment illustrated in FIGS. 1, 2, and 5 and as a non-limiting example, at least a portion of the sun gear 22 is disposed within the hollow interior portion 19 of the carrier of the actuation mechanism 1 of the parking mechanism 2. As seen in FIGS. 1 and 2 of the disclosure and as a non-limiting example, the sun gear 22 forms a portion of the planetary gear assembly 24. It is within the scope of this disclosure and as a non-limiting example that the sun gear 22 may be integrally formed as part of the motor output shaft 6 or integrally connected to at least a portion of the motor output shaft 6 by using one or more welds, one or more mechanical fasteners, one or more adhesives, a spline connection and/or a threaded connection. Additionally, it is within the scope of this disclosure and as a non-limiting example that the planetary gear assembly 24 of the actuation mechanism 1 of the parking mechanism 2 may be a stepped planetary gear assembly having one or more stepped planetary gears.

Circumferentially extending from at least a portion of an outer surface 26 of the sun gear 22 is a plurality of sun gear teeth 28. It is within the scope of this disclosure and as a non-limiting example, the plurality of sun gear teeth 28 on the sun gear 22 may be a plurality of hypoid gear teeth, spiral bevel gear teeth, helical gear teeth, spur gear teeth, double hypoid gear teeth, double spiral bevel gear teeth or double helical gear teeth.

Drivingly connected to at least a portion of the sun gear 22 and the carrier 8 of the planetary gear assembly 24 of the actuation mechanism 1 is one or more planetary gears 30. As best seen in FIG. 3 of the disclosure and as a non-limiting example, the one or more planetary gears 30 have an inner surface 32, an outer surface 34, a first end portion 36, a second end portion 38 and an intermediate portion 40 interposed between the first and second end portions 36 and 38 of the one or more planetary gears 30. The inner surface 32 and the outer surface 34 of the one or more planetary gears 30 define a hollow portion 42 therein. In accordance with the embodiment illustrated in FIGS. 1-3 and as a non-limiting example, the one or more planetary gears 30 are stepped planetary gears.

Figure 5:
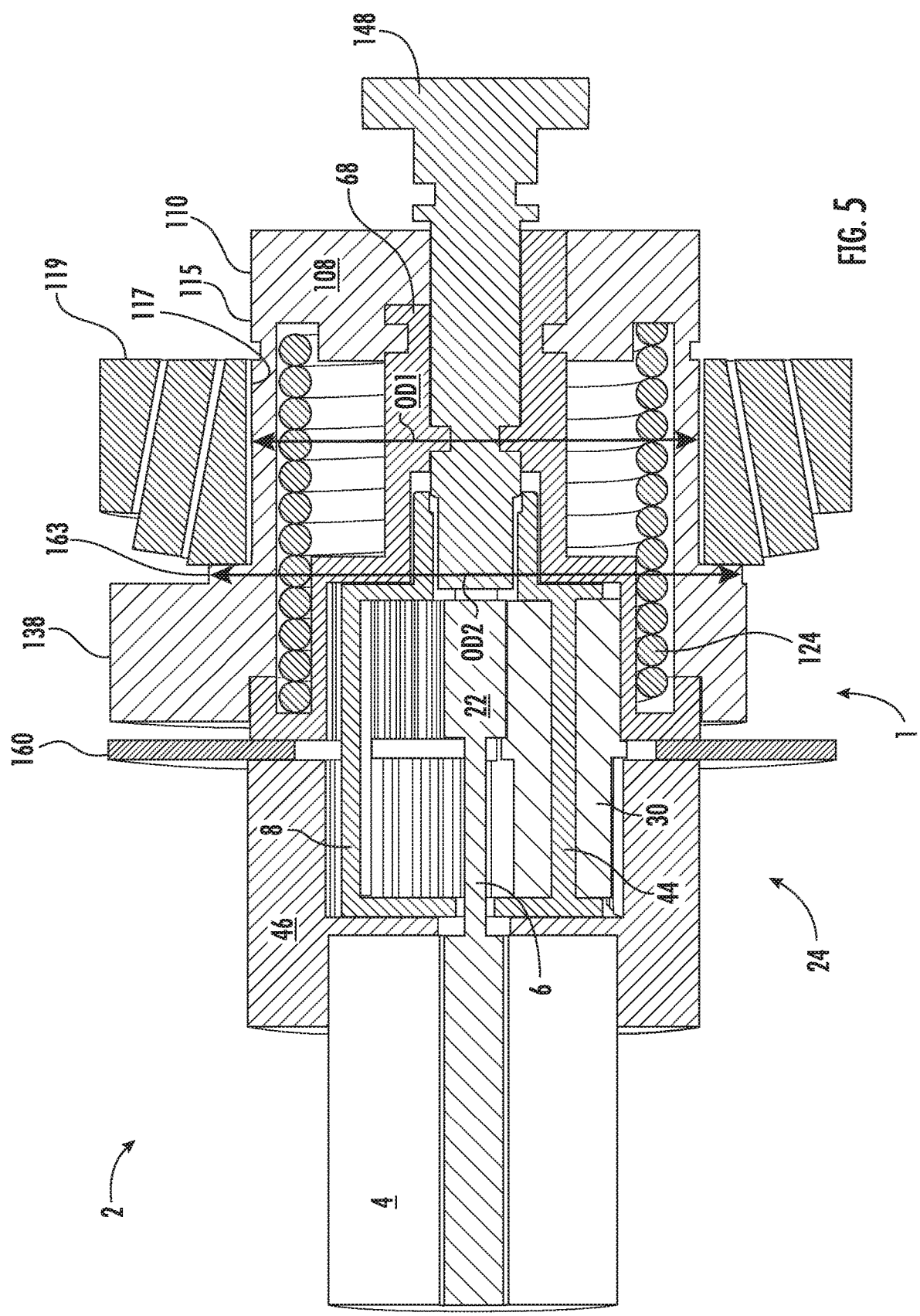
FIG. 5 is a schematic cross-sectional side-view of the actuation mechanism according to the embodiment of the disclosure illustrated in FIGS. 1, 2 and 4.

Extending from the first end 14 to the second end 16, within the hollow interior portion 19 of the carrier 8, is one or more planetary gear support portions 44. The one or more planetary gear support portions 44 may provide rotational support for at least a portion of the one or more planetary gears 30 and provides a driving connection between the one or more planetary gears 30 and the carrier 8 of the planetary gear assembly 24. As best seen in FIGS. 2 and 5 of the disclosure and as a non-limiting example, the one or more planetary gear support portions 44 may have a size and shape to be received and/or retained within at least a portion of the hollow portion 42 of the one or more planetary gears 30. As a result, is if therefore to be understood that the total number of the one or more planetary gears 30 within the planetary gear assembly 24 corresponds to the total number of the one or more planetary gear support portions 44 of the carrier 8 of the actuation mechanism 1.

Disposed radially outboard from at least a portion of the one or more motors 4, the carrier 8 and the one or more planetary gears 30 is a ring gear 46 having a first end portion 48, a second end portion 50, a first end 49 and a second end 51. At least a portion of the ring gear 46 extends co-axially with at least a portion of the carrier 8 of the planetary gear assembly 24. As best seen in FIGS. 1, 2 and 5 of the disclosure and as a non-limiting example, at least a portion of the first end portion 48 of the ring gear 46 may be integrally connected to at least a portion of the one or more motors 4 of the actuation mechanism 1 of the parking mechanism 2. According to an embodiment of the disclosure and as a non-limiting example, the ring gear 46 may be integrally formed as part of the one or more motors 4 or integrally connected to at least a portion of the one or more motors 4 by using one or more welds, one or more mechanical fasteners, one or more adhesives, a splines connection and/or a threaded connection. It is therefore within the scope of this disclosure and as a non-limiting example that the ring gear 46 of the planetary gear assembly 24 of the parking mechanism 2 may a fixed ring gear. By making the ring gear 46 a fixed ring gear and the one or more planetary gears 30 a stepped planetary gear, it prevents an output gear 68 drivingly connected to at least a portion of the one or more stepped planetary gears from being back driven. This makes the actuation mechanism 1 of the parking mechanism 2 more reliable and able to maintain an engaged or disengaged portion even when there is a loss of power from the primary power source (not shown) of the vehicle (not shown). As a result, the actuation mechanism 1 and the parking mechanism 2 are more robust and reliable.

At least a portion of the second end portion 50 of the ring gear 46 has a hollow interior portion 52 extending inboard from the second end 51 of the ring gear 46. As best seen in FIGS. 1, 2 and 5 of the disclosure and as a non-limiting example, the hollow interior portion 52 of the ring gear 46 may have a size and shape needed receive and/or retain at least a portion of the carrier 8 and the one or more planetary gears 30 of the planetary gear assembly 24.

Circumferentially extending from at least a portion of a surface 54 defining the hollow interior portion 52 of the ring gear 46 is a plurality of ring gear teeth 56. As a non-limiting example, the plurality of ring gear teeth 56 on the ring gear 46 may be a plurality of hypoid gear teeth, spiral bevel gear teeth, helical gear teeth, spur gear teeth, double hypoid gear teeth, double spiral bevel gear teeth or double helical gear teeth.

As best seen in FIG. 3 of the disclosure and as a non-limiting example, a first plurality of planetary gear teeth 58 may circumferentially extend from at least a portion of the outer surface 34 of the first end portion 36 of the one or more planetary gears 30. At least a portion of the first plurality of planetary gear teeth 58 extend through one or more gear apertures 60 extending from the inner surface 10 to the outer surface 12 of the intermediate portion 18 of the carrier 8. The first plurality of planetary gear teeth 58 on the one or more planetary gears 30 are complementary to and meshingly engaged with the plurality of ring gear teeth 56 on the ring gear 46. It is within the scope of this disclosure and as a non-limiting example that the first plurality of planetary gear teeth 58 on the outer surface 34 of the first end portion 36 of the one or more planetary gears 30 may be a plurality of hypoid gear teeth, spiral bevel gear teeth, helical gear teeth, spur gear teeth, double hypoid gear teeth, double spiral bevel gear teeth or double helical gear teeth.

Circumferentially extending from at least a portion of the outer surface 34 of the second end portion 38 of the one or more planetary gears 30 of the planetary gear assembly 24 is a second plurality of planetary gear teeth 62. As best seen in FIGS. 1 2 and 5 of the disclosure and as a non-limiting example, at least a portion of second the plurality of planetary gear teeth 62 extend through the one or more gear apertures 60 in the carrier 8 of the planetary gear assembly 24. It is within the scope of this disclosure that the second plurality of planetary gear teeth 62 may extend through the same gear aperture 60 as the first plurality of planetary gear teeth 58 or through one or more different gear apertures (not shown). As a non-limiting example, the second plurality of planetary gear teeth 62 on the one or more planetary gears 30 may be a plurality of hypoid gear teeth, spiral bevel gear teeth, helical gear teeth, spur gear teeth, double hypoid gear teeth, double spiral bevel gear teeth or double helical gear teeth.

In accordance with the embodiment illustrated in FIGS. 1-3 and 5 as a non-limiting example, the one or more planetary gears 30 may further include an increased diameter portion 64. The increased diameter portion 64 of the one or more planetary gears 30 may circumferentially extend from at least a portion of the outer surface 34 of the intermediate portion 40 of the one or more planetary gears 30 of the planetary gear assembly 24. As best seen in FIG. 3 of the disclosure and as a non-limiting example, the increased diameter portion 64 of the one or more planetary gears 30 may separate the first plurality of planetary gear teeth 58 from the second plurality of planetary gear teeth 62 on the outer surface 34 of the one or more planetary gears 30. It is within the scope of this disclosure that the increased diameter portion 40 of the one or more planetary gears 30 may define a gap 66 between the ring gear 46 and the output gear 68 of the planetary gear assembly 24 and/or may provide rotational support for at least a portion of the one or more planetary gears 30.

As best seen in FIG. 3 of the disclosure, the first plurality of planetary gear teeth 58 on the first end portion 36 of the one or more planetary gears 30 have an outermost diameter D1. Additionally, as illustrated in FIG. 3 of the disclosure, the second plurality of planetary gear teeth 62 on the second end portion 38 of the one or more planetary gears 30 have an outermost diameter D2. Furthermore, as best seen in FIG. 3 of the disclosure, the increased diameter portion 64 on the intermediate portion 40 of the one or more planetary gears 30 has an outermost diameter D3. In accordance with an embodiment of the disclosure and as a non-limiting example, the diameter D3 may be substantially equal to or larger than the diameter D2 but larger than the diameter D1 of the one or more planetary gears 30. As a result, it is within the scope of this disclosure and as a non-limiting example that the diameter D1 of the first plurality of planetary gear teeth 58 may be smaller than the diameter D2 of the second plurality of planetary gear teeth 5862 of the one or more planetary gears 30 of the planetary gear assembly 24.

Extending outboard from at least a portion of the outer surface 12 of the second end 16 of the carrier 8 is a reduced diameter portion 69 having an inner surface 70 and an outer surface 72 defining a hollow portion 74 therein. The inner surface 70 of the reduced diameter portion 69 of the carrier 8 may have an engagement portion 76. As best seen in FIG. 2 of the disclosure and as a non-limiting example, the engagement portion 76 may have a plurality of circumferentially extending substantially flat surfaces. In accordance with an alternative embodiment of the disclosure (not shown), the engagement portion on the inner surface of the reduced diameter portion of the carrier may have a plurality of axially extending splines.

Disposed radially outboard from and extending co-axially with at least a portion of the carrier 8 and the one or more planetary gears 30 is the output gear 68 having an inner surface 80, an outer surface 82, a first end portion 84, a second end portion 86, a first end 88 and a second end 90. The inner surface 80 and the outer surface 82 of the output gear 68 of the planetary gear assembly 24 defines a hollow portion 92 therein. The hollow portion 92 of the output gear 68 may be of a size and shape to receive and/or retain at least a portion of the carrier 8 and the one or more planetary gears 30 of the planetary gear assembly 24.

Circumferentially extending from at least a portion of the inner surface 80 of the output gear 68 is a plurality of output gear teeth 94. The plurality of output gear teeth 94 on the inner surface 80 of the output gear 68 are complementary to and meshingly engaged with at least a portion of the second plurality of planetary gear teeth 62 on the second end portion 38 of the one or more planetary gears 30. As a result of this meshing engagement, the carrier 8 and the one or more planetary gears 30 are drivingly connected with the output gear 68 of the planetary gear assembly 24. It is within the scope of this disclosure and as a non-limiting example that the plurality of output gear teeth 94 on the output gear 68 may be a plurality of hypoid gear teeth, spiral bevel gear teeth, helical gear teeth, spur gear teeth, double hypoid gear teeth, double spiral bevel gear teeth or double helical gear teeth.

As best seen in FIGS. 1, 2 and 5 of the disclosure and as a non-limiting example, the output gear 68 may have an increased diameter portion 96 circumferentially extending from at least a portion of the outer surface 82 of the first end portion 84 of the output gear 68. In accordance with the embodiment of the disclosure illustrated in FIGS. 1, 2, and 5 and as a non-limiting example, the increased diameter portion 96 of the output gear 68 may include a biasing member groove 98 with a biasing member retention portion 99. The biasing member groove 98 may circumferentially extend along at least a portion of the increased diameter portion 96 of the output gear 68. Additionally, the biasing member retention portion 99 of the increased diameter portion 96 of the output gear 68 may have a size and a shape needed to receive and/or retain at least a portion of one or more first biasing members 124. It is to be understood that the biasing member retention portion 99 may be used in order to prevent the one or more first biasing members 124 from rotating when the actuation mechanism 1 and the parking mechanism 2 are in operation.

Extending outboard from at least a portion of the outer surface 82 of the second end 90 of the output gear 68 is a reduced diameter portion 100 having an inner surface 102 and an outer surface 104 defining a hollow portion 106 therein. The hollow portion 106 of the reduced diameter portion 100 of the output gear 68 may be of a size and shape to receive and/or retain at least a portion of the reduced diameter portion 69 of the carrier 8.

As best seen in FIGS. 1 and 5 of the disclosure and as a non-limiting example, at least a portion of a cam 108 may be disposed radially outboard form and connected to at least a portion of the output gear 68 of the planetary gear assembly 24. Additionally, as best seen in FIGS. 1 and 5 of the disclosure and as a non-limiting example the cam 108 may extend co-axially with at least a portion of the output gear 68, the carrier 8 and the one or more planetary gears 30 of the planetary gear assembly 24. The cam 108 illustrated in FIGS. 1, 4 and 5 and as a non-limiting example may have an outer surface 110, a first end portion 112, an intermediate portion 113, a second end portion 114, a first end 116 and a second end 118. It is to be understood that the actuation mechanism 1 is used in order to selectively rotate the cam 108. As the cam 108 rotates, it drives a parking pawl 120 into an out of engagement with a parking gear 174 in order to provide the parking lock function for the parking mechanism 2 described herein. Additionally, it is within the scope of this disclosure and as a non-limiting example that the cam 108 may be axially fixed to at least a portion of the output gear 68 of the planetary gear assembly 24, but may also be rotationally engaged with the output gear 68.

At least a portion of the intermediate portion 113 and/or the second end portion 114 of the cam 108 may have a first reduced diameter portion 115. It is within the scope if this disclosure and as a non-limiting example that the first reduced diameter portion 115 of the cam 108 may be substantially cylindrical in shape. As best seen in FIGS. 1 and 5 of the disclosure and as a non-limiting example, the first reduced diameter portion 115 of the cam 108 may have an outer diameter OD1.

In accordance with the embodiment illustrated in FIGS. 1 and 5 and as non-limiting example, at least a portion of the outer surface 110 of the first reduced diameter portion 115 of the cam 108 may include a bearing journal 117. It is within the scope of this disclosure and as a non-limiting example that the bearing journal 117 of the first reduced diameter portion 115 of the cam 108 may be machined, polished, ground, coated and/or heat treated in order to aid in reducing the amount friction between the cam 108 and one or more bearing assemblies 119 of the parking mechanism 2.

At least a portion of the one or more bearing assemblies 119 may be in direct contact with and disposed radially outboard from at least a portion of the outer surface 110 of the first reduced diameter portion 115 of the cam 108. As best seen in FIG. 5 of the disclosure and as a non-limiting example, at least a portion of the one or more bearing assemblies 119 are in direct contact with at least a portion of the bearing journal 117 of the cam 108. All of the loads that are experienced by the cam 108 of the parking mechanism 2 are transmitted back through the one or more appropriately sized bearing assemblies 119 illustrated in FIGS. 4 and 5 of the disclosure. As a result, it is to be understood that the one or more bearing assemblies 119 of the parking mechanism 2 aid in improving the overall life and durability of the parking mechanism 2. It is within the scope of this disclosure and as a non-limiting example that the one or more bearing assemblies 119 of the parking mechanism 2 may be one or more tapered roller bearings, rolling element bearings, needle bearings, magnetic bearings, cylindrical roller bearings and/or bushings.

Extending inboard from at least a portion of the first end 116 of the cam 108 and into at least a portion of the cam 108 is a first hollow interior portion 122. As best seen in FIGS. 1 and 5 of the disclosure and as a non-limiting example, the first hollow interior portion 122 of the cam 108 may be of a size and shape to receive and/or retain at least a portion of the output gear 68, the carrier 8, the one or more planetary gears 30 and/or the one or more first biasing members 124. In accordance with an embodiment of the disclosure and as a non-limiting example, the first hollow interior portion 122 of the cam 108 may also have a size and shape to receive and/or retain at least a portion of the increased diameter portion 96 of the output gear 68. It is within the scope of this disclosure and as a non-limiting example that the first hollow interior portion 122 of the cam 108 is may have a substantially cylindrical in shape.

The cam 108 may further include second hollow interior portion 126 that extends inboard from at least a portion of a second end 118 and into at least a portion of the can 108. As best seen in FIGS. 1 and 5 of the disclosure and as a non-limiting example, the second hollow interior portion 126 of the cam 108 may be of a size and shape to receive and/or retain at least a portion of the reduced diameter portion 100 of the output gear 68. Additionally, as best seen in FIGS. 1 and 5 of the disclosure and as a non-limiting example, at least a portion of the first hollow interior portion 122 of the cam 108 may be connected to and in communication with the second hollow interior portion 126 of the cam 108.

In accordance with the embodiment illustrated in FIG. 1 of the disclosure and as a non-limiting example, the first hollow interior portion 122 of the cam 108 may have a diameter D4 and the second hollow interior portion 126 of the cam 108 may have a diameter D5. It is within the scope of this disclosure and as a non-limiting example that the diameter D5 of the second hollow interior portion 126 of the cam 108 may be less than the diameter D4 of the first hollow interior portion 122 of the cam 108.

As best seen in FIGS. 1 and 5 of the disclosure and as a non-limiting example, the cam 108 may further include a wall portion 128 that connects the first hollow interior portion 122 of the cam 108 to the second hollow interior portion 126 of the cam 108. Circumferentially extending along at least a portion of the wall portion 128 of the cam 108 is a biasing member groove 130. It is within the scope of this disclosure and as a non-limiting example that the biasing member groove 130 in the wall portion 128 of the cam 108 may be of a size and shape to receive and/or retain at least a portion of the one or more first biasing members 124 of the parking mechanism 2.

When assembled, at least a portion of the one or more first biasing members 124 are disposed within the first hollow interior portion 122 of the cam 108 of the parking mechanism 2. As best seen in FIGS. 1 and 5 of the disclosure and as a non-limiting example, at least a portion of a first end portion 132 of the one or more first biasing members 124 may be disposed within at least a portion of the biasing member groove 98 in the increased diameter portion 96 of the output gear 68. Additionally, as best seen in FIGS. 1 and 5 and as a non-limiting example, at least a portion of a second end portion 134 of the one or more first biasing members 124 may be disposed within at least a portion of the biasing member groove 130 in the wall portion 128 of the cam 108. It is within the scope of this disclosure and as a non-limiting example that the one or more first biasing members 124 may be one or more torsion springs.

Figure 4:
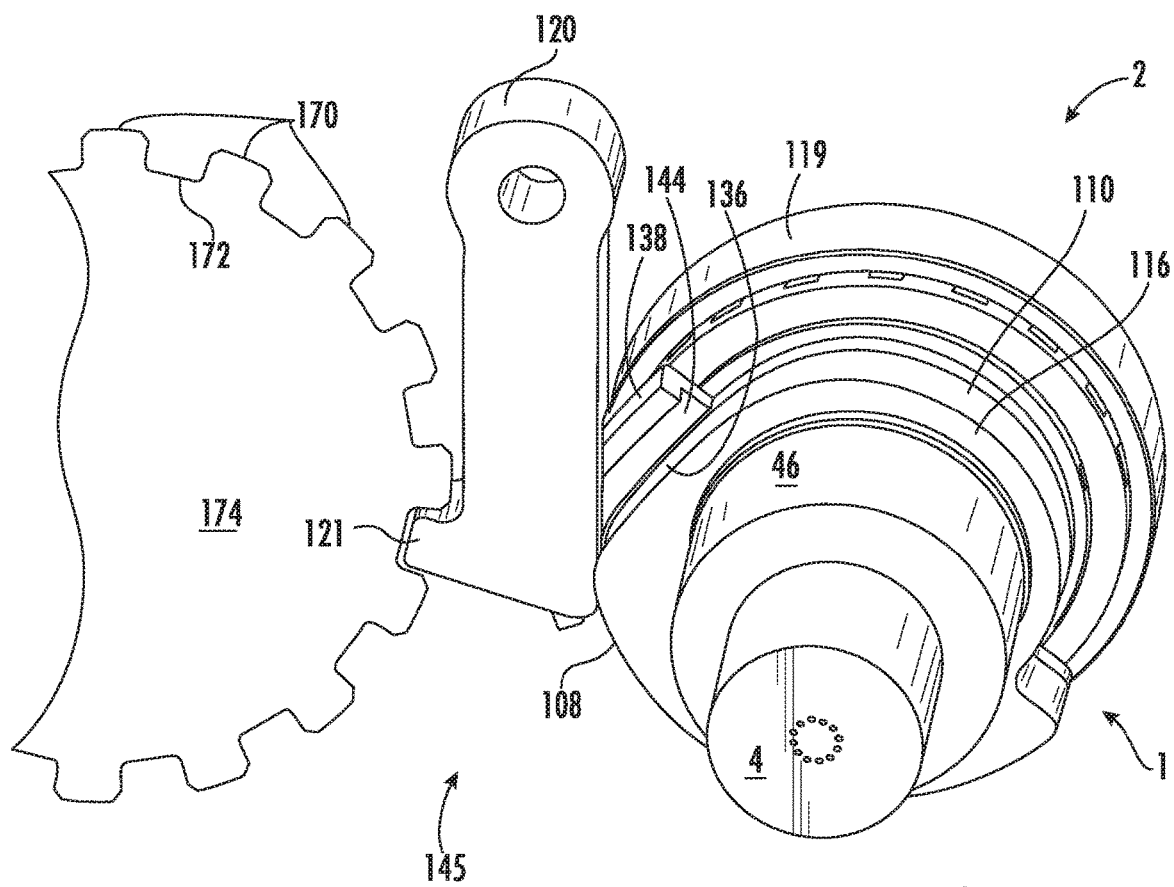
FIG. 4 is a schematic perspective view of the parking mechanism according to the embodiment of the disclosure illustrated in FIGS. 1 and 2.

As best seen in FIG. 1 of the disclosure and as a non-limiting example, the first end portion 112 of the cam 108 may have a radius R1 extending from a centerline C1 of the parking mechanism 2 and a radius R2 extending from the centerline C1 of the parking mechanism 2. In accordance with an embodiment of the disclosure and as a non-limiting example, the radius R1 of the cam 108 may be less than the radius R2 of the cam 108. As best seen in FIG. 4 and as a non-limiting example, one or more substantially flat connecting portions 136 may be used in order to connect the portion of the cam 108 having the radius R1 to the portion of the cam 108 having the radius R2. As a result, it is therefore to be understood that the outer periphery of the first end portion 112 of the cam 108 may have an irregular shape.

In accordance with the embodiment illustrated in FIG. 5 and as a non-limiting example, the cam 108 may further include a second reduced diameter portion 163. At least a portion of the second reduced diameter portion 163 of the cam 108 may be interposed between the one or more bearing assemblies 119 and the portion of the cam 108 having the radii R1 and R2. The second reduced diameter portion 163 of the cam 108 may have an outer diameter OD2 that is larger than the outer diameter OD1 of the first reduced diameter portion 115 of the cam 108. According to the embodiment illustrated in FIG. 5 and as a non-limiting example, when the parking mechanism 2 is assembled, at least a portion of the one or more bearing assemblies 119 may be in direct contact with at least a portion of the second reduced diameter portion 163 and at least a portion of the outer surface 110 of the first reduced diameter portion 115 of the cam 108.

Circumferentially extending from at least a portion of the outer surface 110 of the cam 108 is a protruding portion 138 having a first side 140 and a second side 142. In accordance with the embodiment illustrated in FIG. 4 and as a non-limiting example, the protruding portion 138 of the cam 108 extends radially outboard from at least a portion of the one or more substantially flat connecting portions 136 and the portion of the cam 108 having the radius R2. It is within the scope of this disclosure and as a non-limiting example that the portion of the cam having the radius R2 may define a stroke zone that drives the parking pawl 120 into engagement with the parking gear 172 of the parking mechanism 2.

A parking pawl groove 144 may circumferentially extend along at least a portion of the first side 140 of the protruding portion 138 of the cam 108. The parking pawl groove 144 may have a size and shape to receive and/or retain at least a portion of a dog 146 of the parking pawl 120. As best seen in FIGS. 1 and 2 of the disclosure and as a non-limiting example, at least a portion of the dog 146 extends outboard from at least a portion of the parking pawl 120. It is to be understood that the parking pawl groove 144 of the cam 108 may aid in preventing any inadvertent and unintentional engagement or disengagement of the parking mechanism 2 due to sudden shock loads experience by the vehicle (not shown) when in operation.

As the one or more motors 4 drive the one or more planetary gears 30, the output gear 68 rotates the cam 108 which in turn drives the parking pawl 120 into and out of engagement with the parking gear 174 of the parking mechanism 2. It is to be understood that when the parking mechanism 2 is in an engaged position 145 illustrated in FIG. 4, the dog 146 is in direct contact with at least a portion of the protruding portion 138 of the cam 108 and/or at least a portion of the parking pawl 120 is in direct contact with the portion of the cam 108 having the radius R2. As a result, when the parking mechanism 2 is in a disengaged position (not shown) at least a portion of the parking pawl 120 is in direct contact with at least a portion of the cam 108 having the radius R1.

In accordance with an embodiment of the disclosure and as a non-limiting example, the parking mechanism 2 may further include the use of a biasing member (not shown) that is connected to at least a portion of the parking pawl 120. The biasing member (not shown) applies an amount of force onto the parking pawl 120 necessary in order to ensure that at least a portion of the parking pawl 120 is in direct contact with at least a portion of the of the cam 108 of the parking mechanism 2 when in operation. As a result, it is to be understood that the biasing member (not shown) ensures a continual engagement of the parking pawl 120 with the cam 108 at all times. Additionally, it is to be understood that the biasing member (not shown) aids in preventing one or more teeth 121 of the parking pawl 120 from inadvertently and unintentionally engaging one or more teeth 170 circumferentially extending from at least a portion of an outer surface 172 of a parking gear 174 due to sudden shock loads experienced by the vehicle (not shown). As a non-limiting example, the biasing member (not shown) may be a spring such as but not limited to a torsion spring or a compression spring.

Extending co-axially with and selectively engagable with at least a portion of the output gear 68 of the planetary gear assembly 24 is a connect and disconnect member 148 having an outer surface 150, a first end portion 152 and a second end portion 154. The connect and disconnect member 148 allows the parking pawl 120 to be selectively engaged and disengaged with the parking gear 174 of the parking mechanism 2. As illustrated in FIG. 1 of the disclosure and as a non-limiting example, at least a portion of the connect and disconnect member 148 may be received and/or retained within at least a portion of the hollow portion 106 of the reduced diameter portion 100 of the output gear 68 and the hollow portion 74 of the reduced diameter portion 69 of the carrier 8. It is within the scope of this disclosure and as a non-limiting example that the connect and disconnect member 148 may always be retained within the hollow portions 74 and 106 of the parking mechanism 2 or may be selectively inserted and/or removed from the parking mechanism 2 and used as needed. Additionally, it is within the scope of this disclosure that the connect and disconnect member 148 may be a small hand tool such as but not limited to a screwdriver or a hand crank.

In accordance with an alternative embodiment of the disclosure (not shown) and as a non-limiting example, the connect and disconnect member 148 may be replaced with an actuator or an electric motor that may be activated from a safe or a remote location during emergency situations.

At least a portion of the first end portion 152 of the connect and disconnect member 148 may include an engagement portion 156 that is complementary to and selectively engagable with the engagement portion 76 on the inner surface 70 of the reduced diameter portion 69 of the carrier 8. It is therefore within the scope of this disclosure that the engagement portion 156 may include a plurality of circumferentially extending substantially flat surfaces or a plurality of axially extending splines. It is to be understood that the engagement portions 76 and 156 of the parking mechanism 2 may take any shape that will allow the transmission of an amount of force from the connect and disconnect member 148 to the carrier 8 of the parking mechanism 2.

Extending radially outboard from at least a portion of the outer surface 150 of the second end portion 154 of the connect and disconnect member 148 is a second engaging portion 158. By rotating the second engaging portion 158 of the connect and disconnect member 148 either clock-wise or counter-clockwise, the connect and disconnect member 148 can selectively engage or disengage the parking pawl 120 with the parking gear 174 of the parking mechanism 2. According to an embodiment of the disclosure and as a non-limiting example, the second engaging portion 158 of the connect and disconnect member 148 may be selectively rotated manually by an operator (not shown). This will allow the parking mechanism 2 to be engaged or disengaged when the vehicle (not shown) is broke down or when the vehicle (not shown) is not turned on. Additionally, this will allow the parking mechanism 2 to be disengaged manually when the parking mechanism 2 is functioning improperly. In accordance with an alternative embodiment of the disclosure and as a non-limiting example, the second engaging portion 158 of the connect and disconnect member 148 may be selectively rotated by an actuation mechanism (not shown) or a motor (not shown).

It is within the scope of this disclosure and as a non-limiting example that the parking mechanism 2 may further include the use of a circuit board 160. As best seen in FIGS. 1 and 5 of the disclosure, at least a portion of the circuit board 160 may be disposed within the gap 66 between the output gear 68 and the ring gear 46 of the parking mechanism 2. The circuit board 160 may be in electrical communication with the parking mechanism 2, one or more sensing members (not shown), a control unit (not shown), an electronic control unit (not shown) and/or a vehicle communication bus (not shown) of the vehicle (not shown). As a non-limiting example, the parking mechanism 2 may include the use of one or more sensing members (not shown) that are capable of accurately sensing and/or monitoring the engagement of the parking pawl 120, the disengagement of the parking pawl 120, the location of the parking pawl 120, the location of the head of the parking pawl 120, the rotational speed of the one or more motors 4, the rotational speed of the parking gear 174, the rotational speed of the cam 108, the position of the output gear 68, the position of the cam 108, the grade of the road the vehicle (not shown) is on and/or the operational characteristics of the parking mechanism 2.

It is within the scope of this disclosure and as a non-limiting example that the parking gear 174 of the parking mechanism 2 may be drivingly connected to a shaft of an electric drive unit (not shown) of an axle assembly (not shown), a wheel end assembly (not shown) and/or any other shaft (not shown) located within the drive-line (not shown) of the vehicle (not shown).

As previously indicated, the present disclosure further includes various methods of operating the actuation mechanism 1 and the parking mechanism 2 described herein. It is to be understood that the parking mechanism 2 described herein may be able to operate in an engaged not blocked state, an engaged blocked state, a disengaged not pinched state and a disengaged pinched state.

When the parking mechanism 2 is in the engaged not blocked state, the vehicle (not shown) sends a signal to the parking mechanism 2 to rotate the cam 108 thereby transitioning the parking pawl 120 toward and into engagement with the one or more teeth 170 of the parking gear 174. An amount of power is then applied by the one or more motors 4 in the engagement direction thereby rotating the gears of the planetary gear assembly 24 in the engagement direction. At this point, a start motor position sensor (not shown) may then be opened. The one or more planetary gears 30 of the planetary gear assembly 24 then drive the output gear 68, which in turn rotates the cam 108 moving the parking pawl 120 of the parking mechanism 2. A disengaged parking pawl sensor (not shown) may then be opened signaling that the parking pawl 120 is in motion. When the parking pawl 120 is on the portion of the cam 108 with the larger radius R2, the motor end of stroke sensor (not shown) opens to signal the shut-off of the one or more motors 4 of the parking mechanism 2. Once the parking pawl 120 is engaged with the parking gear 174, a parking pawl position sensor (not shown) is closed to provide the vehicle (not shown) with a truth in shifting signal. The truth in shifting signal provides the vehicle (not shown) with a positive indication that the parking pawl 120 has been successfully engaged with the parking gear 174. As previously discussed, the non-back drivable planetary gear assembly 24 aids in keeping the parking pawl 120 in the engaged position 145. It is within the scope of this disclosure and as a non-limiting example that when the parking mechanism 2 is in the engaged not blocked state, there is no biasing load on the cam 108 thereby preventing any unwanted and inadvertent disengagement of the parking pawl 120 from the parking gear 174.

In the engaged blocked state, the vehicle (not shown) sends a signal to the parking mechanism 2 to engage the parking pawl 120 with the parking gear 174. An amount of power is then applied by the one or more motors 4 in the engagement direction which rotates the gears of the planetary gear assembly 24 in the engagement direction. At this point, the start motor sensor (not shown) is opened. In the engaged blocked state, at least a portion of the parking pawl 120 is in contact with at least a portion of the parking gear 174 before the parking pawl 120 is in contact with at least a portion of the cam 108 having the radius R2. As a result, this prevents the cam 108 of the parking mechanism 2 from being rotated any further. In this position the parking pawl position sensor (not shown) sends a signal to the vehicle (not shown) indicating that the parking pawl 120 is in transition. The one or more motors 4 then continue to drive the planetary gear assembly 24, which in turn loads the one or more first biasing members 124 with an amount of energy. When end of stroke sensor (not shown) opens, it turns off the one or more motors 4 of the parking mechanism 2 preventing it from rotating any further. At this point in the engaged blocked state, the parking pawl position sensor (not shown) is still sending a signal to the vehicle (not shown) that the parking pawl 120 is in transition or not engaged with the parking gear 174. Once the blocked state is resolved, the energy loaded within the one or more first biasing members 124 rotates the cam 108 which drives the parking pawl 120 into engagement with the parking gear 174 of the parking mechanism 2. Once in this position, the parking pawl position sensor (not shown) then sends a signal to the vehicle (not shown) indicating that the parking pawl 120 has been successfully engaged with the parking gear 174 of the parking mechanism 2.

When the parking mechanism 2 is in the disengaged not pinched state, the vehicle (not shown) sends a signal to the parking mechanism 2 to disengage the parking pawl 120 from engagement with the parking gear 174. An amount of power is then applied to the one or more motors 4 in the disengagement direction which in turn drives the gears of the planetary gear assembly 24 in the disengagement direction. At this point the end of stroke sensor (not shown) is opened signaling that the parking pawl 120 is in transition or not engaged with the parking gear 174. The output gear 68 of the planetary gear assembly 24 then rotates the cam 108 allowing the biasing member (not shown) to disengage the parking pawl 120 from the parking gear 174 of the parking mechanism 2. At this stage, the pawl position sensor (not shown) opens signaling the vehicle (not shown) that the parking pawl 120 is in motion. When the parking pawl 120 is on the portion of the cam 108 having the smaller radius R1, the parking pawl position sensor (not shown) sends a signal to the one or more motors 4 to turn the one or more motors 4 off and prevent it from rotating any further. The pawl position sensor (not shown) then closes indicating that the parking pawl 120 has been successfully disengaged from the parking gear 174.

In the disengaged pinched state, the parking mechanism 2 performs the same steps as previously described in relation to the disengaged not pinched condition, except the parking pawl 120 is designed such that when the vehicle (not shown) is parked on a pre-determined road grade, the parking pawl 120 is forced out of engagement with the parking gear 174. The parking pawl 120 is forced out of engagement with the parking gear 174 by the biasing member (not shown) in contact with the parking pawl 120 and the angles between the one or more teeth 121 of the parking pawl 120 and the one or more teeth 170 on the outer surface 172 of the parking gear 174.

It is within the scope of this disclosure and as a non-limiting example that the parking mechanism 2 may rotate in a pre-determined ratio relative to the rotational speed of the tires (not shown) of the vehicle (not shown). As a result, in accordance with this embodiment of the disclosure, the parking mechanism 2 is allowed to move in a ratcheting manner along the parking gear 174 until the parking gear 174 reaches a pre-determined rotational speed. Once the parking gear 174 reaches the pre-determined rotational speed, the parking pawl 120 will be allowed to engage the parking gear 174 of the parking mechanism 2.

Additionally, it is within the scope of this disclosure and as a non-limiting example that the vehicle (not shown) may send a signal to the parking mechanism 2, once the parking pawl 120 has been manually engaged or disengaged with the parking gear 174, the parking mechanism 2 will transition to the required position once power has been restored to the vehicle (not shown). This signal may be automatically sent to the parking mechanism 2 upon the restoration of the power to the vehicle (not shown) or manually by the vehicle operator (not shown) once power has been restored to the vehicle (not shown).

As previously discussed, it is within the scope of this disclosure that the parking mechanism 2 may include one or more sensing members (not shown) capable of sensing and/or monitoring the operational characteristics of the parking mechanism 2. These one or more sensing members (not shown) may be operably configured in order to collect data relating to the amount of time to engage the parking mechanism 2, the amount of time to disengage the parking mechanism 2, the operating temperature of the parking mechanism 2, the number of lock and unlock cycles the parking mechanism 2 has performed, the amount of current supplied to the parking mechanism 2 and/or the amount of current draw by the parking mechanism 2. This data may then be sent to one or more data processors (not shown) of the electronic control unit (not shown) and or the control unit (not shown) for analysis to determine if a failure has occurred within the parking mechanism 2 and/or to identify which component in the parking mechanism 2 has failed. Once a failure in the parking mechanism 2 has been determined, a signal may be sent to the operator of the vehicle (not shown) informing the operator (not shown) that maintenance is required. Additionally, this data collected may be analyzed by the one or more data processors (not shown) of the engine control unit (not shown) and/or the control unit (not shown) of the vehicle (not shown) to predict when the parking mechanism 2 will likely experience a failure. When a failure of the parking mechanism 2 is predicted to occur within a pre-determined amount of time, a signal may be sent to the vehicle operator (not shown) informing the operator (not shown) when the parking mechanism 2 will require maintenance. This will allow the vehicle operator (not shown) to plan vehicle maintenance at a time that is convenient and will cause a limited amount of down time for the vehicle (not shown).

According to an alternative embodiment of the disclosure, the data collected by one or more sensing members (not shown) may be analyzed by one or more data processors (not shown) that are onboard the parking mechanism 2. As a result, it is within the scope of this disclosure that the parking mechanism 2 may be configured in order to determine if a failure has occurred within the parking mechanism 2, to identify which component in the parking mechanism 2 has failed and/or to predict when a failure may occur within the parking mechanism 2 itself.

Figure 6:
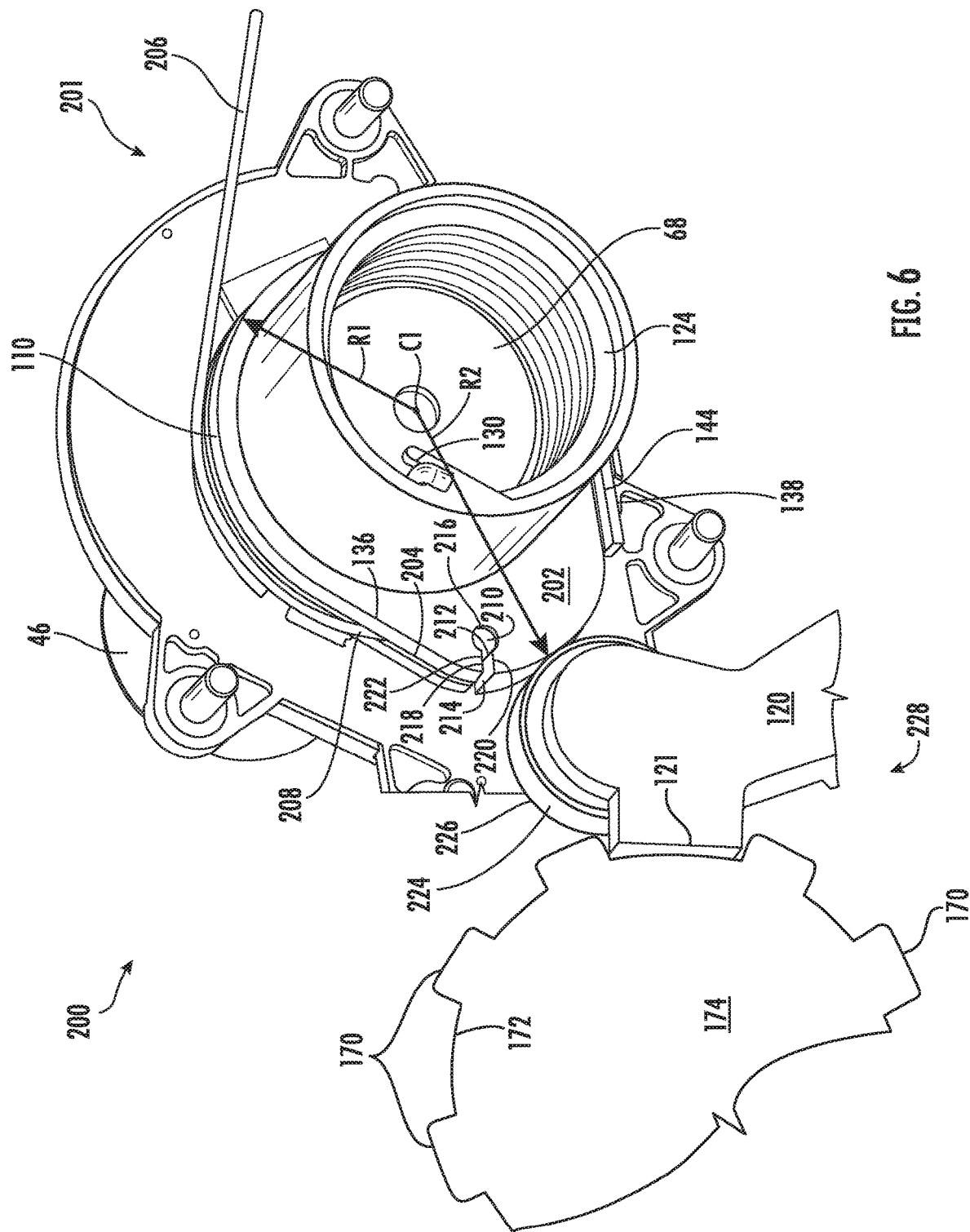
FIG. 6 is a schematic perspective view of a portion of the actuation mechanism of the parking mechanism illustrated in FIGS. 1, 2, 4 and 5 according to an alternative embodiment of the disclosure.

FIG. 6 is a perspective view of a portion of a parking mechanism 200 according to an alternative embodiment of the disclosure. The parking mechanism 200 illustrated in FIG. 5 is the same as the parking mechanism 2 illustrated in FIGS. 1-5, except where specifically noted below. In accordance with the embodiment of the disclosure illustrated in FIG. 6 and as a non-limiting example the parking mechanism 200 includes a connect and disconnect mechanism 201.

The connect and disconnect mechanism 201 of the parking mechanism 200 allows for the selective rotation of the cam 202 illustrated in FIG. 6 between an engaged position 228 and a disengaged position. As illustrated in FIG. 6 of the disclosure and as a non-limiting example, when the parking mechanism 200 is in the engaged position, the cam 202 drives the parking pawl 120 toward the parking gear 174 until the one or more teeth 121 of the parking pawl 120 is meshingly engaged with the one or more teeth 170 of the parking gear 174. As a result, when the connect and disconnect mechanism 201 is in the engaged position 228 illustrated in FIG. 6, the parking pawl 120 is providing the parking lock function of the parking mechanism 200. When the connect and disconnect mechanism 201 is disengaged position (not shown), the one or more teeth 121 of the parking pawl 120 is not meshingly engaged with the one or more teeth 170 of the parking gear 174. As a result, when the connect and disconnect mechanism 201 is in the disengaged position, the parking pawl 120 is not providing the parking mechanism 200 with a parking lock function.

As illustrated in FIG. 6 of the disclosure and as a non-limiting example, the parking mechanism 200 includes a cam 202 having a cam actuating member 206 operably connected to at least a portion cam 202. The cam actuating member 206 selectively rotates the cam 202 of the parking mechanism so as to transition the cam 202 between the engaged position 228 and the disengaged position (not shown). It is within the scope of this disclosure and as a non-limiting example that the cam actuating member 206 o the parking mechanism 200 may be a cable member, a belt member, a gear set, a chain member and/or a cog wheel.

In accordance with the embodiment of the disclosure illustrated in FIG. 6 and as a non-limiting example, the cam 202 of the parking mechanism 200 has a groove 204 circumferentially extending along at least a portion of the outer surface 110 of the cam 202. In accordance with the embodiment of the disclosure illustrated in FIG. 6 and as a non-limiting example, the groove 204 extends along at least a portion of the cam 202 having the radius R1, at least a portion of the cam 202 having the radius R2 and/or at least a portion of the one or more substantially flat connecting portions 136 of the cam 202.

The groove 204 of the cam 202 of the parking mechanism 200 is of a size and shape to receive and/or retain at least a portion of the cam actuating member 206 having a first end portion 208 and a second end portion (not shown). It is within the scope of this disclosure and as a non-limiting example that at least a portion of the second end portion (not shown) of the cam actuating member 206 may be located within the cab of the vehicle (not shown), the trunk of the vehicle (not shown), the glovebox of the vehicle (not shown) and/or located under the chassis of the vehicle (not shown). Connected to at least a portion of the first end portion 208 of the cam actuating member 206 of the connect and disconnect mechanism 201 is a cable retaining member 210. As illustrated in FIG. 6 of the disclosure and as a non-limiting example, the cable retaining member 210 of the connect and disconnect mechanism 201 is a substantially cylindrical member that extends substantially perpendicular to at least a portion of the first end portion 208 of the cam actuating member 206. In accordance with the embodiment of the disclosure illustrated in FIG. 6 and as a non-limiting example, at least a portion of the first end portion 208 of the of the cam actuating member 206 of the parking mechanism 200 may be received and/or retained within at least a portion of a groove (not shown) circumferentially extending along at least a portion of the outer surface 214 of the cable retaining member 210.

As illustrated in FIG. 6 of the disclosure and as a non-limiting example, at least a portion of the cable retaining member 210 and/or the cam actuating member 206 of the parking mechanism 202 is disposed and/or retained within at least a portion of a cable retaining member aperture 214 having an inboard portion 216, an outboard portion 218, a first side 220 and a second side 222. In accordance with the embodiment of the disclosure illustrated in FIG. 6 and as a non-limiting example, at least a portion of the groove 204 on the outer surface 110 of the cam 202 extends to the second side 222 of the cable retaining member aperture 214 in the cam 202 of the parking mechanism 200. According to the embodiment of the disclosure illustrated in FIG. 6 and as a non-limiting example the inboard portion 216 of the cable retaining member aperture 214 is substantially cylindrical in shape and at least a portion of the outboard portion 218 of the cable retaining member aperture is substantially rectangular in shape. The substantially cylindrical portion of the cable retaining member aperture 214 is of a size and shape to receive and/or retain at least a portion of the cable retaining member 210 on the first end portion 308 of the cam actuating member 206 of the parking mechanism 200. The substantially rectangular portion of the cable retaining member aperture 214 is of a size and shape to receive and/or retain at least a portion of the cam actuating member 206 of the connect and disconnect mechanism 201 of the parking mechanism 200. Additionally, the substantially rectangular portion of the cable retaining member groove 214 is of a size and shape to prevent the cable retaining member 210 from coming out of the substantially cylindrical portion of the cable retaining member aperture 214.

Rotationally connected to at least a portion of the parking pawl 120 of the parking mechanism 200 is a rolling member 224 having an outer surface 226. As illustrated in FIG. 6 of the disclosure and as a non-limiting example, at least a portion of the rolling member 224 of the parking pawl 120 is in direct contact with at least a portion of the cam 202 of the parking mechanism 200. The rolling member 224 of the parking pawl 120 aids in reducing the overall amount of friction between the cam 202 and the parking pawl 120 when in operation, thereby increasing the overall life and durability of the parking mechanism 200.

In order to selectively transition the connect and disconnect mechanism 201 of the parking mechanism 200 between the engaged position 228 and disengaged position (not shown), at least a portion of the first end portion (not shown) of the cam actuating member 206 is acted upon by the operator of the vehicle (not shown). When the first end portion (not shown) of the cam actuating member 206 is pulled, it causes the cam 202 to rotate thereby transitioning the connect and disconnect mechanism 201 from the disengaged position (not show) to the engaged position 228 illustrated in FIG. 6 of the disclosure. As the cam 202 rotates, the parking pawl 120 is translated toward the parking gear 174 until the one or more teeth 121 of the parking pawl 120 is meshingly engaged with the one or more teeth 170 of the parking gear 174. When the cam 202 is rotated by pulling on the cam actuating member 206 of the connect and disconnect mechanism 201, the biasing member is loaded with an amount of energy. When the cam actuating member 206 of the connect and disconnect mechanism 201 is released, the energy loaded within the one or more first biasing members 124 of the parking mechanism 200 is released causing the cam 202 to rotate thereby transitioning the connect and disconnect mechanism 201 from the engaged position 228 to the disengaged position (not shown).

It is within the scope of this disclosure and as a non-limiting example that the connect and disconnect mechanism 201 of the parking mechanism 200 may be selectively transitioned between the engaged position 228 and disengaged position (not shown) when the vehicle (not shown) is in an emergency situation, in a towing situation, in a maintenance situation and/or in a repair situation.

According to an embodiment of the disclosure (not shown), at least a portion of the cam actuating member 206 of the connect and disconnect mechanism 201 may be connected to an engagement retention mechanism (not shown). The engagement retention mechanism (not shown) ensures that the amount of force exerted onto the cam actuating member 206 to rotate the cam 202 into the engagement position 228 illustrated in FIG. 6 is not inadvertently released. When it is desired to transition the connect and disconnect mechanism 201 to the disengaged position (not shown), the engagement retention mechanism (not shown) will release the cam actuating member 206 and will allow the cam 202 to freely rotate and transition into the disengaged position (not shown). As a result, the engagement retention mechanism (not shown) aids in improving the overall safety related to the operation and the engagement of the parking pawl 120 with the parking gear 174 of the parking mechanism 200.

According to an alternative embodiment of the disclosure, when the connect and disconnect mechanism 201 of the parking mechanism 200 is in the engaged position 228 illustrated in FIG. 6 of the disclosure, the operator of the vehicle (not shown) may act upon at least a portion of the first end portion (not shown) of the cam actuating member 206. When the first end portion (not shown) of the cam actuating member 206 is pulled by the operator (not shown), it causes the cam 202 of the parking mechanism to rotate thereby transitioning the connect and disconnect mechanism 201 from the engaged position 228 to the disengaged position (not shown). As the cam 202 rotates, the parking pawl 120 is translated away from the parking gear 174 until the one or more teeth 121 of the parking pawl 120 is not meshingly engaged with the one or more teeth 170 of the parking gear 174. It is to be understood that when the cam 202 is rotated by pulling on the cam actuating member 206 of the connect and disconnect mechanism 201, the biasing member is loaded with an amount of energy. When the cam actuating member 206 of the connect and disconnect mechanism 201 is released, the energy loaded within the one or more first biasing members 124 of the parking mechanism 200 is released causing the cam 202 to rotate thereby transitioning the connect and disconnect mechanism 201 from the disengaged position (not shown) to the engaged position 228.

It is within the scope of this disclosure and as a non-limiting example that at least a portion of the cam actuating member 206 of the connect and disconnect mechanism 201 may be connected to the engagement retention mechanism (not shown). The engagement retention mechanism (not shown) ensures that the amount of force exerted onto the cam actuating member 206 to rotate the cam 202 into the disengagement position (not shown) is not inadvertently released. When it is desired to transition the connect and disconnect mechanism 201 to the engaged position 228, the engagement retention mechanism (not shown) will release the cam actuating member 206 and will allow the cam 202 to freely rotate and transition back into the engaged position 228. As a result, the engagement retention mechanism (not shown) aids in improving the overall safety related to the operation and the disengagement of the parking pawl 120 with the parking gear 174 of the parking mechanism 200.

In accordance with an alternative embodiment of the disclosure (not shown), at least a portion of the first end portion (not shown) of the cam actuating member 206 may be acted upon by a motor (not shown) and/or actuator (not shown) in order to transition the cam 202 between the engaged position 228 and the disengaged position (not shown). Upon receiving an instruction from the operator of the vehicle (not shown) to transition the cam 202 into the engaged position 228, the motor (not shown) and/or the actuator (not shown) will apply an amount of force onto the cam actuating member 206 needed to rotate the cam 202 and engage the parking pawl 120 with the parking gear 174. Upon receiving an instruction from the operator of the vehicle (not shown) to transition the cam 202 into the disengaged position (not shown), the motor (not shown) and/or vehicle (not shown) will release the cam actuating member 206 and will allow the energy loaded within the one or more first biasing members 124 to rotate the cam 202 back into the disengaged position (not shown).

FIGS. 7-11 provide a schematic illustration of an actuation mechanism 301 and a parking mechanism 300 according to another embodiment of the disclosure. The parking mechanism 300 illustrated in FIGS. 7-11 of the disclosure is the same as the parking mechanisms 2 and 200 illustrated in FIGS. 1-6, except where specifically noted below. In accordance with the embodiment of the disclosure illustrated in FIG. 7-11 and as a non-limiting example, the parking mechanism 300 includes a carrier 302 having a first portion 304 that is connected to at least a portion of a second portion 306 of the carrier 302. The carrier 302 extends co-axially with and is of a size and shape to receive and/or retain at least a portion of the one or more planetary gears 30 of the parking mechanism 300.

Figure 8:
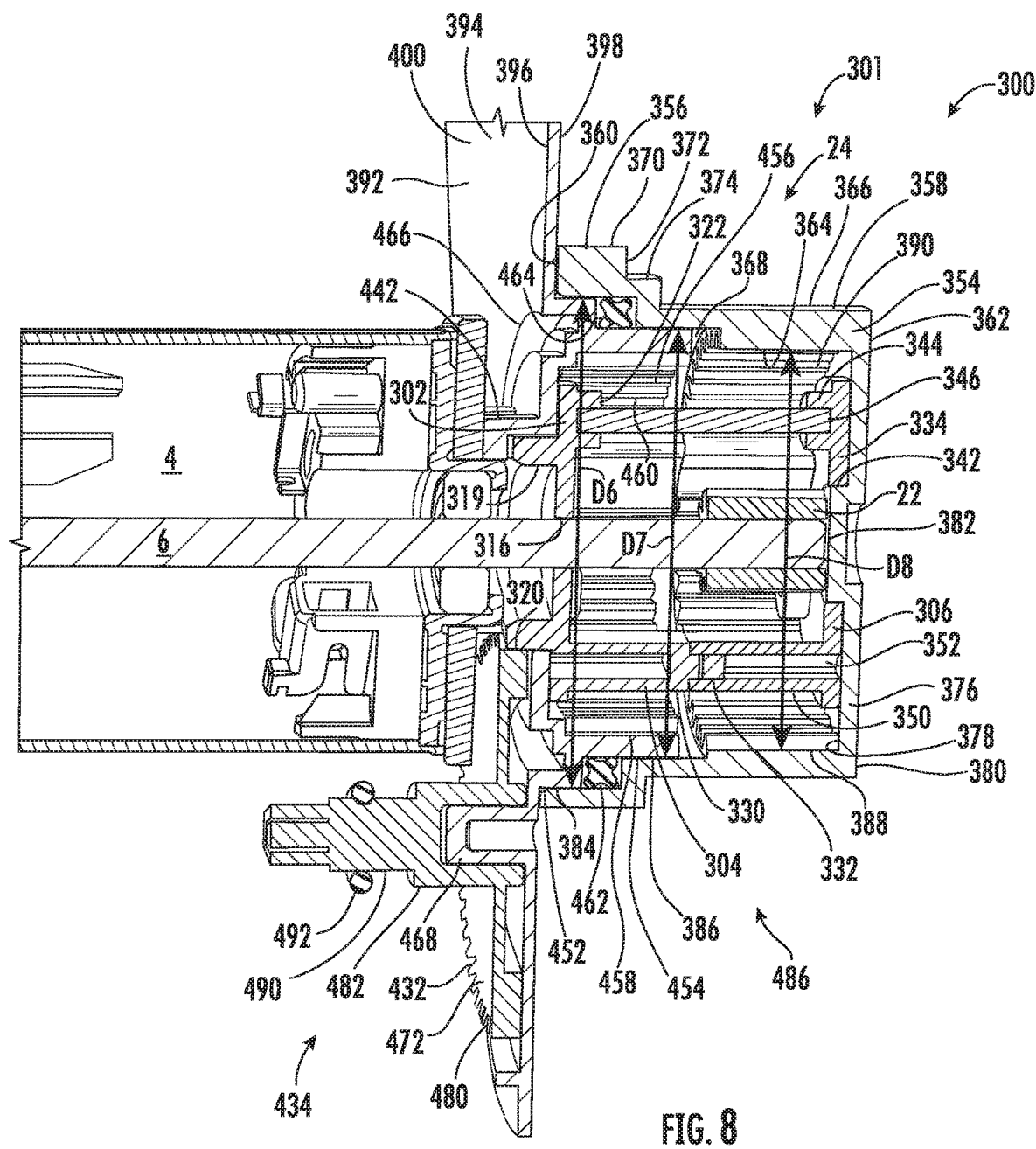
FIG. 8 is a schematic cross-sectional side-view of a portion of the actuation mechanism of the parking mechanism illustrated in FIG. 7 of the disclosure.

As best seen in FIGS. 8 and 9 of the disclosure and as a non-limiting example the first portion 304 of the carrier 302 includes a base portion 308 having a first end 310, a second end 312 and an outer surface 314. It is within the scope of this disclosure and as a non-limiting example that the base portion 308 of the first portion 304 of the carrier 302 may be substantially disc-shaped. Extending from the first end 310 to the second end 312 of the base portion 308 of the first portion 304 of the carrier 302 is a motor output shaft aperture 316. The motor output shaft aperture 316 of the first portion of the carrier 302 is of a size and shape to receive and/or retain at least a portion of the motor output shaft 6 of the one or more motors 4.

Figure 7:
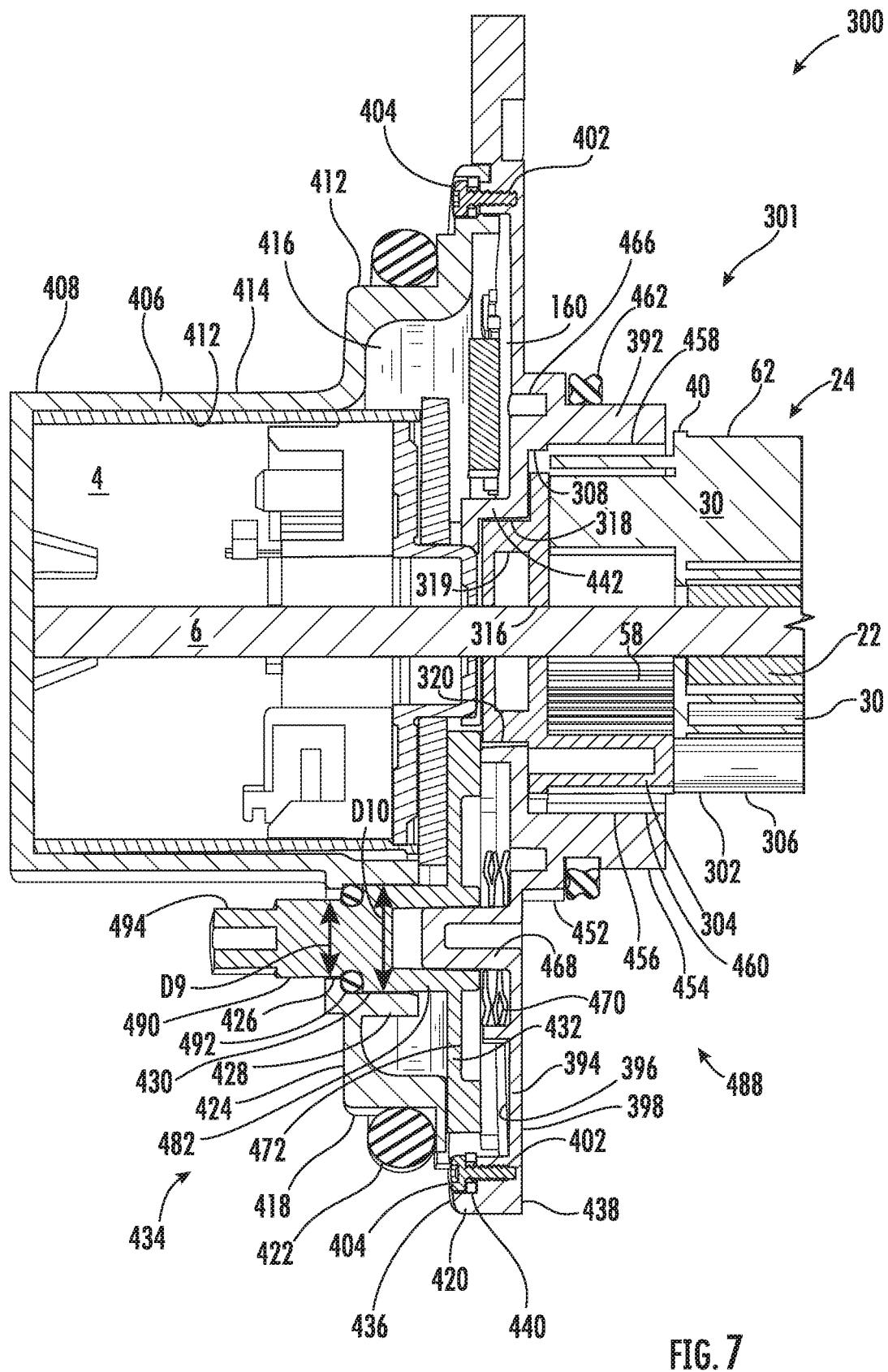
FIG. 7 is a schematic cross-sectional side-view of a portion of the actuation mechanism and parking mechanism illustrated in FIGS. 1, 2, 4 and 6 according to another embodiment of the disclosure.

Extending outboard from at least a portion of the first end 310 of the base portion 308 of the first portion 304 of the carrier 302 is a carrier gear portion 318. As best seen in FIGS. 7 and 8 of the disclosure, the carrier gear portion 318 extends co-axially with the carrier 302. Additionally, as best seen in FIGS. 7 and 8 of the disclosure, the carrier gear portion 318 of the carrier 302 includes a hollow interior portion 319. The hollow interior portion 319 of the carrier gear portion 318 of the carrier 302 is of a size and shape to receive and/or retain at least a portion of the motor output shaft 6. Circumferentially extending from at least a portion of the outer surface 314 of the carrier gear portion 318 of the first portion 304 of the carrier 302 is a plurality of carrier gear teeth 320. As a non-limiting example the plurality of carrier gear teeth 320 on the outer surface 314 of the carrier gear portion 318 of the carrier 302 are a plurality of hypoid gear teeth, spiral bevel gear teeth, helical gear teeth, spur gear teeth, double hypoid gear teeth, double spiral bevel gear teeth or double helical gear teeth.

One or more first planetary gear support portion retention members 322 extend outboard form at least a portion of the second end 312 of the base portion 308 of the first portion 304 of the carrier 302 of the parking mechanism 300. Extending inboard from an end of the one or more first planetary gear support portion retention members 322, opposite the base portion 308 of the first portion 304 of the carrier 302, is a hollow interior portion 324. The hollow interior portion 324 of the one or more first planetary gear support portion retention members 322 are of a size and shape to receive and/or retain at least a portion of a first end portion 326 of one or more planetary gear support portions 328. The one or more planetary gear support portions 238 provide rotational support for the one or more planetary gears 30 and drivingly connects the one or more planetary gears 30 to the carrier 8 of the planetary gear assembly 24.

Additionally, one or more first attachment portions 330 extend outboard from at least a portion of the second end 312 of the base portion 308 of the first portion 304 of the carrier 302. As best seen in FIGS. 8-11 of the disclosure the one or more first attachment portions 330 of the first portion 304 of the carrier 302 extend outboard beyond the one or more planetary gear support portions 238 of the first portion 304 of the carrier 302. Extending outboard from at least a portion of an end of the one or more first attachment portions 330 of the first portion 304 of the carrier 302 is one or more retention portions 332.

As illustrated in FIG. 9 of the disclosure and as a non-limiting example, the second portion 306 of the carrier 302 includes a base portion 334 having a first end 336, a second end 338 and an outer surface 340. Extending from the first end 336 to the second end 338 of the base portion 334 of the second portion 306 of the carrier 302 is an output gear aperture 342. According to the embodiment of the disclosure illustrated in FIG. 8 of the disclosure, the output gear aperture 342 of the second portion 306 of the carrier is aligned with the motor output shaft aperture 316 in the first portion 304 of the carrier 302.

One or more second planetary gear support portion retention members 344 extend outboard form at least a portion of the first end 336 of the base portion 334 of the second portion 306 of the carrier 302 of the parking mechanism 300. Extending from an end of the one or more second planetary gear support portion retention members 344, opposite the base portion 334 of the second portion 306 of the carrier 302, is a hollow interior portion 346. The hollow interior portion 346 of the one or more second planetary gear support portion retention members 344 are of a size and shape to receive and/or retain at least a portion of a second end portion 348 of the one or more planetary gear support portions 328.

Figure 11:
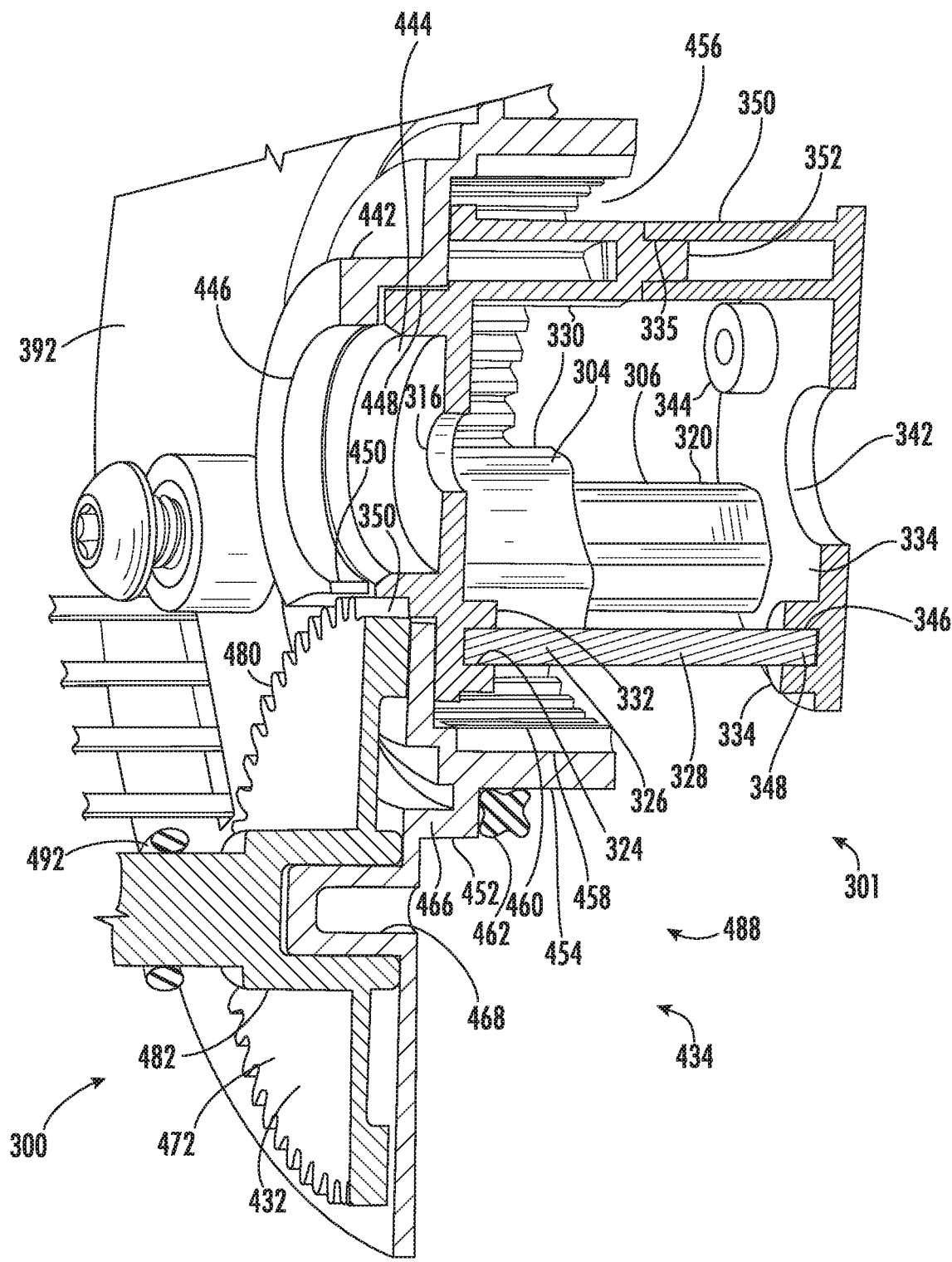
FIG. 11 is a schematic partial cut-away view of a portion of the actuation mechanism of parking mechanism illustrated in FIGS. 7-10 of the disclosure where the connect and disconnect mechanism of the parking mechanism is in an engaged position.

Extending outboard from at least a portion of the first end 336 of the base portion 334 of the second portion 306 of the carrier 302 is one or more second attachment portions 350. As best seen in FIGS. 8, 10 and 11 of the disclosure and as a non-limiting example, the one or more second attachment portions 350 have a hollow interior portion 352 extending inboard from an end of the one or more second attachment portions 350 opposite the base portion 334 of the second portion 306 of the carrier 302. The hollow interior portion 352 of the one or more second attachment portions 350 of the second portion 306 of the carrier 302 are of a size and shape to receive and/or retain at least a portion of the one or more retention portions 332 of the one or more first attachment portions 330 of the first portion 304 of the carrier 302. As a non-limiting example, the one or more one or more retention portions 332 of the one or more first attachment portions 330 of the first portion 304 of the carrier 302 may be press-fit within the hollow interior portion 352 of the one or more second attachment portions 350 of the second portion 306 of the carrier 302.

While the embodiment of the disclosure illustrated in FIGS. 8, 10 and 11 illustrate at least a portion of the first portion 304 of the carrier 302 being received and/or retained within at least a portion of the second portion 306 of the carrier 302, it is within the scope of this disclosure and as a non-limiting example that the reverse relationship may be possible. Additionally, it is within the scope of this disclosure and as a non-limiting example that at least a portion of the first portion 304 of the carrier 302 may be integrally connected to at least a portion of the second portion 306 of the carrier 302 by using one or more mechanical fasteners, one or more adhesives, one or more welds, one or more clips and/or any other type or retaining member capable of securing the first portion 304 to the second portion 306 of the carrier 302.

Extending co-axially with and disposed radially outboard from at least a portion of the carrier 302 of the parking mechanism 300 is an output gear 354 having a first end portion 356, a second end portion 358, a first end 360 and second end 362, an inner surface 364 and an outer surface 366. The inner surface 364 and the outer surface 366 of the output gear 354 defines a hollow portion 368 therein. Circumferentially extending from at least a portion of the first end portion 356 of the output gear 354 is an increased diameter portion 370. At least a portion of the increased diameter portion 370 of the output gear includes a biasing member groove 372 with a biasing member retention portion 374 circumferentially extending along at least a portion of the outer surface 366 of the increased diameter portion 370 of the output gear 354. The biasing member retention portion 374 of the increased diameter portion 370 of the output gear 354 is of a size and a shape to receive and retain at least a portion of a one or more first biasing members 124 thereby preventing the one or more first biasing members 124 from rotating when the parking mechanism 300 is in operation.

As best seen in FIG. 8 of the disclosure, the second end 362 of the output gear 354 of the parking mechanism 300 is a wall portion 376 having a first side 378 and a second side 380. Extending outboard from at least a portion of the first side 378 of the wall portion 376 of the output gear 354 of the parking mechanism 300 is a carrier support portion 382. At least a portion of the carrier support portion 382 of the output gear 354 is of a size and shape to be received and/or retained within at least a portion of the base portion 334 of the second portion 306 of the carrier 302. As a result, it is to be understood that the carrier support portion 382 of the output gear 354 may provide rotational support for at least a portion of the carrier 302 of the parking mechanism 300. Additionally, it is to be understood that the carrier support portion 382 of the wall portion 376 of the output gear 354 aids in ensuring that the carrier 302 is retained radially within its intended operating position when the parking mechanism 300 is in operation. Furthermore, it is to be understood that the first side 378 of the wall portion 376 of the output gear 354 may provide a thrust surface for the carrier 302 in order to ensure that the carrier 302 is retained axially within its intended operating position when the parking mechanism 300 is in operation.

The hollow portion 368 of the output gear 354 includes, in axial order from the first end 360 to the second end 362 of the output gear 354, a first receiving portion 384, a second receiving portion 386 and a third receiving portion 388. As best seen in FIG. 8 of the disclosure and as a non-limiting example, the first receiving portion 384 of the output gear 354 has a diameter D6, the second receiving portion 386 of the output gear 354 has a diameter D7 and the third receiving portion 388 of the output gear 354 has a diameter D8. According to the embodiment of the disclosure illustrated in FIG. 8 of the disclosure and as a non-limiting example, the diameter D7 of the second receiving portion 386 of the output gear 354 is greater than the diameter D8 of the third receiving portion 388 but is less than the diameter D6 of the first receiving portion 384 of the output gear 354.

At least a portion of the one or more planetary gears 30 of the planetary gear assembly 24 are received and/or retained within at least a portion of the first, second and/or third receiving portions 384, 386 and/or 388 of the output gear 354. As best seen in FIG. 8 of the disclosure and as a non-limiting example, the diameter D7 of the second receiving portion 386 of the output gear 354 is substantially equal to or greater than the outer most diameter D3 of the increased diameter portion 64 of the one or more planetary gears 30. It is therefore within the scope of this disclosure and as a non-limiting example that at least a portion of the increased diameter portion 64 of the one or more planetary gears 30 of the planetary gear assembly 24 is disposed and/or retained within at least a portion of the second receiving portion 386 of the output gear 354.

Circumferentially extending from at least a portion of the inner surface 364 of the third receiving portion 388 is a plurality of output gear teeth 390. The plurality of output gear teeth 390 are complementary to and meshingly engaged with the second plurality of plurality of planetary gear teeth 62 on the outer surface 34 of the second end portion 38 of the one or more planetary gears 30 of the planetary gear assembly 24. As a result, the one or more planetary gears 30 of the planetary gear assembly 24 are drivingly connected to at least a portion of the output gear 354. It is within the scope of this disclosure and as a non-limiting example that the plurality of output gear teeth 390 on the inner surface 364 of the third receiving portion 388 of the output gear 354 are a plurality of hypoid gear teeth, spiral bevel gear teeth, helical gear teeth, spur gear teeth, double hypoid gear teeth, double spiral bevel gear teeth or double helical gear teeth.

Disposed radially outboard from at least a portion of the carrier 302 of the parking mechanism 300 is a ring gear 392 having a base portion 394 having a first end 396, a second end 398 and an outer surface 400. At least a portion of the first end 396 of the base portion 394 of the ring gear 392 is connected to at least a portion of the one or more motors 4 of the parking mechanism 300. In accordance with the embodiment of the disclosure illustrated in FIG. 7 and as a non-limiting example, the ring gear 392 includes one or more mechanical fastener apertures 402 extending from the first end 396 to the second end 398 of the base portion 394 of the ring gear 392 of the parking mechanism 300. The one or more mechanical fastener apertures 402 of the ring gear 392 are of a size and shape to receive and/or retain at least a portion of one or more mechanical fasteners 404.

While the embodiment of the disclosure illustrated in FIG. 7 illustrates at least a portion of the housing 406 being integrally connected to at least a portion of the ring gear 392 of the parking mechanism 300, it within the scope of this disclosure that the housing 406 may be integrally connected to the ring gear 392 by any other method. As a non-limiting example, at least a portion of the second increased diameter portion 420 of the housing 406 may be integrally connected to at least a portion of the first end 396 of the ring gear 392 by using one or more welds, one or more adhesives, one or more mechanical fasteners, by using threaded connection and/or by using a press-fit connection.

Disposed outboard from at least a portion of the first end 396 of the ring gear 392 is a housing 406 having a first end portion 408, a second end portion 410, an inner surface 412 and an outer surface 414 defining a hollow portion 416 therein. At least a portion of the hollow portion 416 of the housing 406 of the parking mechanism 300 is of a size and shape to receive and/or retain at least a portion of the one or more motors 4. The housing 406 of the parking mechanism 300 aids in preventing the migration of dirt, dust and debris into the one or more motors 4 and/or the parking mechanism 300. As a result, the housing 406 aids in increasing the overall life and durability of the parking mechanism 300.

In accordance with the embodiment of the disclosure illustrated in FIG. 7 and as a non-limiting example, at least a portion of the circuit board 160 is connected to at least a portion of the first end 396 of the ring gear 392. Additionally, in accordance with the embodiment of the disclosure illustrated in FIG. 7 and as a non-limiting example, at least a portion of the circuit board 160 of the parking mechanism 300 is disposed within the hollow portion 416 of the housing 406 of the parking mechanism 300.

Circumferentially extending from at least a portion of the outer surface 414 of the second end portion 412 of the housing 406 is a first increased diameter portion 418 and a second increased diameter portion 420. As illustrated in FIG. 7 of the disclosure and as a non-limiting example the outer surface 414 of the first increased diameter portion 418 of the housing 406 provides a sealing surface for a first sealing member 422. In accordance with the embodiment of the disclosure illustrated in FIG. 7 and as a non-limiting example, the first increased diameter portion 418 of the housing 406 has an outer most diameter that is less than an outer most diameter of the second increased diameter portion 420 of the housing 406.

As best seen in FIG. 7 of the disclosure and as a non-limiting example, the first increased diameter portion 418 of the housing 406 includes a radially inboard extending wall portion 424. Extending from the inner surface 412 to the outer surface 414 of the radially inboard extending wall portion 424 is a connect and disconnect gear aperture 426. According to the embodiment of the disclosure illustrated in FIG. 7 and as a non-limiting example, the radially inboard extending wall portion 424 of the first increased diameter portion 418 of the housing 406 may further include an axially extending portion 428 extending from at least a portion of the inner surface 412 of the radially inboard extending wall portion 424. Extending from an end of the axially extending portion 428, opposite the radially inboard extending wall portion 424, is a connect and disconnect gear receiving portion 430. As best seen in FIG. 7 of the disclosure and as a non-limiting example, at least a portion of the connect and disconnect gear receiving portion 430 is connected to at least a portion of the connect and disconnect gear aperture 426. Additionally, as best seen in FIG. 7 of the disclosure and as a non-limiting example, the connect and disconnect gear aperture 426 has a diameter D9 that is less than a diameter D10 of the connect and disconnect gear receiving portion 430. It is to be understood that the axially extending portion 428 of the radially inboard extending wall portion 424 of the housing 406 provides a guide surface for at least a portion of a connect and disconnect gear 432 of a connect and disconnect mechanism 434 of the parking mechanism 300.

Extending from a first end 436 to a second end 438 of the second increased diameter portion 420 is one or more mechanical fastener apertures 440. The one or more mechanical fastener apertures 440 are of a size and shape to receive and/or retain at least a portion of the one or more mechanical fasteners 404 of the parking mechanism 300. As a result, at least a portion of the ring gear 392 of the parking mechanism 300 is integrally connected to at least a portion of the housing 406 and/or the one or more motors 4 of the parking mechanism 300. It is therefore within the scope of this disclosure and as a non-limiting example that the ring gear 392 of the planetary gear assembly 24 of the parking mechanism 300 may a fixed ring gear. By making the ring gear 392 a fixed ring gear and the one or more planetary gears 30 a stepped planetary gear, the fixed ring gear, in combination with the one or more stepped planetary gears, prevents the output gear 354 from being back driven. This makes the parking mechanism 300 more reliable and able to maintain engagement or disengagement even with a loss of the primary power source (not shown) of the vehicle (not shown).

As best seen in FIG. 11 of the disclosure and as a non-limiting example, a first ring gear axially extending portion 442 having a hollow interior portion 444 extends outboard from at least a portion of the first end 396 of the base portion 394 of the ring gear 392. At least a portion of the first ring gear axially extending portion 442 of the ring gear 392 extends co-axial with at least a portion of the carrier 302 of the parking mechanism 300. Extending from an end of the first ring gear axially extending portion 442 of the ring gear 392 is a motor output shaft aperture 446. The motor output shaft aperture in the first ring gear axially extending portion 442 of the ring gear 392 is of a size and shape to receive and/or retain at least a portion of the motor output shaft 6 of the one or more motors 4. At least a portion of the motor output shaft aperture 446 of the first ring gear axially extending portion 442 of the ring gear 392 is connected to at least a portion of the hollow interior portion 444 of the first ring gear axially extending portion 442. It is within the scope of this disclosure and as a non-limiting example that the hollow interior portion 444 of the first ring gear axially extending portion 442 may have a diameter that is larger than a diameter of the motor output shaft aperture 446 of the first ring gear axially extending portion 442 of the ring gear 392.

In accordance with the embodiment of the disclosure illustrated in FIGS. 7, 8, 10 and 11 and as a non-limiting example, at least a portion of the carrier gear portion 318 of the carrier 302 is received and/or retained within at least a portion of the hollow interior portion 444 of the first ring gear axially extending portion 442 of the ring gear 392. As a result, it to be understood that the hollow interior portion 444 of the first ring gear axially extending portion 442 of the ring gear 392 may provide rotational support for at least a portion of the carrier 302 of the parking mechanism 300. Additionally it is to be understood that the hollow interior portion 444 of the first ring gear axially extending portion 442 of the ring gear 392 aids in ensuring that the carrier 302 is retained radially within its intended operating position when the parking mechanism 300 is in operation. Furthermore, it is to be understood that the second end 398 of the ring gear 392 of the parking mechanism 300 may provide a thrust surface for the carrier 302 in order to ensure that the carrier 302 is retained axially within its intended operating position when the parking mechanism 300 is in operation.

Extending from the outer surface 400 to an inner surface 448 defining the hollow interior portion 444 of the first ring gear axially extending portion 442 of the ring gear 392 is a carrier gear portion aperture 450. As best seen in FIG. 11 of the disclosure and as a non-limiting example, the carrier gear portion aperture 450 the connect and disconnect gear 432 with selective access to the plurality of carrier gear teeth 320 of the carrier gear portion 318 of the carrier 302.

A second ring gear axially extending portion 452 extends axially outboard from at least a portion of the second end 398 of the base portion 394 of the ring gear 392 of the parking mechanism 300. Extending axially outboard from an end of the second ring gear axially extending portion 452, opposite the base portion 394 of the ring gear 392, is a third ring gear axially extending portion 454. As best seen in FIG. 8 of the disclosure and as a non-limiting example, at least a portion of the second ring gear axially extending portion 452 is received and/or retained within at least a portion of the first receiving portion 384 of the output gear 354. Additionally, as best seen in FIG. 8 of the disclosure and as a non-limiting example, at least a portion of the third ring gear axially extending portion 454 is received and/or retained within at least a portion of the second receiving portion 386 of the output gear 354 of the parking mechanism 300.

In accordance with the embodiment of the disclosure illustrated in FIGS. 7, 8, 10 and 11 and as a non-limiting example, at least a portion of the carrier 302 is received and/or retained within at least a portion of a hollow interior portion 456 of the third ring gear axially extending portion 454 of the ring gear 392. As a result, at least a portion of the hollow interior portion 456 of the third ring gear axially extending portion 454 of the ring gear 392 is connected to at least a portion of the hollow interior portion 444 of the first ring gear axially extending portion 442 of the ring gear 392. It is within the scope of this disclosure and as a non-limiting example that the diameter of the hollow interior portion 444 of the first ring gear axially extending portion 442 is less than a diameter of the hollow interior portion 456 of the third ring gear axially extending portion 454 of the ring gear 392.

Circumferentially extending from at least a portion of an inner surface 458 defining the hollow interior portion 456 of the third ring gear axially extending portion 454 of the ring gear 392 is a plurality of ring gear teeth 460. The plurality of ring gear teeth 460 of the ring gear 392 are complementary to and meshingly engaged with the first plurality of planetary gear teeth 58 on the outer surface 34 of the first end portion 36 of the one or more planetary gears 30 of the planetary gear assembly 24. As a non-limiting example, the plurality of ring gear teeth 460 on the inner surface 458 third ring gear axially extending portion 454 of the ring gear 392 are a plurality of hypoid gear teeth, spiral bevel gear teeth, helical gear teeth, spur gear teeth, double hypoid gear teeth, double spiral bevel gear teeth or double helical gear teeth.

Disposed radially outboard from at least a portion of the outer surface 454 of the third ring gear axially extending portion 454 of the ring gear 392 is a second sealing member 462. As best seen in FIG. 8 of the disclosure and as a non-limiting example, at least a portion of the second sealing member 462 is in direct contact with at least a portion of the inner surface 364 of the first receiving portion 384 of the output gear 354, at least a portion of the outer surface 400 of the third ring gear axially extending portion 454 of the ring gear 392 and/or at least a portion of a wall portion 464 connecting the second ring gear axially extending portion 452 to the third ring gear axially extending portion 454 of the ring gear 392. The second sealing member 462 of the parking mechanism 300 aids in preventing the migration of transmission fluids, lubrication fluids, dirt, dust and/or debris into the parking mechanism 300. It is within the scope of this disclosure and as a non-limiting example that the second sealing member 462 of the parking mechanism 300 may have a substantially X-shaped cross-section thereby providing a double redundant sealing system. As a result, the second sealing member 462 aids in improving the overall life and durability of the parking mechanism 300.

A ring gear groove 466 extends along at least a portion of the first side 396 of the ring gear 392. As illustrated in FIGS. 7, 8, 10 and 11 of the disclosure at least a portion of the ring gear groove 466 is disposed radially outboard from at least a portion of the first ring gear axially extending portion 442 of the ring gear 392. It is within the scope of this disclosure and as a non-limiting example that the ring gear groove 466 may aid in reducing the overall weight of the parking mechanism, may provide a lubricant flow path allowing for the transfer of an amount of lubrication fluid (not shown) to the connect and disconnect mechanism 434 and/or may provide a surface for connecting the circuit board 160 of the parking mechanism to at least a portion of the first end 396 of the ring gear 392.

Extending outboard from at least a portion of the first end 396 of the ring gear 392 is a connect and disconnect gear guide portion 468. As illustrated in FIGS. 7, 8 10 and 11 of the disclosure and as a non-limiting example, at least a portion of the connect and disconnect gear guide portion 468 of the ring gear 392 is interposed between the ring gear groove 466 and the one or more mechanical fastener apertures 404 of the ring gear 392.

Disposed radially outboard from at least a portion of the outer surface 400 of the connect and disconnect gear guide portion 468 of the ring gear 392 is one or more biasing members 470. In accordance with the embodiment of the disclosure illustrated in FIG. 7 of the disclosure and as a non-limiting example, the one or more biasing members 470 may be one or more springs and/or one or more wave springs.

According to the embodiment of the disclosure illustrated in FIGS. 7, 8, 10 and 11 and as a non-limiting example, at least a portion of the connect and disconnect gear 432 of a connect and disconnect mechanism 434 is disposed axially outboard from at least a portion of the connect and disconnect gear guide portion 468 of the ring gear 392. As best seen in FIG. 10 of the disclosure, connect and disconnect gear 432 includes a gear portion 472 having a first end 474 and a second end 476. Circumferentially extending from at least a portion of an outer surface 478 of the gear portion 472 of the connect and disconnect gear 432 is a plurality of connect and disconnect gear teeth 480. The plurality of connect and disconnect gear teeth 480 of the connect and disconnect gear 432 are complementary to and meshingly engaged with the of the plurality of carrier gear teeth 320 of the carrier 302 of the parking mechanism 300. As a non-limiting example, the plurality of connect and disconnect gear teeth 480 of the connect and disconnect gear 432 are a plurality of hypoid gear teeth, spiral bevel gear teeth, helical gear teeth, spur gear teeth, double hypoid gear teeth, double spiral bevel gear teeth or double helical gear teeth.

Extending from at least a portion of the first end 474 of the gear portion 472 of the connect and disconnect gear 432 is a first axially extending portion 482 having a hollow interior portion 484 therein. The hollow interior portion 484 of the first axially extending portion 482 of the connect and disconnect gear 432 is of a size and shape to receive and/or retain at least a portion of the connect and disconnect gear guide portion 468 of the ring gear 392. As illustrated in FIG. 7 of the disclosure and as a non-limiting example, at least a portion of the first axially extending portion 482 of the connect and disconnect gear 432 is disposed within at least a portion of the connect and disconnect gear receiving portion 430 of the axially extending portion 428 of the housing 406. It is to be understood that the engagement between the connect and disconnect gear guide portion 468 and the hollow interior portion 484 of the first axially extending portion 482 of the connect and disconnect gear 432 may aid in ensuring that the connect and disconnect gear 432 transitions between the engaged position 486 illustrated in FIGS. 8 and 11 and the disengaged position 488 illustrated in FIG. 10 of the disclosure.

A second axially extending portion 490 extends axially outboard from an end of the first axially extending portion 482 of the connect and disconnect gear 432 opposite the first end 474 of the gear portion 472 of the connect and disconnect gear 432. At least a portion of the second axially extending portion 490 of the connect and disconnect gear 432 extends through the connect and disconnect gear aperture 426 in the housing 406 and outside the housing 406 of the parking mechanism 300.

In direct contact with at least a portion of the second axially extending portion 490 of the connect and disconnect gear 432 is a third sealing member 492. At least a portion of the third sealing member 492 is disposed within and is in direct contact with at least a portion of the connect and disconnect gear receiving portion 430 of the housing 406. The third sealing member 492 of the parking mechanism 300 aids in preventing the migration of dust, dirt and/or debris into to the connect and disconnect mechanism 434 of the parking mechanism 300. As a result, the third sealing member 492 aids in improving the overall life and durability of the parking mechanism 300.

At least a portion of an end of the second axially extending portion 490 of the connect and disconnect gear 432 includes an engagement portion 494. In accordance with the embodiment of the disclosure illustrated in FIG. 7 and as a non-limiting example, the engagement portion 494 of the second axially extending portion 490 of the connect and disconnect gear 432 has a substantially polygonal shape to be selectively engageable with a manual connect and disconnect member (not shown).

The connect and disconnect mechanism 302 of the parking mechanism 300 allows for the selective rotation of the carrier 302 which selectively transitions the cam (not shown) between an engaged position (not shown) and a disengaged position (not shown). As previously discussed, when the cam (not shown) is in the engaged position (not shown), the cam (not shown) drives the parking pawl (not shown) toward the parking gear (not shown) until the one or more teeth (not shown) of the parking pawl (not shown) is meshingly engaged with the one or more teeth (not shown) of the parking gear (not shown). As a result, when the connect and disconnect mechanism 434 is in the engaged position 486 illustrated in FIGS. 8 and 11, the parking pawl (not shown) is providing the parking lock function of the parking mechanism 300. When the connect and disconnect mechanism 434 is in the disengaged position 488 illustrated in FIGS. 7 and 10 of the disclosure, the one or more teeth (not shown) of the parking pawl (not shown) is not meshingly engaged with the one or more teeth (not shown) of the parking gear (not shown). As a result, when the connect and disconnect mechanism 434 is in the disengaged position 488, the parking pawl (not shown) is not providing the parking mechanism 300 with a parking lock function.

In order to transition the connect and disconnect mechanism 434 from the disengaged position 488 to the engaged position 486, the operator of the vehicle (not shown) connects the manual connect and disconnect member (not shown) to at least a portion of the engagement portion 494 of the connect and disconnect gear 432. Once the manual connect and disconnect member (not shown) is engaged with the connect and disconnect gear 432, the operator of the vehicle (not shown) applies an amount of force onto the connect and disconnect gear 432 toward the ring gear 392 until the plurality of connect and disconnect gear teeth 480 of the connect and disconnect gear 432 are meshingly engaged with the plurality of carrier gear teeth 320 of the carrier 302. When the operator applies an amount of force onto the connect and disconnect gear 432 it compresses the one or more biasing members 470 loading the one or more biasing members 470 with energy.

Once the plurality of connect and disconnect gear teeth 480 of the connect and disconnect gear 432 are meshingly engaged with the plurality of carrier gear teeth 320 of the carrier 302, the operator (nor shown) will rotate the manual connect and disconnect member (not shown) which in turn selectively rotates the connect and disconnect gear 432 of the parking mechanism 300. As the connect and disconnect gear 432 rotates, the carrier 302 of the parking mechanism 300 rotates thereby transitioning the cam (not shown) from the disengaged position (not shown) to the engaged position (not shown). Because the parking mechanism 300 cannot be back driven, the cam (not shown) of the parking mechanism 300 will remain in the engaged position (not shown).

When the operator (not shown) stops applying the amount of force needed to meshingly engage the connect and disconnect gear 432 with the carrier 302, the amount of force loaded within the one or more biasing members 470 translates the connect and disconnect gear 432 axially away from the ring gear 392. Once the connect and disconnect gear 432 is translated axially a pre-determined disconnect distance from the ring gear 392, the connect and disconnect gear 432 is no longer meshingly engaged with the carrier 302 of the parking mechanism 300. This will prevent any inadvertent disengagement of the parking mechanism 300 with the parking gear (not shown) thereby improving the overall safety of the parking mechanism 300.

When the operator (not shown) wants to transition the cam (not shown) from the engaged position (not shown) to the disengaged position (not shown), the operator (not shown) applies the amount of force needed to compress the one or more biasing members 470 until at least a portion of the connect and disconnect gear 432 is meshingly engaged with at least a portion of the carrier 302. Once the connect and disconnect gear 432 is meshingly engaged with the carrier 302, the operator (not shown) rotates the manual connect and disconnect member (not shown) in a direction opposite the direction needed to engaged the parking pawl (not shown) with the parking gear (not shown). This will rotate the carrier 302 and the cam (not shown) in the opposite direction thereby disengaging the parking pawl (not shown) from the parking gear (not shown) of the parking mechanism 300.

Once the parking mechanism 300 has been successfully disengaged from the parking gear (not shown), the operator (not shown) stops applying the amount of force needed to meshingly engage the connect and disconnect gear 432 with the carrier 302. This will allow the amount of force loaded within the one or more biasing members 470 to translate the connect and disconnect gear 432 axially away from the ring gear 392. Once the connect and disconnect gear 432 is translated axially the pre-determined disconnect distance from the ring gear 392, the connect and disconnect gear 432 is no longer meshingly engaged with the carrier 302 of the parking mechanism 300. This will prevent any inadvertent engagement of the parking mechanism 300 with the parking gear (not shown) thereby improving the overall safety of the parking mechanism 300.

In accordance with an alternative embodiment of the disclosure (not shown) and as a non-limiting example, the parking mechanism 300 may include the use of a connect and disconnect gear engagement mechanism (not shown). According to this embodiment of the disclosure (not shown) the connect and disconnect gear engagement mechanism (not shown) is selectively engageable with the connect and disconnect gear 432 of the connect and disconnect mechanism 434. Upon receiving an instruction from the operator (not shown) to transition the connect and disconnect gear 432 to the engaged position 486 or the disengaged position 488, the connect and disconnect gear engagement mechanism (not shown) will apply an amount of force onto the connect and disconnect gear 432 needed to compress the one or more biasing members 470 and engage the connect and disconnect gear 432 with the carrier 302. When the connect and disconnect gear 432 is drivingly engaged with the carrier 302 of the parking mechanism 300, the connect and disconnect gear engagement mechanism (not shown) will rotate thereby rotating the carrier 302 of the parking mechanism 300. As a result of the direction that the carrier 302 of the parking mechanism 300 is rotated, the parking pawl (not shown) is driven into or out of engagement with the parking gear (not shown).

Figure 12:
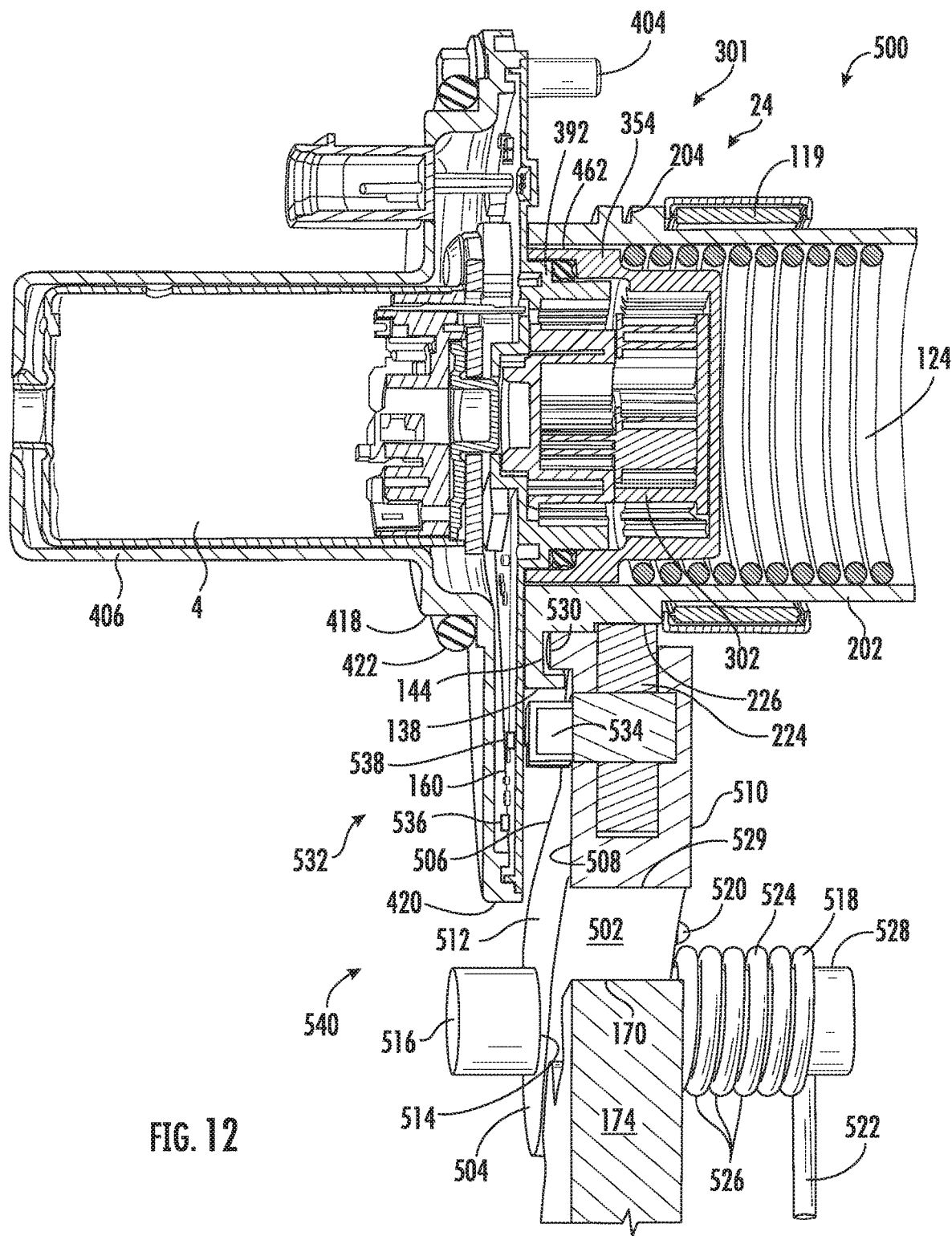
FIG. 12 is a cut-away schematic side-view of a portion of the actuation mechanism and parking mechanism illustrate in FIGS. 7-11 of the disclosure according to yet another embodiment of the disclosure.
Figure 13:
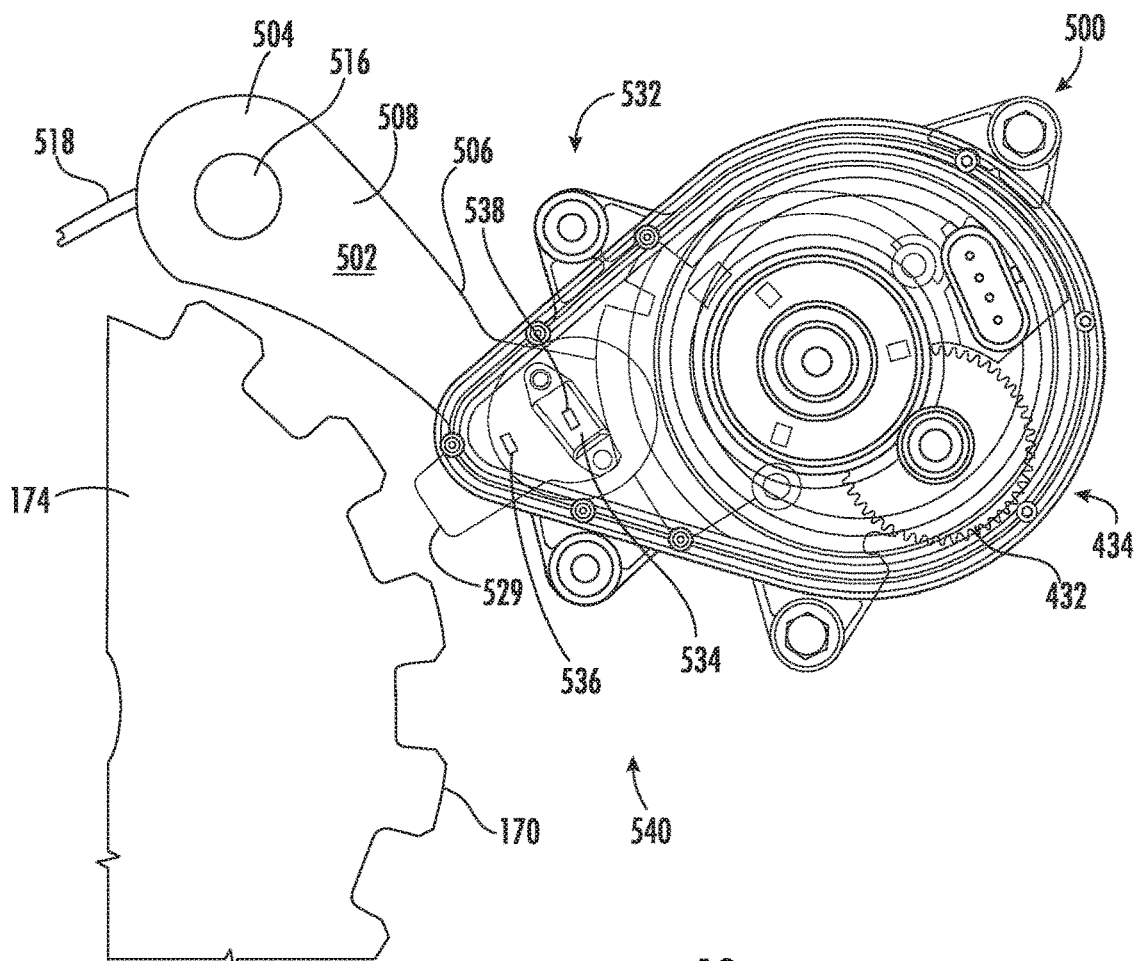
FIG. 13 is a schematic side-view of a portion of the parking mechanism illustrated in FIGS. 7-12 where the connect and disconnect mechanism of the parking mechanism is in a disengaged position.
Figure 14:
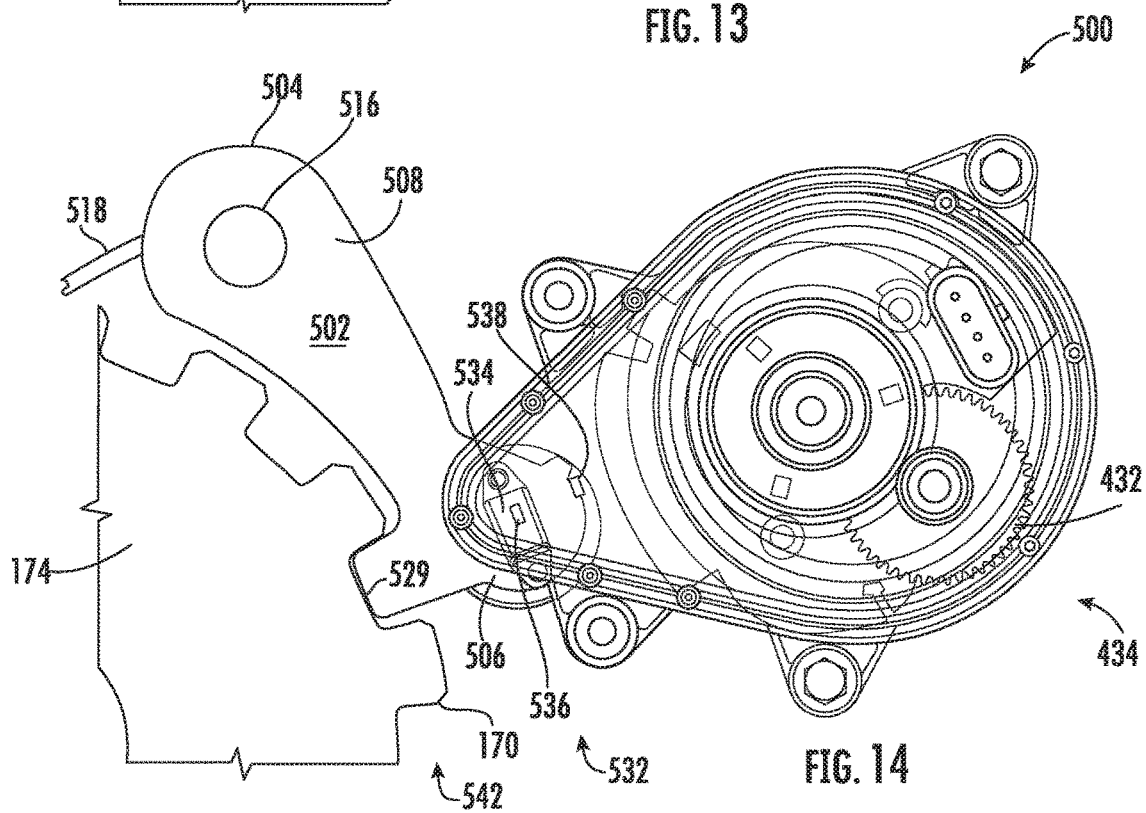
FIG. 14 is a schematic side-view of a portion of the parking mechanism illustrated in FIGS. 7-13 where the connect and disconnect mechanism of the parking mechanism is in an engaged position.

FIGS. 12-14 schematically illustrate a parking mechanism 500 according to yet another embodiment of the disclosure. The parking mechanism 500 illustrated in FIGS. 12-14 is the same as the parking mechanisms 2, 200 and 300 illustrated in FIGS. 1-11, except where specifically noted below. As illustrated in FIG. 12 of the disclosure, and as a non-limiting example, the parking mechanism 500 includes a parking pawl 502 having a first end portion 504, a second end portion 506, a first side 508, a second side 510 and an outer surface 512. The parking pawl 502 of the parking mechanism 500 is selectively engageable and disengagable with the parking gear 174 illustrated in FIGS. 12-14 of the disclosure.

Extending from the first side 508 to the second side 510 of the first end portion 504 of the parking pawl 502 is a shaft aperture 514. The shaft aperture 514 of the parking pawl 502 is of a size and shape to receive and/or retain at least a portion of a shaft 516. When in operation, at the parking pawl 502 of the parking mechanism 500 will be able to rotate relative to the shaft 516 when the parking pawl 502 is transitioning in and out of engagement with the parking gear 174.

A biasing member 518 having a first end portion 520, a second end portion 522 and an intermediate portion 524 interposed between the first and second end portions 520 and 522 of the biasing member 518. As best seen in FIG. 12 of the disclosure, at least a portion of the first end portion 520 of the biasing member 518 is connected to at least a portion of the parking pawl 502 and at least a portion of the second end portion 522 is connected to at least a portion of the vehicle (not shown). Additionally, as illustrated in FIG. 12 of the disclosure and as a non-limiting example, at least a portion of the intermediate portion 524 of the biasing member 518 has one or more coils 526 circumferentially extending along at least a portion of an outer surface 528 of the shaft 516 of the parking mechanism 500. As a non-limiting example, the biasing member 518 may be a spring such as but not limited to a torsion spring or a compression spring.

As previously discussed, the biasing member 518 applies an amount of force onto the parking pawl 502 necessary to ensure at least a portion of the parking pawl 502 is in direct contact with at least a portion of the of the cam 202 of the parking mechanism 500. As a result, it is to be understood that the biasing member 518 ensures a continual engagement of the parking pawl 502 with the cam 202 of the parking mechanism 500. Additionally, it is to be understood that the biasing member 518 prevents one or more teeth 529 extending outboard from at least a portion of the second end portion 596 of the parking pawl 502 from inadvertently engaging the one or more teeth 170 of a parking gear 174 due to sudden shock loads experienced by the vehicle (not shown). As a non-limiting example, the biasing member 518 may be a spring such as but not limited to a torsion spring or a compression spring.

Extending axially outboard from at least a portion of the first side 508 of the second end portion 506 of the parking pawl 502 is a dog 530. As best seen in FIG. 12 of the disclosure and as a non-limiting example, at least a portion of the dog 530 of the parking pawl 502 is disposed within the parking pawl groove 144 in the protruding portion 138 of the cam 202 of the parking mechanism 500. By locating at least a portion of the dog 530 of the parking pawl 502 within the parking pawl groove 144 of the cam 202, it prevents any inadvertent engagement or disengagement of the parking mechanism 500 due to sudden shock loads experience by the vehicle (not shown).

Rotatively connected to at least a portion of the second end portion 596 of the parking pawl 502 of the parking mechanism 500 is the rolling member 224. In accordance with the embodiment of the disclosure illustrated in FIG. 12 and as a non-limiting example, at least a portion of the outer surface 226 of the rolling member 224 is in direct contact with at least a portion of the cam 202 of the parking mechanism 500. As previously discussed, the rolling member 224 of the parking pawl 502 aids in reducing the overall amount of friction between the cam 202 and the parking pawl 502 when in operation, thereby increasing the overall life and durability of the parking mechanism 500.

According to the embodiment of the disclosure illustrated in FIGS. 12-14 and as a non-limiting example, the parking mechanism 500 may further include the use of a sensor assembly 532. The sensor assembly 532 of the parking mechanism 500 includes one or more first sensing members 534, one or more second sensing members 536 and one or more third sensing members 538. As illustrated in FIGS. 12-14 of the disclosure and as a non-limiting example, at least a portion of the one or more first sensing members 534 may be integrally connected to at least a portion of the second end portion 506 of the first side 508 of the parking pawl 502. As a result, at least a portion of the one or more first sensing members 534 may be interposed between the parking pawl 502 and the circuit board 160 of the parking mechanism 500. It is within the scope of this disclosure and as a non-limiting example that the one or more first sensing members 534 of the sensor assembly 532 may be a magnet or a material composed, at least in part, by a magnetizable material. As a non-limiting example, at least a portion of the one or more first sensing members 534 may be integrally connected to at least a portion of the parking pawl 502 by using one or more welds, one or more adhesives, one or more mechanical fasteners and/or a threaded connection.

In accordance with an embodiment of the disclosure and as a non-limiting example, the one or more first sensing members 534 may be integrally connected to at least a portion of the head of the parking pawl 502 at a location proximate to the one or more teeth 529 and/or the dog 530 of the parking pawl 502. By locating the one or more first sensing members 532 proximate to the one or more teeth 529 and/or the dog 530 of the parking pawl 502 it provides the sensor assembly 532 and the parking mechanism 500 with a more accurate and reliable identification of the location of the head and therefore the one or more teeth 529 of the parking pawl 502 at all times during operation of the parking mechanism 500. Additionally, by locating the one or more first sensing members 534 proximate to the one or more teeth 529 and/or the dog 530 of the parking pawl 502 it provides the sensor assembly 532 and the parking mechanism 500 with the ability to identify when the one or more teeth 529 and/or the head of the parking pawl 502 have fractured, bent, worn down or failed. It is therefore to be understood that this aids in providing a more reliable and robust parking mechanism 500.

At least a portion of the one or more second sensing members 536 and the one or more third sensing members 538 of the sensor assembly 532 of the parking mechanism 500 may be in electronic communication and/or connected to at least a portion of the circuit board 160 of the parking mechanism 500 at pre-determined locations. Given the relatively close distance between the one or more first sensing members 534 on the parking pawl 502 and the one or more second and third sensing members 536 and 538 on the circuit board 160, the one or more second and third sensing members 536 and 538 of the sensor assembly 532 are able to sense the position of the parking pawl 502. When the parking pawl 502 is in a disengaged position 540 illustrated in FIGS. 12 and 13 of the disclosure, the one or more first sensing members 534 are in operating communication with the one or more third sensing members 538 of the sensor assembly 532 but not in operating communication with the one or more second sensing members 536 of the sensor assembly 532. Additionally, when the parking pawl 502 is in an engaged position 542 illustrated in FIG. 11 of the disclosure, the one or more first sensing members 534 are in operating communication with the one or more second sensing members 536 of the sensor assembly 532 but not in operating communication with the one or more third sensing members 538 of the sensor assembly 532. It is within the scope of this disclosure and as a non-limiting example that the one or more second and/or third sensing members 536 and/or 538 may be a transducer, a magnetic field sensor, a hall effect sensor and/or any other type of sensor that is able to detect when the one or more first sensing members 534 is located relative to the one or more second and/or third sensing members 536 and/or 538.

In accordance with the embodiment of the disclosure illustrated in FIGS. 12 and 13 of the disclosure and as a non-limiting example, when the parking pawl 502 of the parking mechanism 500 is in the disengaged position 540, the one or more teeth 529 of the parking pawl 502 are not meshingly engaged with the one or more teeth 170 of the parking gear 174. As a result, when the parking pawl 502 is in the disengaged position 540, the one or more third sensor members 538 are able to sense and/or detect the presence of the one or more first sensing members 534 of the parking pawl 502. This provides the parking mechanism 500 with a positive verification that the parking pawl 502 has been successfully disengaged from the parking gear 174.

As illustrated in FIG. 14 of the disclosure and as a non-limiting example, when the parking pawl 502 of the parking mechanism 500 is in the engaged position 542, the one or more teeth 529 of the parking pawl 502 are meshingly engaged with the one or more teeth 170 of the parking gear 174. As a result, when the parking pawl 502 is in the engaged position 542, the one or more second members 536 are able to sense and/or detect the presence of the one or more first sensing members 534 of the parking pawl 502. This provides the parking mechanism 500 with a positive verification that the parking pawl 502 has been successfully engaged from the parking gear 174.

It is within the scope of this disclosure and as a non-limiting example that the when the parking pawl 502 is transitioning between the engaged and disengaged positions 542 and 540, that neither the one or more second or the third sensing members 536 or 538 of the sensor assembly 532 may detect the presence of the one or more first sensing members 534. As a result, when both the one or more second and third sensing members 536 and 538 of the sensor assembly 532 do not detect the presence of the one or more first sensing members 534, it provides a positive indication that the parking pawl 502 is transitioning between the engaged and disengaged positions 542 and 540. This also provides a positive indication that the cam 202 of the parking mechanism 500 is successfully being rotated to transition the parking pawl 502 between the engaged and disengaged positions 542 and 540.

According to an alternative embodiment of the disclosure and as a non-limiting example, when the parking pawl 502 is transitioning between the engaged and disengaged positions 542 and 540, both the one or more second and third sensing members 536 and 538 of the sensor assembly 532 may detect the presence of the one or more first sensing members 534. As a result, when both the one or more second and third sensing members 536 and 538 of the sensor assembly 532 do detect the presence of the one or more first sensing members 534, it provides a positive indication that the parking pawl 502 is transitioning between the engaged and disengaged positions 542 and 540. This also provides a positive indication that the cam 202 of the parking mechanism 500 is successfully being rotated to transition the parking pawl 502 between the engaged and disengaged positions 542 and 540.

In the event that the circuit board 160 of the parking mechanism 500 senses that the one or more motors 4 are rotating, but the one or more third sensor members 538 detect the presence of the one or more first sensing members 534 and the one or more second sensor members 536 do not detect the presence of the one or more first sensing members 534, then the cam 202 is not being rotated and there is a failure in the one or more motors 4. Additionally, in the event that the circuit board 160 of the parking mechanism 500 senses that the one or more motors 4 are rotating, but the one or more third sensor member 538 do not detect the presence of the one or more first sensing members 534 and the one or more second sensor members 536 do detect the presence of the one or more first sensing members 534, then the cam 202 is not being rotated and there is a failure in the one or more motors 4 and/or a failure in the biasing member 518. As a result, this can provide the operator of the vehicle (not shown) with an alert indicating that the parking mechanism 500 in general has failed, that parking assembly 500 needs servicing and/or that the one or more motors 4 of the parking mechanism 500 has failed. This provides the parking mechanism 500 with diagnostic, fault and/or failure detection capabilities.

Furthermore, it is within the scope of this disclosure and as a non-limiting example that the sensor assembly 532 may be utilized to perform one or more diagnostic functions for the parking pawl 502 of the parking mechanism 500. If the circuit board 160 of the parking mechanism 500 detects and/or determines that the cam 202 of the parking mechanism has been successfully rotated, but the one or more second and third sensing members 536 and 538 do not detect the presence of the one or more first sensing members 534, then that may signal that a parking pawl 502 failure has occurred. In this case the parking mechanism 500 is determining and/or identifying whether or not a mechanical failure has occurred to the parking pawl 502. By identifying a successful rotation of the cam 202 to transition the parking pawl 502 between the engaged and disengaged position 542 and 540 and the absence of the one or more first sensing members 534, the parking mechanism 500 can positively identify whether or not the one or more first sensing members 534 has fallen off the parking pawl 502, the one or more first sensing members 534 has failed, the one or more teeth 529 have fractured from the parking pawl 502 and/or at least a portion of the second end portion 506 of the parking pawl 502 has fractured from the parking pawl 502. In response, an alert may be sent to the operator of the vehicle (not shown) indicating that the parking mechanism 500 in general has failed, that the parking mechanism needs servicing, that the sensor assembly 532 has failed and/or that the parking pawl 502 has failed. This provides the parking mechanism 500 with additional diagnostic, fault and/or failure detection capabilities.

Figure 15:
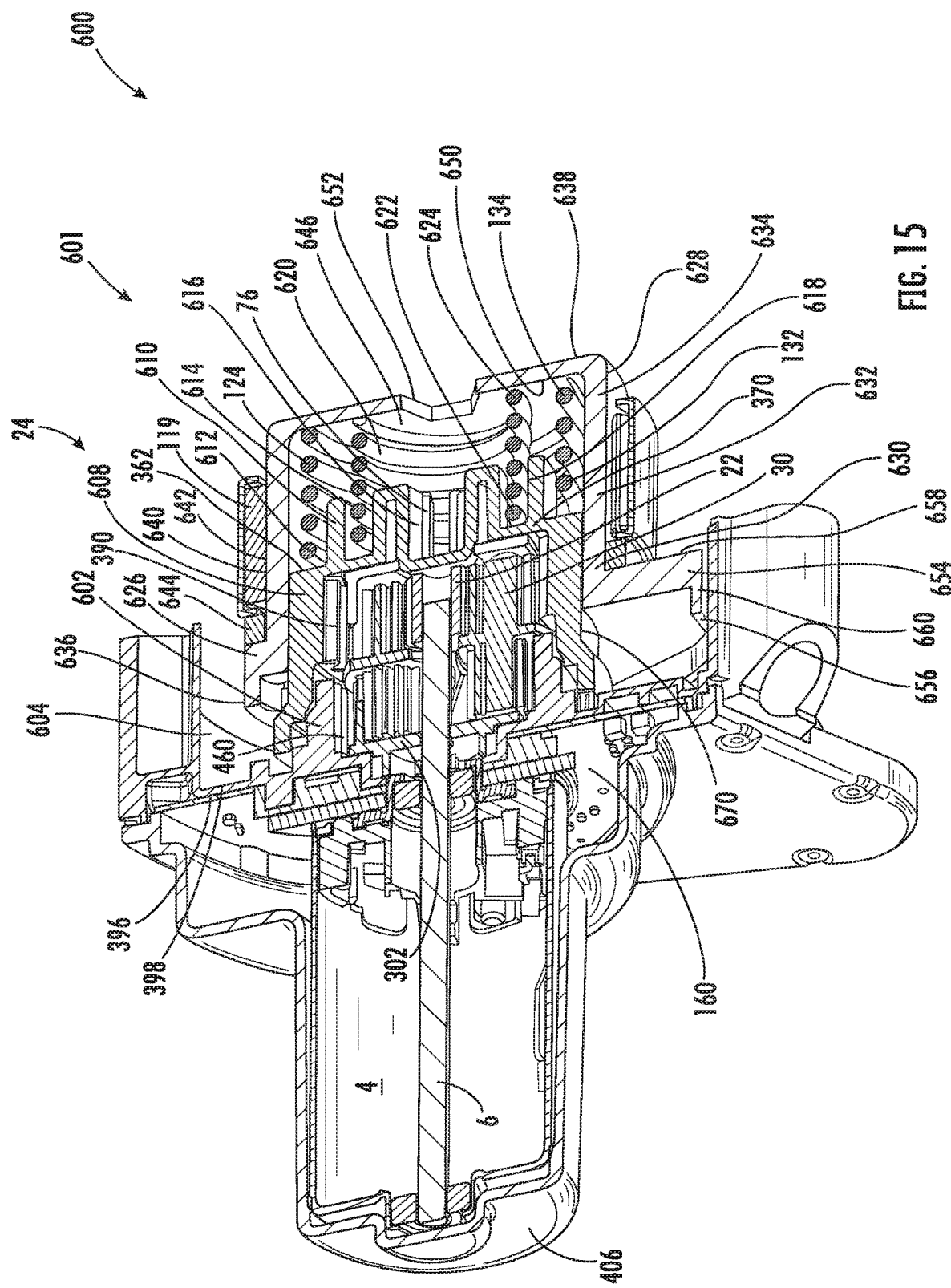
FIG. 15 is a schematic cross-sectional perspective view of an actuation mechanism of a parking mechanism according to still yet another embodiment of the disclosure.
Figure 16:
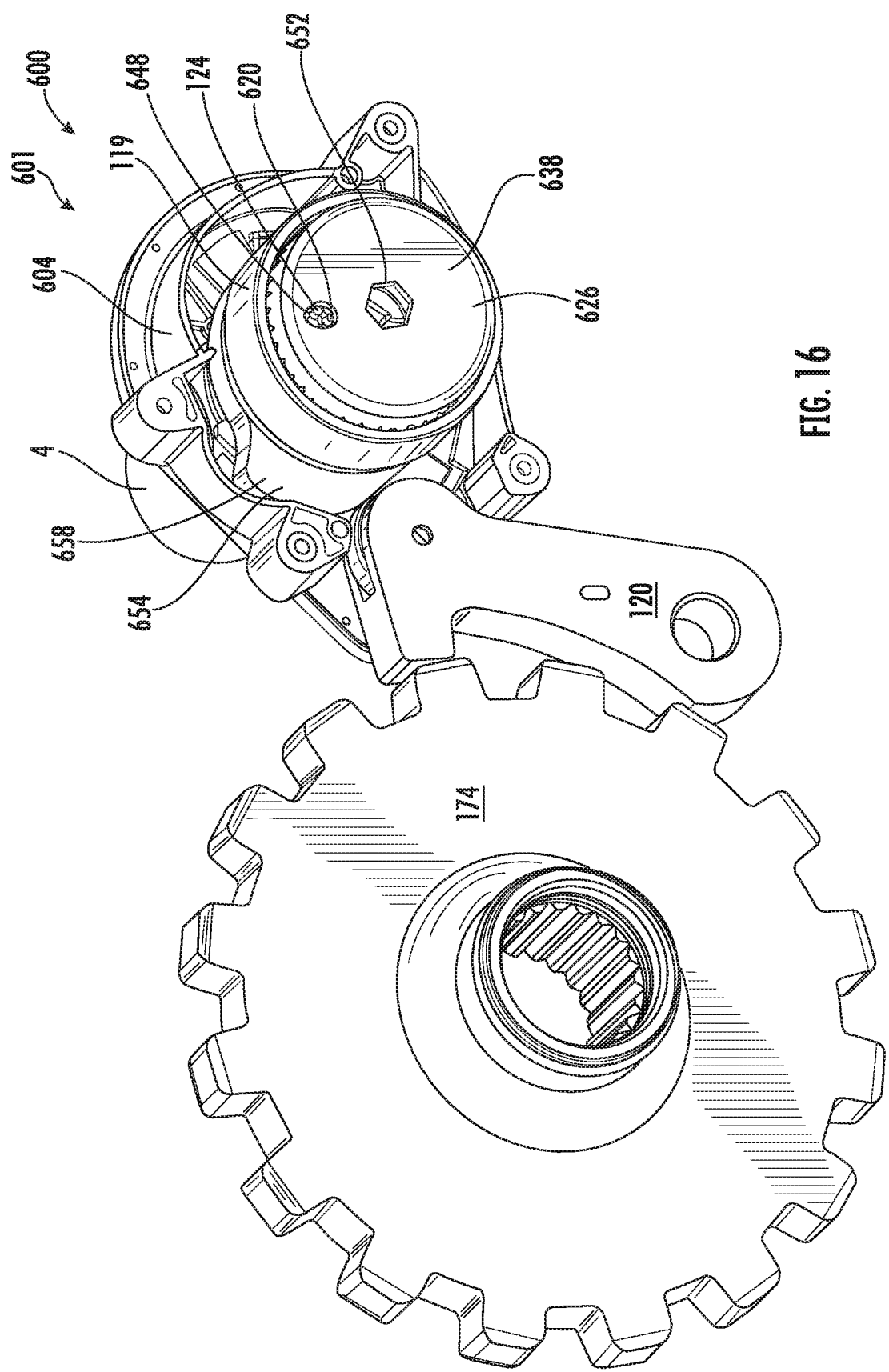
FIG. 16 is a partial cut-away schematic perspective view of the actuation mechanism and parking mechanism illustrated in FIG. 15 of the disclosure.
Figure 17:
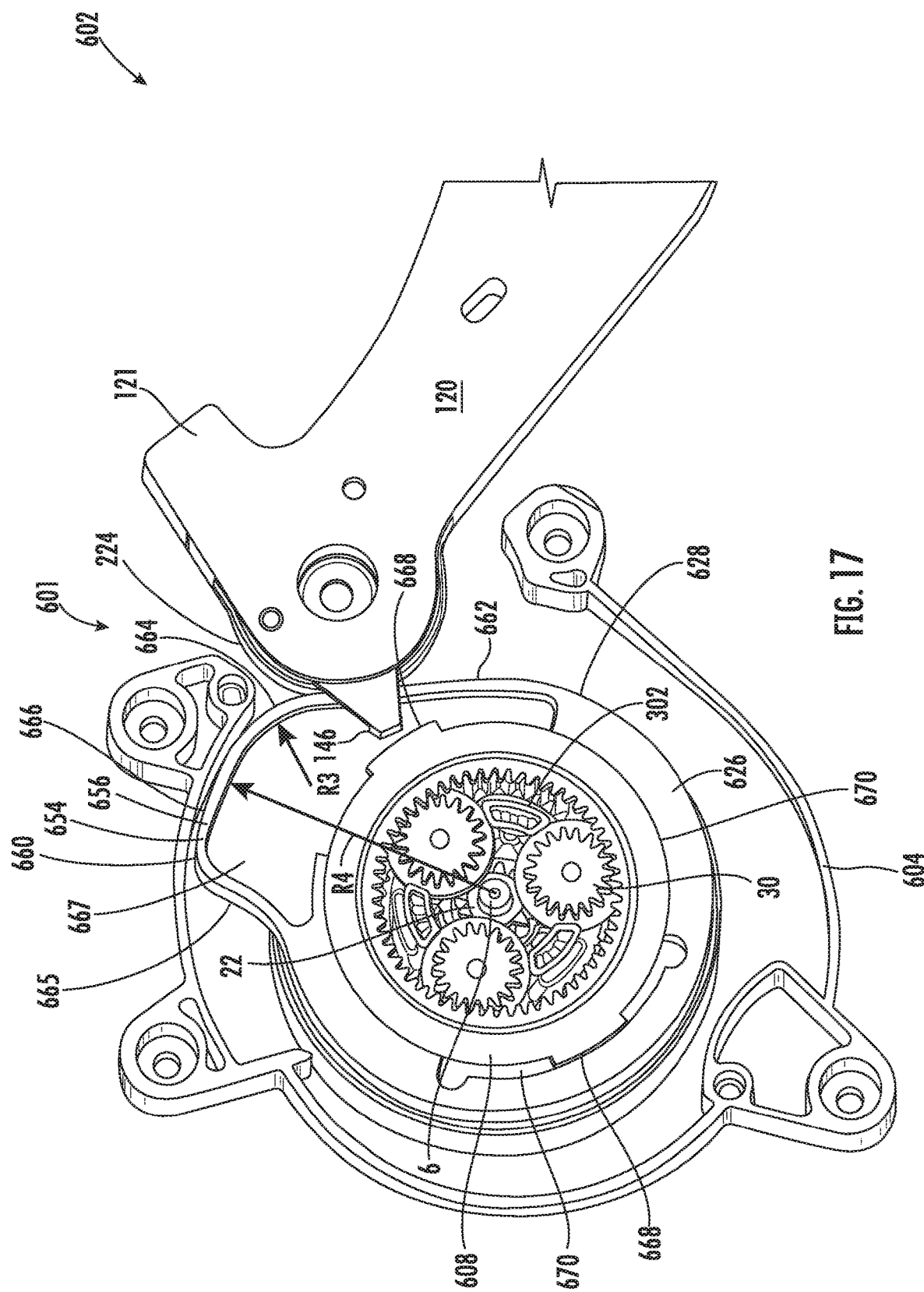
FIG. 17 is a partial cut-away, schematic bottom view of the actuation mechanism and parking mechanism illustrated in FIGS. 15 and 16 of the disclosure.

FIGS. 15-17 provide a schematic illustration of an actuation mechanism 601 a parking mechanism 600 according to still yet another embodiment of the disclosure. The actuation mechanism 601 and parking mechanism 600 illustrated in FIGS. 15-17 is the same as the actuation mechanisms 1 and 301 and the parking mechanisms 2, 200, 300 and 500 illustrated in FIGS. 1-14, except where specifically noted below. As previously discussed herein, it is within the scope of this disclosure and as a non-limiting example that the actuation mechanism 601 may be utilized in combination with a parking mechanism 600, window motors, axle connect and disconnect devices, wet clutch assemblies, dry clutch assemblies, face clutch assemblies, dog clutch assemblies, door lock and unlock assemblies and the like.

In accordance with the embodiment illustrated in FIG. 15 of the disclosure and as a non-limiting example, the actuation mechanism 601 of the parking mechanism 600 includes a ring gear 602. The ring gear 602 illustrated in FIGS. 15 and 16 are the same as the ring gear 392 illustrated in FIGS. 7-14, except where specifically noted below. As best seen in FIG. 15 of the disclosure and as a non-limiting example, ring gear 602 includes a housing portion 604 that extends axially outboard from at least a portion of the second end 398 of the ring gear 602. It is within the scope of this disclosure and as a non-limiting example that the housing portion 604 of the ring gear 602 may be of a size and shape to receive and/or retain at least a portion of the parking mechanism 600. As a result, it is to be understood that the housing portion 604 of the ring gear 602 aids in preventing the migration of dirt, debris and/or moisture into the actuation mechanism 601 and/or the parking mechanism 600 thereby improving the overall life and durability of the actuation mechanism 601 and/or the parking mechanism 600.

Disposed radially outboard from at least a portion of the carrier 302, the one or more planetary gears 30 and the ring gear 602 is an output gear 608 of the planetary gear assembly 24 of the actuation mechanism 601 of the parking mechanism 600. The output gear 608 illustrated in FIG. 15 is the same as the output gear 354 illustrated in FIGS. 7-14, except where specifically noted below. Extending axially outboard from at least a portion of the second end 362 of the output gear 602 is a reduced diameter portion 610 having a first end 612 and a second end 614. In accordance with the embodiment illustrated in FIG. 15 of the disclosure and as a non-limiting example, the reduced diameter portion 610 of the output gear 608 of the actuation mechanism 601 includes a hollow portion 616 extending inward into the output gear 608 from at least a portion of the second end 614 of the reduced diameter portion 610. As best seen in FIG. 15 of the disclosure and as a non-limiting example, at least a portion of the hollow portion 616 of the reduced diameter portion 610 of the output gear 608 includes the engagement portion 76 described and illustrated in relation to FIGS. 1-5 of the disclosure. As a result, it is within the scope of this disclosure and as a non-limiting example that the engagement portion 76 of the output gear 608 may have a plurality of circumferentially extending substantially flat surfaces and/or a plurality of axially extending splines that are selectively engagable with the connect and disconnect member 148.

Extending inward from at least a portion of the second end 614 of the reduced diameter portion 610 of the output gear 608, into at least a portion of the reduced diameter portion 610, is a biasing member receiving portion 618. The biasing member receiving portion 618 of the output gear 608 may have a size and shape to receive and/or retain at least a portion of a one or more second biasing members 620 of the parking mechanism 600. It is therefore to be understood that at least a portion of a first end portion 622 of the one or more second biasing members may be connected to at least a portion of the output gear 608. In accordance with the embodiment illustrated in FIG. 15 and as a non-limiting example, at least a portion of the biasing member receiving portion 620 of the output gear 608 may be concentric with at least a portion of the hollow portion 616 of the reduced diameter portion 610 of the output gear 608. It is within the scope of this disclosure and as a non-limiting example that the one or more second biasing members 620 may be one or more torsion springs.

Disposed radially outboard from at least a portion of the reduced diameter portion 610 of the output gear 608 is the one or more first biasing member 124 of the parking mechanism 600. It is therefore to be understood that at least a portion of the one or more second biasing members 620 may be disposed within at least a portion of the one or more first biasing members. At least a portion of the first end portion 132 of the one or more first biasing members may be connected to at least a portion of the output gear 608 of the actuation mechanism 601.

At least a portion of a portion of a cam 626 is disposed radially outboard from at least a portion of the one or more planetary gears 30, the carrier 302 and the output gear 608 of the actuation mechanism 601. As best seen in FIG. 15 of the disclosure and as a non-limiting example, the cam 626 may have an outer surface 628, a first end portion 630, an intermediate portion 632, a second end portion 634, a first end 636 and a second end 638. It is to be understood that the actuation mechanism 601 is used to selectively rotate the cam 626 of the parking mechanism 600. As the cam 626 rotates, it drives the parking pawl 120 into and out of engagement with the parking gear 174 in order to provide the parking lock function described herein. Additionally, it is within the scope of this disclosure and as a non-limiting example that the cam 626 may be axially fixed to at least a portion of the output gear 608 of the planetary gear assembly 24, but may also be rotationally engaged with the output gear 608.

As best seen in FIG. 15 of the disclosure and as anon-limiting example, at least a portion of the intermediate portion 632 of the cam 626 may have a first reduced diameter portion 640. It is within the scope if this disclosure and as a non-limiting example that the first reduced diameter portion 640 of the cam 626 may be substantially cylindrical in shape.

In accordance with the embodiment illustrated in FIG. 15 and as a non-limiting example, at least a portion of the outer surface 634 of the first reduced diameter portion 640 of the cam 626 may include a bearing journal 642. It is within the scope of this disclosure and as a non-limiting example that the bearing journal 642 of the first reduced diameter portion 640 of the cam 626 may be machined, polished, ground, coated and/or heat treated in order to aid in reducing the amount friction between the cam 626 and one or more bearing assemblies 119 of the parking mechanism 600. As a result, it is therefore to be understood that when the parking mechanism 600 is assembled, at least a portion of the one or more bearing assemblies 119 may be in direct contact with at least a portion of the bearing journal 642.

According to an embodiment of the disclosure and as a non-limiting example, the parking mechanism may further include the use of a spacer 644. As best seen in FIG. 15 of the disclosure and as a non-limiting example, at least a portion of the spacer 644 is in direct contact with at least a portion of the first reduced diameter portion 640 of the cam 626. The spacer 644 may be of a size and shape needed in order to ensure that the one or more bearing assemblies 119 are assembled in their pre-determined optimal operating positions. Additionally, it is to be understood that the spacer 644 may aid in reducing the overall amount of friction between the cam 626 and the one or more bearing assemblies 119 when in operation thereby aiding in improving the overall life and durability of the parking mechanism 600.

Extending inboard from at least a portion of the first end 636 of the cam 626 is a first hollow interior portion 646. As best seen in FIG. 15 of the disclosure and as a non-limiting example, the first hollow interior portion 646 of the cam 626 may be of a size and shape needed to receive and/or retain at least a portion of the one or more planetary gears 30, the carrier 302, the output gear 608, the one or more first biasing members 124 and the one or more second biasing members 620. It is within the scope of this disclosure and as a non-limiting example that the first hollow interior portion 646 of the cam 626 is may have substantially cylindrical in shape.

As best seen in FIGS. 15 and 16 of the disclosure and as a non-limiting example, at least a portion of the second end portions 134 and 624 of the one or more first and second biasing members 124 and 620 may be connected to at least a portion of the cam 626 of the parking mechanism 600. In accordance with the embodiment illustrated in FIG. 16 and as a non-limiting example, one or more biasing member receiving apertures 648 may extend from the outer surface 628 of the second end 638 of the cam 626 to a surface 650 defining the first hollow interior portion 646 of the cam 626. The one or more biasing member receiving apertures 648 may be of a size and shape to receive and/or retain at least a portion of the second end portions 134 and/or 624 of the one or more first and/or second biasing members 124 and/or 620 of the parking mechanism 600. It is within the scope of this disclosure and as a non-limiting example that the one or more second biasing members 620 or the one or more first biasing members 124 may be used as a backup thereby allowing the parking mechanism 600 to operate even after the one or more first or second biasing members 124 or 620 have failed. As a result, this configuration aids in improving the overall life and durability of the parking mechanism 600.

One or more connect and disconnect member apertures 652 may extend from the outer surface 628 of the second end 638 of the cam 626 to the surface 650 defining the first hollow interior portion 646 of the cam 626. At least a portion of the one or more connect and disconnect member apertures 652 in the cam 626 of the parking mechanism may be aligned with at least a portion of the engagement portion 76 of the output gear 608. As a result, the one or more connect and disconnect member apertures 652 provide access to the engagement portion 76 of the output gear 608. It is within the scope of this disclosure and as a non-limiting example that the one or more connect and disconnect member apertures 652 may have a size and shape to receive and/or retain at least a portion of the connect and disconnect member 148 described and illustrated in relation to FIGS. 1 and 5 of the disclosure.

Extending outward from at least a portion of the outer surface 628 of the first end portion 620 of the cam 626 is a protruding portion 654 having a first side 656 and a second side 658. The protruding portion 654 of the cam 626 of the parking mechanism 600 is of a size and shape needed to drive the parking pawl 120 into and out of engagement with the parking gear 174. As a result, it is to be understood that at least a portion of the parking pawl 120 and/or the rolling member 224 of the parking pawl 120 is in direct contact with at least a portion of the protruding portion 654 of the cam 626 when the parking mechanism 600 is in operation.

In accordance with the embodiment illustrated in FIG. 17 and as a non-limiting example, the outermost periphery 660 of the protruding portion 654 of the cam 626 includes a substantially straight portion 662, a first radiused portion 664, a second radiused portion 666 and a stopper portion 665. As best seen in FIG. 17 of the disclosure and as a non-limiting example, at least a portion of the first radiused portion 662 of the protruding portion 654 of the cam 626 connects the substantially straight portion 663 to the second radiused portion 664 of the protruding portion 654. It is within the scope of this disclosure and as a non-limiting example that the first radiused portion 664 may have a radius R3 that is smaller than a radius R4 of the second radiused portion 666 of the protruding portion 654 of the cam 626.

When in operation, as the parking pawl 120 is transitioned along the substantially flat portion 662 and the first radiused portion 662 of the protruding portion 654 of the cam 626, the parking pawl 120 is transitioned toward or away from the parking gear 174 depending on the direction that the cam 626 is being rotated by the actuation mechanism 601. Additionally, when in operation, as the parking pawl 120 is transitioned into the second radiused portion 664 of the protruding portion 654 of the cam 626, the parking pawl 120 is in the stroke zone of the cam 626. As previously discussed, the stroke zone of the cam 626 is the portion of the cam 626 that drives the parking pawl 120 into engagement with the parking gear 174 of the parking mechanism 600. Furthermore, when in operation, once the parking pawl 120 and/or the dog 146 of the pawl 120 come into contact with at least a portion of the stopper portion 665 of the protruding portion 654 of the cam 626, the cam 626 is prevented from rotating further. As a result, the stopper portion 665 prevents the cam 626 and the parking pawl 120 from being overdriven which reduces the overall life and durability of the parking mechanism 600. Additionally, this prevents the cam 626 from being overdriven which may cause the parking pawl 120 to become disengaged when it is intended to be engaged with the parking gear 174. It is therefore to be understood that the stopper portion 665 of the protruding portion 654 of the cam 626 aids in increasing the overall reliability and operability of the parking mechanism 600.

Extending inward from at least a portion of the first side 656 of the protruding portion 654 of the cam 626 is a parking pawl receiving portion 667. The parking pawl receiving portion 667 of the cam 626 may have a size and shape to receive and/or retain at least a portion of the dog 146 of the parking pawl 120. When the dog 146 of the parking pawl 120 is disposed within the parking pawl receiving portion 667 of the cam 626 of the parking mechanism 600, the parking pawl 120 is prevented from any inadvertent and unwanted engagement or disengagement with the parking gear 174. It is therefore to be understood that the interaction between the dog 146 and the parking pawl receiving portion 667 aids in improving the overall reliability and functionality of the parking mechanism 600.

As best seen in FIG. 17 of the disclosure and as a non-limiting example, the output gear 608 of the actuation mechanism 601 may include one or more cam engagement portions 668 extending from at least a portion of an outer surface 670 of the output gear 608. In accordance with the embodiment illustrated in FIG. 17 and as a non-limiting example, at least a portion of the one or more cam engagement portions 668 of the output gear 608 are received and/or retained within at least a portion of one or more output gear receiving portions 670 in the cam 626. The one or more output gear receiving portions 670 of the cam 626 may extend inward into the cam 626 from at least a portion of the first end 636 of the cam 626. The one or more output gear receiving portions 670 of the cam 626 define a biasing member loading region where the output gear 608 is able to rotate a pre-determined amount while the cam 626 is unable to rotate because the parking mechanism 600 is in a blocked or disengaged pinched state. This provides the one or more first and/or second biasing members 124 and/or 620 with the energy needed to drive the parking pawl 120 into or out of engagement once the blocked state illustrated in FIG. 16 or the disengaged pinched state has been cured.

Figure 18:
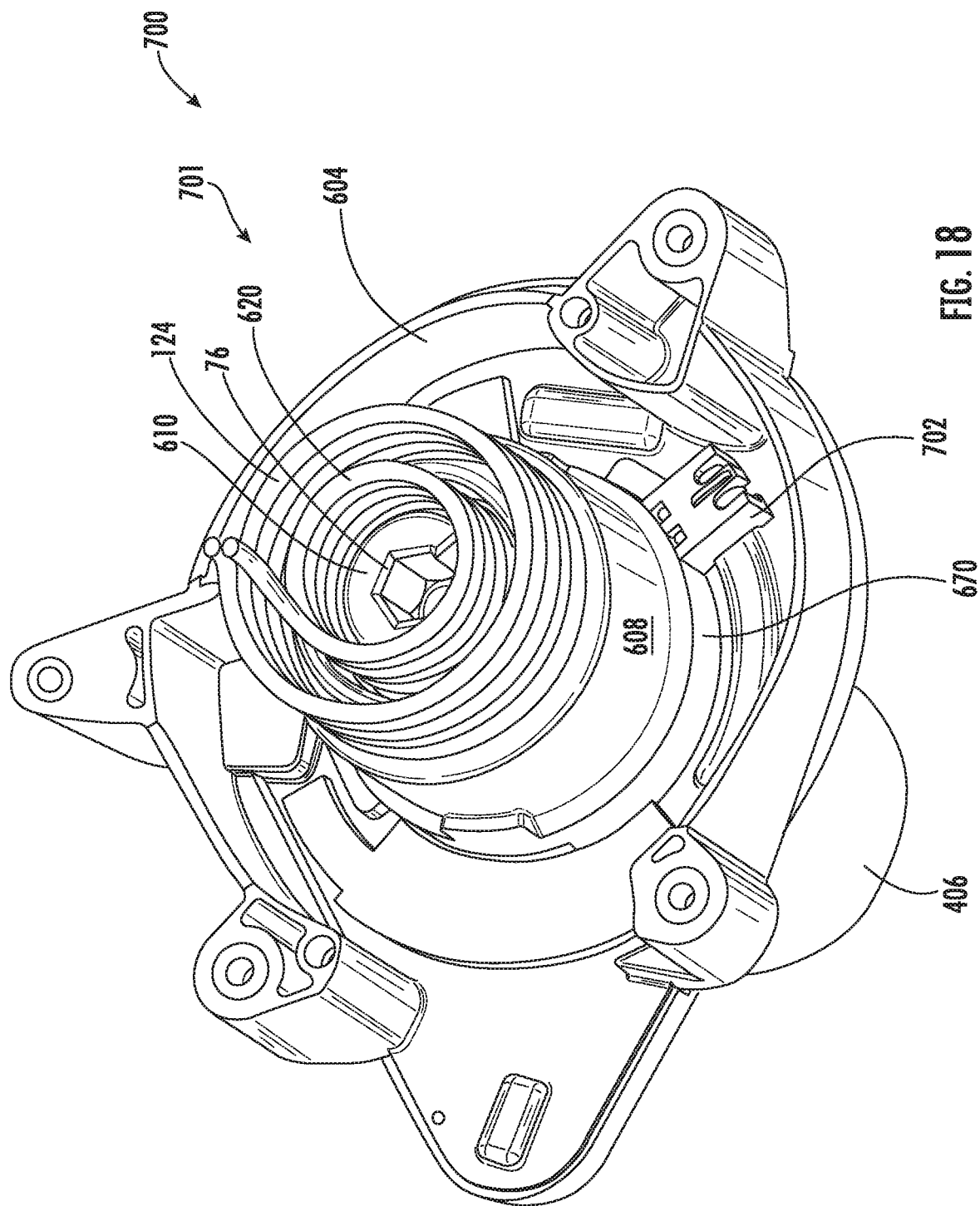
FIG. 18 is a partial cut-away schematic perspective view of a portion of an actuation mechanism and a parking mechanism according to still yet a further embodiment of the disclosure.
Figure 19:
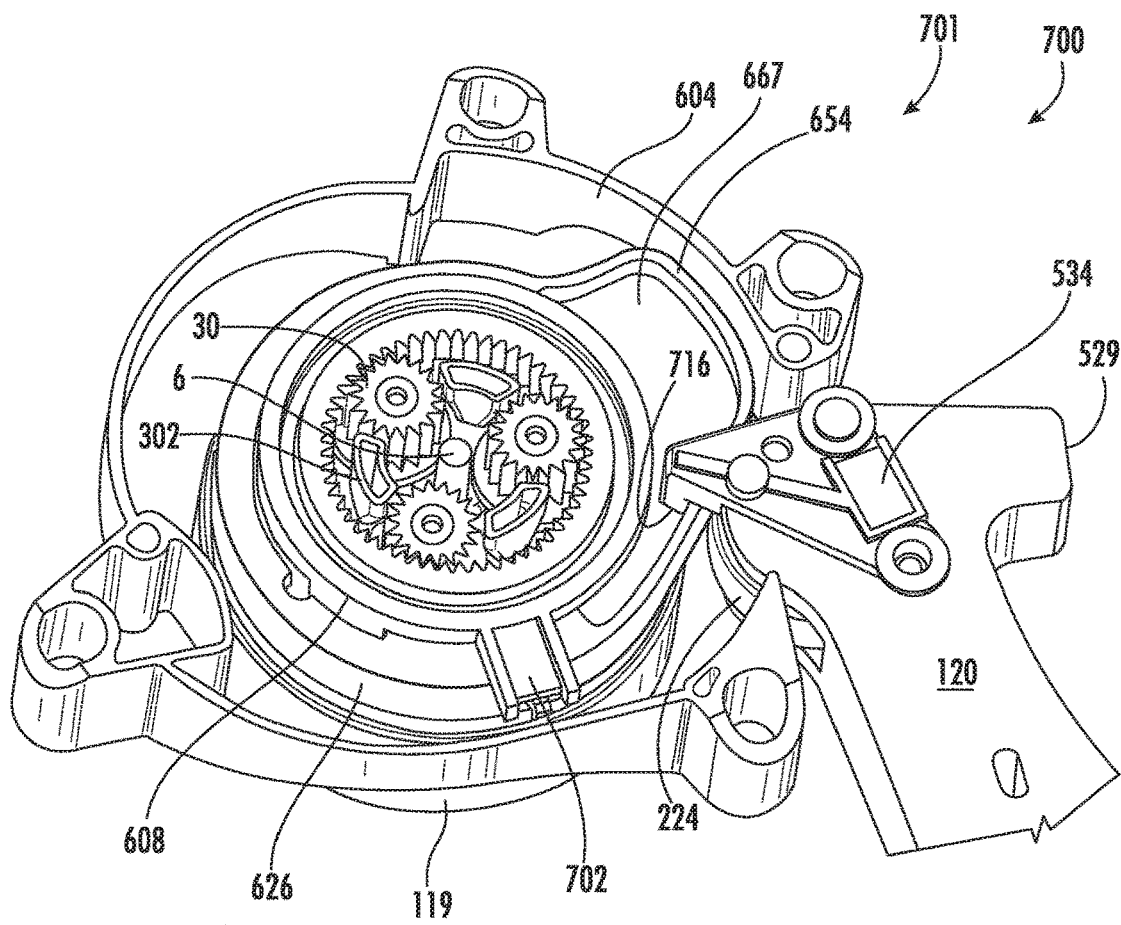
FIG. 19 is a partial cut-away schematic perspective view of a portion of the actuation mechanism and the parking mechanism according to the embodiment illustrated in FIG. 18.
Figure 20:
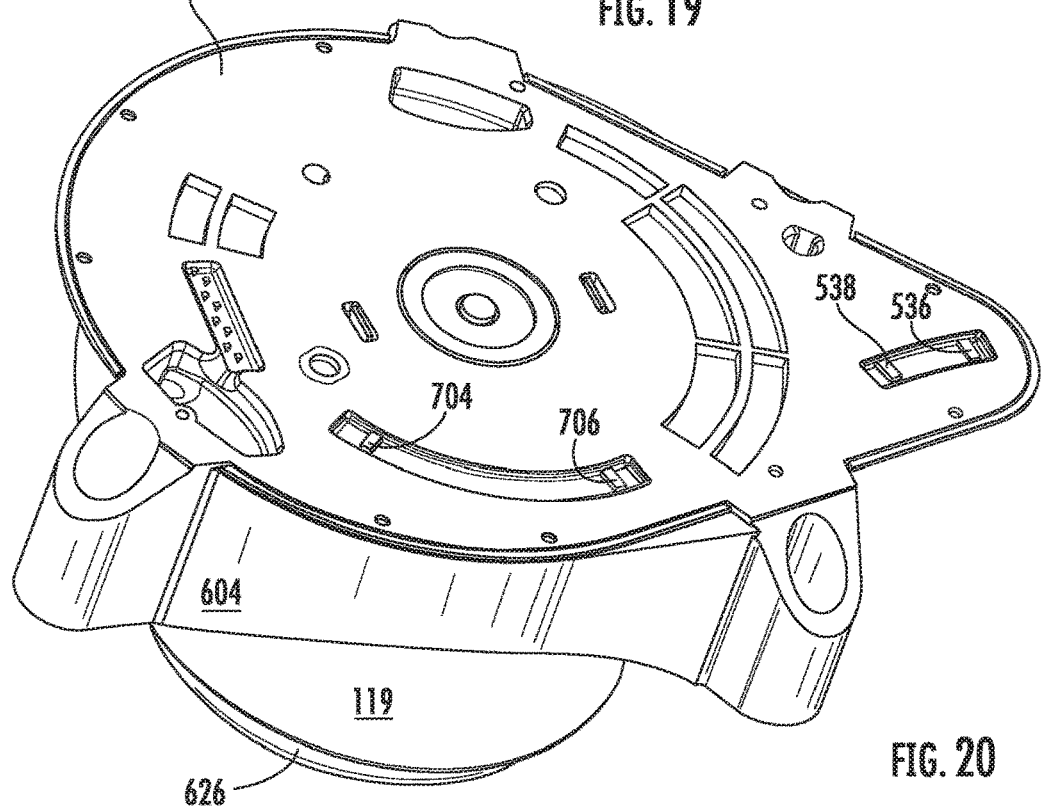
FIG. 20 is a partial cut-away schematic perspective view of a portion of the parking mechanism according to the embodiment illustrated in FIG. 18-19 of the disclosure.

FIGS. 18-20 provide a schematic illustration of an actuation mechanism 701 and a parking mechanism 700 according to still yet a further embodiment of the disclosure. The actuation mechanism 701 and the parking mechanism 700 illustrated in FIGS. 18-20 are the same as the actuation mechanisms 1, 301 and 601 and the parking mechanisms 1, 200, 300, 500 and 600 illustrated in FIGS. 1-17, except where specifically noted below. As previously discussed herein, it is within the scope of this disclosure and as a non-limiting example that the actuation mechanism 701 may be utilized in combination with a parking mechanism 700, window motors, axle connect and disconnect devices, wet clutch assemblies, dry clutch assemblies, face clutch assemblies, dog clutch assemblies, door lock and unlock assemblies and the like.

As best seen in FIG. 18 of the disclosure and as a non-limiting example, the output gear 608 of the actuation mechanism 701 may further include one or more fourth sensing members 702 that are integrally connected to at least a portion of the outer surface 670 of the output gear 608. The one more fourth sensing members 702 may be in communication with one or more fifth sensing members 704 and one or more sixth sensing members 706 of the parking mechanism 700. It is to be understood that the one or more fifth sensing members 704 and the one or more sixth sensing members 706 may be configured in order to sense and/or determine the location of the one or more fourth sensors 702 of the parking mechanism 700. As a result, the one or more fourth, fifth and sixth sensor members 702, 704 and 706 provide a positive indication that the output gear 608 of the actuation mechanism 701 of the parking mechanism 700 is rotating and the direction that the output gear 608 is rotating. It is within the scope of this disclosure and as a non-limiting example that the one or more fourth sensing members 702 may be a magnet or a material composed, at least in part, by a magnetizable material. As a non-limiting example, at least a portion of the one or more fourth sensing members 704 may be integrally connected to at least a portion of the output gear 608 by using one or more welds, one or more adhesives, one or more mechanical fasteners and/or a threaded connection.

At least a portion of the one or more fifth and sixth sensing members 704 and 706 of the parking mechanism 700 may be integrally connected to and in electrical communication with at least a portion of the circuit board 160 at pre-determined locations. Given the relatively close distance between the one or more fourth sensing members 702 on the output gear 608 and the one or more fifth and sixth sensing members 704 and 706 on the circuit board 160, the one or more fifth and sixth sensing members 704 and 706 are able to sense the position of the output gear 608. It is within the scope of this disclosure and as a non-limiting example that the one or more fifth and/or sixth sensing members 704 and/or 706 may be configured to identify whether or not a parking pawl 708 is engaged or disengaged with the parking gear 174 of the parking mechanism 700. Additionally, it is within the scope of this disclosure and as a non-limiting example that the one or more fifth and/or sixth sensing members 704 and/or 706 may be configured in order to identify whether or not a failure has occurred within the actuation mechanism 701 and/or the parking mechanism 700. Furthermore, it is within the scope of this disclosure and as a non-limiting example that the one or more fifth and/or sixth sensing members 704 and/or 706 may be configured to identify when the one or more motors 4 need to be turned off in order to aid in ensuring that the actuation mechanism 701 and/or the parking mechanism 700 are not over driven when in operation. This aids in improving the overall life and durability of the actuation and/or parking mechanisms 701 and/or 700.

When the parking pawl 708 is in a disengaged position 540 illustrated in FIGS. 12 and 13 of the disclosure, the one or more fourth sensing members 702 may be in operating communication with the one or more fifth sensing members 704 but not in operating communication with the one or more sixth sensing members 706. Additionally, when the parking pawl 708 is in an engaged position 542 illustrated in FIG. 11 of the disclosure, the one or more fourth sensing members 702 may be in operating communication with the one or more sixth sensing members 706 but not in operating communication with the one or more fifth sensing members 704. It is within the scope of this disclosure and as a non-limiting example that the one or more fifth and/or sixth sensing members 704 and/or 706 may be a transducer, a magnetic field sensor, a hall effect sensor and/or any other type of sensor that is able to detect when the one or more fourth sensing members 702 are located relative to the one or more fifth and/or sixth sensing members 704 and/or 706.

Additionally, when the one or more second and third sensing members 536 and 538 do not detect and/or sense the presence of the one or more first sensing members 532, but the one or more sixth sensing members 706 detect the presence of the one or more fourth sensors 702, it may indicate that the parking mechanism 700 is in a blocked condition. Once the one or more second sensing members 536 detect and/or sense the presence of the one or more first sensing members 532 and the one or more sixth sensing members 706 detect the presence of the one or more fourth sensors 702, it may indicate that the parking mechanism 700 is in the engaged position described and illustrated in relation to FIG. 14 of the disclosure.

Furthermore, when the when the one or more second and third sensing members 536 and 538 do not detect and/or sense the presence of the one or more first sensing members 532, but the one or more fifth sensing members 704 detect the presence of the one or more fourth sensors 702, it may indicate that the parking mechanism 700 is in a disengaged pinched state. Once the one or more third sensing members 538 detect and/or sense the presence of the one or more first sensing members 532 and the one or more fifth sensing members 704 detect the presence of the one or more fourth sensors 702, it may indicate that the parking mechanism 700 is in the disengaged position described and illustrated in relation to FIGS. 12 and 13 of the disclosure.

As best seen in FIG. 19 of the disclosure and as a non-limiting example, the parking pawl 708 of the parking mechanism 700 may include a sensor mounting member 710 having a first side 712 and a second side 714 that is integrally connected to at least a portion of the parking pawl 708. Extending outward from at least a portion of the first side 712 of the sensor mounting member 710 is a dog 716. The dog 716 may be of a size and shape such that are least a portion of the dog 716 may be received and/or retained within at least a portion of the parking pawl receiving portion 667 of the cam 626 of the parking mechanism 700. It is within the scope of this disclosure and as a non-limiting example that the sensor mounting member 710 may be connected to at least a portion of the parking pawl 708 by using one or more welds, one or more mechanical fasteners, one or more adhesives, a press-fit connection and/or volcanized to at least a portion of the parking pawl 708. Additionally, it is within the scope of this disclosure and as a non-limiting example that the sensor mounting member 710 may be connected to the head of the parking pawl 708 at a location proximate to the one or more teeth 529 of the parking pawl 708.

In accordance with an embodiment of the disclosure and as a non-limiting example, at least a portion of the one or more first sensing members 534 may be integrally connected to at least a portion of the second side 714 of the sensor mounting member 710 of the parking mechanism 700. It is within the scope of this disclosure and as a non-limiting example that the one or more first sensing members 534 may be connected to at least a portion of the sensor mounting member 710 by using one or more welds, one or more mechanical fasteners and/or one or more adhesives.

FIG. 21 is a schematic side-view of one or more planetary gears 800 according to an alternative embodiment of the disclosure. The one or more planetary gears 800 illustrated in FIG. 21 are the same as the one or more planetary gears 30 illustrated in FIGS. 1-3, 5, 7, 8, 15, 17 and 19 of the disclosure, except where specifically noted below. It is within the scope of this disclosure and as a non-limiting example that the one or more planetary gears 800 described and illustrated in relation to FIG. 21 may be used in place of the one or more planetary gears 30 within the actuation mechanisms 1, 301, 601 and 701 and the parking mechanisms 1, 200, 300, 500, 600 and 700 described and illustrated in relation to FIGS. 1-20.

As illustrated in FIG. 21 of the disclosure and as a non-limiting example, the one or more planetary gears 800 have an inner surface 802, an outer surface 804, a first end portion 806, a second end portion 808 and an intermediate portion 810 interposed between the first and second end portions 806 and 808 of the one or more planetary gears 800. The inner surface 802 and the outer surface 804 of the one or more planetary gears 800 define a hollow portion 812 therein. It is within the scope of this disclosure and as a non-limiting example that the one or more planetary gears 800 may be stepped planetary gears.

Circumferentially extending from at least a portion of the outer surface 804 of the first end portion 806 of the one or more planetary gears 800 is a first plurality of planetary gear teeth 814. The first plurality of planetary gear teeth 814 on the one or more planetary gears 800 are complementary to and meshingly engaged with the plurality of ring gear teeth 56 and/or 460 on the ring gears 46 and/or 392. It is within the scope of this disclosure and as a non-limiting example that the first plurality of planetary gear teeth 814 on the outer surface 804 of the first end portion 806 of the one or more planetary gears 800 may be a plurality of hypoid gear teeth, spiral bevel gear teeth, helical gear teeth, spur gear teeth, double hypoid gear teeth, double spiral bevel gear teeth or double helical gear teeth.

A second plurality of planetary gear teeth 816 may circumferentially extend from at least a portion of the outer surface 804 of the second end portion 808 of the one or more planetary gears 800. The second plurality of planetary gear teeth 816 on the one or more planetary gears 800 are complementary to and meshingly engaged with the plurality of output ring gear teeth 94 and/or 390 on the output ring gears 68, 354 and/or 608. It is within the scope of this disclosure and as a non-limiting example that the second plurality of planetary gear teeth 816 on the outer surface 804 of the second end portion 808 of the one or more planetary gears 800 may be a plurality of hypoid gear teeth, spiral bevel gear teeth, helical gear teeth, spur gear teeth, double hypoid gear teeth, double spiral bevel gear teeth or double helical gear teeth.

In accordance with the embodiment illustrated in FIG. 21 as a non-limiting example, the one or more planetary gears 800 may further include an increased diameter portion 818. The increased diameter portion 818 of the one or more planetary gears 800 may circumferentially extend from at least a portion of the outer surface 804 of the intermediate portion 810 of the one or more planetary gears 800. As best seen in FIG. 21 of the disclosure and as a non-limiting example, the increased diameter portion 818 of the one or more planetary gears 800 may separate the first plurality of planetary gear teeth 814 from the second plurality of planetary gear teeth 816 on the outer surface 804 of the one or more planetary gears 800. It is within the scope of this disclosure that the increased diameter portion 818 of the one or more planetary gears 800 may define the gap 66 between the ring gear 46 and the output ring gear 68 and/or may provide rotational support for at least a portion of the one or more planetary gears 800.

As best seen in FIG. 21 of the disclosure and as a non-limiting example, the first plurality of planetary gear teeth 814 on the one or more planetary gears 800 may have an outermost diameter D11. Additionally, as illustrated in FIG. 21 of the disclosure and as a non-limiting example, the second plurality of planetary gear teeth 816 on the one or more planetary gears 800 may have an outermost diameter D12. Furthermore, as best seen in FIG. 21 of the disclosure and as a non-limiting example, the increased diameter portion 818 on the intermediate portion 810 of the one or more planetary gears 800 may have an outermost diameter D13. In accordance with an embodiment of the disclosure and as a non-limiting example, the outermost diameter D13 may be substantially equal to or larger than the outermost diameter D11 but may be larger than the outermost diameter D12 of the one or more planetary gears 800. Additionally, in accordance with the embodiment illustrated in FIG. 22 and as a non-limiting example, the outermost diameter D11 of the first plurality of planetary gear teeth 814 may be larger than the outermost diameter D12 of the second plurality of planetary gear teeth 816 of the one or more planetary gears 800.

FIG. 22 is a schematic side-view of one or more planetary gears 900 according to another embodiment of the disclosure. The one or more planetary gears 900 illustrated in FIG. 22 are the same as the one or more planetary gears 30 and 800 illustrated in FIGS. 1-3, 5, 7, 8, 15, 17, 19 and 21 of the disclosure, except where specifically noted below. It is within the scope of this disclosure and as a non-limiting example that the one or more planetary gears 900 described and illustrated in relation to FIG. 22 may be used in place of the one or more planetary gears 30 or 800 within the actuation mechanisms 1, 301, 601 and 701 and the parking mechanisms 1, 200, 300, 500, 600 and 700 described and illustrated in relation to FIGS. 1-20.

As illustrated in FIG. 22 of the disclosure and as a non-limiting example, the one or more planetary gears 900 have an inner surface 902, an outer surface 904, a first end portion 906, a second end portion 908 and an intermediate portion 910 interposed between the first and second end portions 906 and 908 of the one or more planetary gears 900. The inner surface 902 and the outer surface 904 of the one or more planetary gears 900 define a hollow portion 912 therein. It is within the scope of this disclosure and as a non-limiting example that the one or more planetary gears 900 may be stepped planetary gears.

Circumferentially extending from at least a portion of the outer surface 904 of the first end portion 906 of the one or more planetary gears 900 is a first plurality of planetary gear teeth 914. The first plurality of planetary gear teeth 914 on the one or more planetary gears 900 are complementary to and meshingly engaged with the plurality of ring gear teeth 56 and/or 460 on the ring gears 46 and/or 392. It is within the scope of this disclosure and as a non-limiting example that the first plurality of planetary gear teeth 914 on the outer surface 904 of the first end portion 906 of the one or more planetary gears 900 may be a plurality of hypoid gear teeth, spiral bevel gear teeth, helical gear teeth, spur gear teeth, double hypoid gear teeth, double spiral bevel gear teeth or double helical gear teeth.

A second plurality of planetary gear teeth 916 may circumferentially extend from at least a portion of the outer surface 904 of the second end portion 908 of the one or more planetary gears 900. The second plurality of planetary gear teeth 916 on the one or more planetary gears 900 are complementary to and meshingly engaged with the plurality of output ring gear teeth 94 and/or 390 on the output ring gears 68, 354 and/or 608. It is within the scope of this disclosure and as a non-limiting example that the second plurality of planetary gear teeth 916 on the outer surface 904 of the second end portion 908 of the one or more planetary gears 900 may be a plurality of hypoid gear teeth, spiral bevel gear teeth, helical gear teeth, spur gear teeth, double hypoid gear teeth, double spiral bevel gear teeth or double helical gear teeth.

In accordance with the embodiment illustrated in FIG. 22 as a non-limiting example, the one or more planetary gears 900 may further include an increased diameter portion 918. The increased diameter portion 918 of the one or more planetary gears 900 may circumferentially extend from at least a portion of the outer surface 904 of the intermediate portion 910 of the one or more planetary gears 900. As best seen in FIG. 22 of the disclosure and as anon-limiting example, the increased diameter portion 918 of the one or more planetary gears 900 may separate the first plurality of planetary gear teeth 914 from the second plurality of planetary gear teeth 916 on the outer surface 904 of the one or more planetary gears 900. It is within the scope of this disclosure that the increased diameter portion 918 of the one or more planetary gears 900 may define the gap 66 between the ring gear 46 and the output ring gear 68 and/or may provide rotational support for at least a portion of the one or more planetary gears 900.

As best seen in FIG. 22 of the disclosure and as a non-limiting example, the first plurality of planetary gear teeth 914 on the one or more planetary gears 900 may have an outermost diameter D14. Additionally, as illustrated in FIG. 22 of the disclosure and as a non-limiting example, the second plurality of planetary gear teeth 916 on the one or more planetary gears 900 may have an outermost diameter D15. Furthermore, as best seen in FIG. 22 of the disclosure and as a non-limiting example, the increased diameter portion 918 on the intermediate portion 910 of the one or more planetary gears 900 may have an outermost diameter D16. In accordance with an embodiment of the disclosure and as a non-limiting example, the outermost diameter D16 may be larger than the outermost diameters D14 and D15 of the one or more planetary gears 900. Additionally, in accordance with the embodiment illustrated in FIG. 22 and as a non-limiting example, the outermost diameter D14 of the first plurality of planetary gear teeth 914 may be substantially equal to the outermost diameter D15 of the second plurality of planetary gear teeth 916 of the one or more planetary gears 900.

It is within the scope of this disclosure that the various embodiments of the disclosure described and illustrated herein may be combined with one another to make an axle system according to an embodiment of the disclosure.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

The invention claimed is:

1. An actuation mechanism, comprising:
    one or more motors having a motor output shaft with a sun gear;
    a planetary gear assembly comprising:
        a fixed non-rotating ring gear;
        a carrier, wherein said carrier comprises a first portion and a second portion;
        an output gear; and
        one or more planetary gears,
    wherein at least a portion of said one or more planetary gears are drivingly connected to at least a portion of said carrier, said sun gear, said fixed non-rotating ring gear, and said output gear,
    wherein said planetary gear assembly of said actuation mechanism is non-back drivable, and
    wherein said first portion and said second portion are two separate portions directly attached to each other in a press-fit manner, said first portion and said second portion having the same length along an axial direction of said carrier.

2. The actuation mechanism of claim 1, wherein said first portion comprises one or more first attachment portions.

3. The actuation mechanism of claim 2, wherein said second portion comprises one or more second attachment portions.

4. The actuation mechanism of claim 3, wherein said one or more second attachment portions includes a hollow attachment portion, said hollow attachment portion having a size and shape to receive said one or more first attachment portions.

5. The actuation mechanism of claim 4, wherein said one or more first attachment portions press-fit within said hollow attachment portion of said one or more second attachment portions.

6. The actuation mechanism of claim 3, wherein a number of said one or more first attachment portions corresponds to a number of one or more second attachment portions.

7. The actuation mechanism of claim 1, wherein said carrier comprises one or more planetary gear support portions.

8. The actuation mechanism of claim 7, wherein said one or more planetary gear support portions provide rotational support for said one or more planetary gears and drivingly connects said one or more planetary gears to said carrier.

9. The actuation mechanism of claim 7, wherein a number of said one or more planetary gear support portions corresponds to a number of said one or more planetary gears.

10. The actuation mechanism of claim 7, wherein said first portion further comprises one or more first planetary gear support portion retention members.

11. The actuation mechanism of claim 10, wherein said one or more first planetary gear support portion retention members comprises a first hollow interior portion.

12. The actuation mechanism of claim 11, wherein said first hollow interior portion has a size and shape to retain at least a portion of a first end portion of said one or more planetary gear support portions.

13. The actuation mechanism of claim 7, wherein said second portion further comprises one or more second planetary gear support portion retention members.

14. The actuation mechanism of claim 13, wherein said one or more second planetary gear support portion retention members comprises a second hollow interior portion.

15. The actuation mechanism of claim 14, wherein said second hollow interior portion has a size and shape to retain at least a portion of a second end portion of said one or more planetary gear support portions.

16. The actuation mechanism of claim 1, wherein said first portion comprises a motor output shaft aperture.

17. The actuation mechanism of claim 16, wherein said second portion comprises an output gear aperture.

18. The actuation mechanism of claim 17, wherein said output gear aperture is aligned with said motor output shaft aperture.

19. The actuation mechanism of claim 1, wherein at least a portion of said sun gear and said one or more planetary gears are disposed within said carrier.

20. The actuation mechanism of claim 1, wherein said sun gear is integrally formed as part of said motor output shaft, and where said first portion and said second portion engage at a mid-section of said carrier.

* * * * *